US008943694B2

(12) United States Patent
Kobayashi et al.

(10) Patent No.: US 8,943,694 B2
(45) Date of Patent: Feb. 3, 2015

(54) ACCESSORY MAKING DEVICE, ACCESSORY MAKING KIT, AND METHOD FOR MAKING ACCESSORY

(75) Inventors: Natsuko Kobayashi, Nagoya (JP); Haruka Kasuga, Nagoya (JP); Akio Nakashima, Nagoya (JP)

(73) Assignee: The Pilot Ink Co., Ltd., Nagoya-shi (JP)

( * ) Notice: Subject to any disclaimer, the term of this patent is extended or adjusted under 35 U.S.C. 154(b) by 156 days.

(21) Appl. No.: 13/517,258

(22) PCT Filed: Dec. 16, 2010

(86) PCT No.: PCT/JP2010/072654

§ 371 (c)(1), (2), (4) Date: Jun. 20, 2012

(87) PCT Pub. No.: WO2011/078052

PCT Pub. Date: Jun. 30, 2011

(65) Prior Publication Data

US 2012/0246909 A1 Oct. 4, 2012

(30) Foreign Application Priority Data

Dec. 25, 2009 (JP) ................................ 2009-294076
Jan. 8, 2010 (JP) ................................ 2010-003087
Oct. 28, 2010 (JP) ................................ 2010-241923

(51) Int. Cl.
*B23P 19/04* (2006.01)
*B23P 19/10* (2006.01)
(Continued)

(52) U.S. Cl.
CPC ........................................ *B44C 5/00* (2013.01)
USPC ..................... 29/896.41; 29/896.411; 29/433; 29/559; 29/234; 29/241; 29/281.1; 132/273

(58) Field of Classification Search
USPC ......... 29/896.4–896.411, 433, 728, 234, 241; 132/222, 273, 275, 56, 333
See application file for complete search history.

(56) References Cited

U.S. PATENT DOCUMENTS 2,076,945 A * 4/1937 Hoeflich ........................ 428/10
3,545,069 A * 12/1970 Krieger .......................... 29/433
(Continued)

FOREIGN PATENT DOCUMENTS

JP 2004-041309 A 2/2004
JP 2007-526093 A 9/2007

OTHER PUBLICATIONS

International Search Report dated Feb. 1, 2011, issued for PCT/JP2010/072654.

*Primary Examiner* — Alexander P Taousakis
*Assistant Examiner* — Matthew P Travers
(74) *Attorney, Agent, or Firm* — Edwards Wildman Palmer LLP

(57) ABSTRACT

An accessory making device (1) of the present invention is a device for making an accessory including a core (83) formed into a substantially ring shape by connecting both ends of a stretchable cord-like body (46) having rubber-like elasticity and a decoration main body (83) disposed around the core in such a manner so as to abut both ends thereof against each other in a contracted state so as to be reduced in axial length. The accessory making device (1) includes a long rigid holder (5). The holder (5) can retain connecting portions (47M, 47F) on both end sides of the cord-like body (46) with the connecting portions (47M, 47F) of the cord-like body (46) separated from each other, and can be inserted through the decoration main body (83).

7 Claims, 41 Drawing Sheets

(51) Int. Cl.

| | |
|---|---|
| ***B25B 27/14*** | (2006.01) |
| ***A44C 27/00*** | (2006.01) |
| ***B44C 5/00*** | (2006.01) |
| *A45D 8/00* | (2006.01) |

(56) References Cited

U.S. PATENT DOCUMENTS

| | | | | |
|---|---|---|---|---|
| 3,859,897 | A * | 1/1975 | Higa | 493/276 |
| 3,923,265 | A * | 12/1975 | Krueger et al. | 242/578 |
| 4,487,376 | A * | 12/1984 | Compton | 242/423.1 |
| 4,792,102 | A * | 12/1988 | Olson | 242/423.2 |
| 5,456,274 | A * | 10/1995 | Selbee et al. | 132/275 |
| 5,525,176 | A * | 6/1996 | Higa | 156/183 |
| 6,682,035 | B1 * | 1/2004 | Hart | 248/309.2 |
| 7,637,266 | B1 * | 12/2009 | Gibbons | 132/275 |
| 8,484,819 | B2 * | 7/2013 | Hess et al. | 29/271 |
| 2005/0194018 | A1 | 9/2005 | Sonstegard et al. | |
| 2009/0151393 | A1 * | 6/2009 | Spigner et al. | 63/3.1 |

* cited by examiner

ACCESSORY MAKING DEVICE, ACCESSORY MAKING KIT, AND METHOD FOR MAKING ACCESSORY

TECHNICAL FIELD

The present invention relates to an accessory making device, an accessory making kit, and a method for making an accessory which is arranged by disposing a decoration main body formed of a flexible sheet body into a substantially tubular shape in a contracted state so as to be reduced in axial length around a core formed of a stretchable cord-like body having rubber-like elasticity into a substantially ring shape.

BACKGROUND ART

The accessory usually called a "scrunchie," for which a tubular decoration main body made of a sheet body of fabric, lace, or the like is disposed in a contracted state around a ring-shaped core made of a cord-like body having a rubber-like elastic body, is placed in hair or placed around a wrist like a bracelet for enjoyment, and has been popularized also among elementary and junior high school students in recent years.

Also, among elementary and junior high school students, there has been a boom in hand-making original accessories, and there has been provided, for example, a device with which an original badge can be made using a photo or illustration of user's choice (refer to, for example, Patent Literature 1).

Patent Literature 1: JP2004-41309 A

DISCLOSURE OF THE INVENTION

Problems to be Solved by the Invention

However, there has conventionally been no device for simply hand-making an accessory (scrunchie) for which a tubular decoration main body is disposed in a contracted state around a ring-shaped core. Therefore, the present inventors have focused on the point that if there is a device with which even an elementary school child can simply make his/her original scrunchie, a user can easily make his/her desired scrunchie and have an enjoyable time, and have achieved an accessory making device of the present invention as a result of keen study.

It is an object of the present invention to provide an accessory making device which solves the problem described above, and allows even a child to easily make an accessory (scrunchie) for which a tubular decoration main body is disposed in a contracted state around a ring-shaped core.

Means for Solving the Problems

An accessory making device according to the present invention is a making device for making an accessory including:

a core formed into a substantially ring shape by connecting both ends of a stretchable cord-like body having rubber-like elasticity; and a decoration main body formed of a flexible sheet body into a substantially tubular shape so as to cover a periphery of the core across the entire circumference, and disposed around the core in such a manner so as to abut both ends thereof against each other in a contracted state so as to be reduced in axial length, the accessory making device includes a long rigid holder, and the holder can retain connecting portions on both end sides of the cord-like body, with the connecting portions of the cord-like body separated from each other, and can be inserted through the decoration main body.

The accessory making device of the present invention includes a long rigid holder, and by attaching a cord-like body to form a core to the holder in such a manner so as to retain connecting portions disposed on both end sides of the cord-like body while separating the connecting portions from each other, and inserting the holder to which the cord-like body has been attached through a decoration main body, the cord-like body can be inserted through the decoration main body. Subsequently, while the connecting portions of the cord-like body inserted through the decoration main body are interconnected to have the cord-like body in a ring shape, the holder is removed from the decoration main body, and by adjusting the decoration main body so as to cover the periphery of the core (cord-like body) across the entire circumference by hand etc., an accessory can be made. Also, in the accessory making device of the present invention, because the holder has rigidity, even an elementary school child can simply insert the holder to which the cord-like body has been attached through the decoration main body, and by tucking by hand the decoration main body through which the holder has been inserted, the decoration main body is easily caused to contract so as to expose the connecting portions on both end sides of the cord-like body from openings at its both end sides.

Therefore, with the accessory making device of the present invention, even a child can easily make an accessory (scrunchie) for which the tubular decoration main body is disposed in a contracted state around the ring-shaped core.

Moreover, in the accessory making device of the present invention, it is preferable that the holder has a long, substantially linear shape, because the cord-like body can be easily attached to the holder with the connecting portions separated from each other, and further, the holder is easily inserted through the decoration main body.

Further, in the accessory making device of the above-described arrangement, it is preferable that, in the holder, a retaining recess that can be inserted with and retain the connecting portion is formed in such a manner so as to recess an outer surface of the holder, and a recessed groove to insert the cord-like body is formed, in such a manner so as to recess an outer surface of the holder, continuously in an axial direction so as to be able to store the entire length of the cord-like body. When the accessory making device is constructed as such, in a state where the cord-like body is attached, the cord-like body or the connecting portions do not partially project on the outer surface side of the holder, so that the cord-like body and the connecting portions are unlikely to interfere with the decoration main body when passing the holder through the decoration main body, and the holder can be more easily passed through the decoration main body.

Still moreover, it is preferable to provide the accessory making device of the above-described arrangement with a mount portion having a bottom surface that can be placed on a mounting surface, and that the holder is disposed by being supported on the mount portion so as to project from the mount portion.

When the accessory making device is constructed as such, by placing the mount portion in such a manner so as to make the bottom surface contact the mounting surface in making an accessory, the holder is supported on the mount portion, so that it is not necessary to grip and hold the holder when retaining the cord-like body or when inserting the holder through the decoration main body, which makes making an accessory easier.

Particularly, it is preferable to form the holder so as to project upward from the mount portion. In the accessory making device constructed as such, when inserting the holder through the decoration main body in making an accessory, by fitting the decoration main body over the holder so as to insert the upper end of the holder through the opening at one end portion side and pushing down the decoration main body toward the mount portion so as to make the upper end of the holder project from the opening at the other end portion side, the decoration main body can be easily caused to contract so as to be reduced in length dimension while being disposed so as to cover the outer peripheral side of the holder.

Still moreover, in the accessory making device of the above-described arrangement, it is preferable that the making device is provided with a cover portion formed so as to project upward from the mount portion and disposed, with a tip side thereof bent, so as to cover an upper end of the holder from above. In the accessory making device constructed as such, the periphery of the holder disposed so as to project from the mount portion can be protected by the cover portion, so that contact of the upper end side of the holder with a user can be suppressed.

Still moreover, in the accessory making device of the above-described arrangement, it is preferable that the making device is provided with a stopper that is attachable and detachable to the holder, and when attached to the holder, restricts the decoration main body covering the outer peripheral side of the holder from extending such as to be restored from a contracted state. In the accessory making device constructed as such, the contracted state of the decoration main body disposed so as to cover the periphery of the holder can be maintained, by attaching the stopper to the holder, in making an accessory, which is preferable because the operations become easy, including the interconnecting operation of the connecting portions disposed on both ends of the cord-like body and an operation of, for example, inserting the cord-like body through a separate charm.

Moreover, when the making device includes a mount portion, it is preferable to provide the making device with:

a stopper that is disposed in a periphery of the holder and near an end edge of the decoration main body, and restricts the decoration main body covering the outer peripheral side of the holder from extending such as to be restored from a contracted state; and a support shaft that slidably supports the stopper, and that the support shaft has a long shape formed projecting from the mount portion so as to lie substantially along the holder, and the stopper is pivotally supported so as to be disposed near an end edge of the decoration main body in the periphery of the holder, slidable in an axial direction of the support shaft to the support shaft, and turnable in a circumferential direction of the support shaft, and can press an end edge of the decoration main body in a contracted state.

In the accessory making device of the above-described arrangement, because the stopper can be arranged integrally with the mount portion and the holder, loss during use can be prevented. Moreover, because the stopper that presses the end edge of the decoration main body in a contracted state can be moved freely in a direction along the axis direction and a direction along the circumferential direction to the support shaft extending from the mount portion, the stopper, even when being arranged to be supported on the support shaft, is excellent also in operability and can also be easily moved by a child.

Still moreover, in the accessory making device of the above-described arrangement, it is preferable that the holder includes:

a support portion having a long shape projecting from the mount portion, and including on a tip side thereof, a retaining portion that can retain the connecting portion disposed on one end side of the cord-like body; and a slider portion disposed near an end portion on a side closer to the mount portion in the support portion, including a through-hole that allows insertion therethrough of the support portion, and capable of sliding movement on the support portion, and that the slider portion is set to a size not to allow insertion through the decoration main body and includes:

a retaining recess that can retain a connecting portion disposed on one end side of the cord-like body; and a pressing surface that is formed so as to cover a periphery of the support portion substantially perpendicularly to across a center axis of the support portion and substantially on the entire peripheral edge of the through-hole, and can, at the time of sliding movement, press and move an end face of the decoration main body disposed so as to cover the outer periphery of the support portion.

In the accessory making device of the above-described arrangement, by causing sliding movement of the slider portion of the holder on the support portion with the connecting portions of the cord-like body having been inserted through the decoration main body interconnected to have the cord-like body in a ring shape in making an accessory, the ring-shaped cord-like body whose connecting portion is retained on the retaining recess of the slider portion and the decoration main body are moved on the support portion together with the slider portion, so that the support portion can be simply pulled and removed from the decoration main body. Moreover, in the accessory making device of the above-described arrangement, because the slider portion is set to a size that does not allow insertion through the decoration main body, and the pressing surface of the slider portion is arranged to be able to press and move the decoration main body, by gripping and holding only the slider portion and moving it on the support portion, the decoration main body can be easily moved on the support portion, and thus the operation can be simply performed also by a child with small hands.

Still moreover, in the accessory making device of the above-described arrangement, it is preferable that the holder can, on a side closer to the mount portion, retain a connecting portion of the cord-like body so as to make the connecting portion project to a side in a direction substantially perpendicular to an axial direction of the holder portion.

When the accessory making device has the above-described arrangement, the connecting portion on the side closer to the mount portion is retained on the holder so as to project in a direction perpendicular to the axis from the holder, so that when interconnecting the connecting portions of the cord-like body, it becomes possible to interconnect the connecting portions, with the connecting portion retained on the side closer to the mount portion maintained in the retained state with the holder, in such a manner so as to separate only the other connecting portion from the holder, and as compared with when both connecting portions are gripped and held by hand and connected, the connecting operation can be stably performed, and a child can also simply perform the operation.

Still moreover, in the accessory making device of the above-described arrangement, it is preferable that the holder is detachably attached to the mount portion, because the holder can be stored in a compact manner when not used.

Moreover, in the accessory making device, the holder may be extensible, and also in the case of such an arrangement, the holder can be stored in such a manner so as to reduce the length thereof when not used, and can thus be stored in a compact manner.

As an accessory making kit from which an accessory can be made by using the accessory making device of the present invention, one including the following can be used:

the accessory making device;

a core material including the cord-like body and the pair of connecting portions disposed on both end sides of the cord-like body and connectable to each other; and a decoration main body material made into a substantially tubular shape opened at both end sides and having a length dimension set longer than that of the core material, for forming the decoration main body.

Further, as the accessory making kit, it is concretely preferable that the pair of connecting portions are connected to each other by bayonet coupling.

When the accessory making kit of the above-described arrangement is used, in making an accessory, at the time of connection of the connecting portions projecting from both ends of the decoration main body material to form the decoration main body, by moving the connecting portions so as to approximate each other and moving one connecting portion to the other connecting portion such as twisting it by hand (so as to rotate it in the circumferential direction), the connecting portions can be interconnected, so that even a small child can easily perform the connecting operation of the connecting portions. Moreover, in the accessory making kit of the above-described arrangement, because the connecting portions are interconnected in such a manner so as to rotate one connecting portion in the circumferential direction on the other connecting portion, even when the connecting portions are pulled so as to be separated from each other in the longitudinal direction of the cord-like body, the connecting portions are not released from the connected state, and an unexpected release from the connection of the connecting portions while a made accessory is used can also be prevented.

Moreover, in the accessory making kit of the above-described arrangement, it is preferable to form a catching hook on at least one of the pair of connecting portions, and provide a ring portion that can be caught on the catching hook on at least one end portion side of the decoration main body material.

When the accessory making kit has the above-described arrangement, at least one edge portion side of the decoration main body (decoration main body material) can be kept connected to the connecting portion of the core, so that the decoration main body is unlikely to largely shift to the core when a made accessory is used. Therefore, exposure of the core from the decoration main body can be prevented, and a made accessory has a good appearance.

Moreover, a method for making an accessory of the present invention is a method for making an accessory including:

a core formed into a substantially ring shape by connecting both ends of a stretchable cord-like body having rubber-like elasticity; and a decoration main body formed of a flexible sheet body into a substantially tubular shape so as to cover a periphery of the core across the entire circumference, and disposed around the core in a contracted state so as to be reduced in axial length, in such a manner so as to abut both ends against each other, and the accessory is made, by use of a long rigid holder, first, by attaching the cord-like body to the holder, with the cord-like body being in a substantially linear shape so as to separate connecting portions on both end sides from each other, in such a manner so as to respectively retain the connecting portions on the holder, then, disposing the decoration main body, in a contracted state so as to be reduced in axial length, on the outer peripheral side of the holder in such a manner so as to make the connecting portions disposed on both end sides of the cord-like body project from openings at both end sides of the decoration main body, and connecting the connecting portions on both end sides to each other to form the cord-like body into a ring shape, followed by removal of the decoration main body from the holder.

In the method for making an accessory of the present invention, a long rigid holder is used, and by attaching a cord-like body to form a core to the holder, with the cord-like body being in a substantially linear shape so as to separate connecting portions on both end sides from each other, in such a manner so as to respectively retain the connecting portions, and inserting the holder to which the cord-like body has been attached through a decoration main body, the cord-like body can be inserted through the decoration main body. Subsequently, while the connecting portions of the cord-like body inserted through the decoration main body are interconnected to have the cord-like body in a ring shape, the holder is removed from the decoration main body, and by adjusting the decoration main body so as to cover the periphery of the core (cord-like body) across the entire circumference by hand etc., an accessory can be made. Also, in the method for making an accessory of the present invention, because the holder has rigidity, even an elementary school child can simply insert the holder to which the cord-like body has been attached through the decoration main body, and by tucking by hand the decoration main body through which the holder has been inserted, the decoration main body is easily caused to contract so as to expose the connecting portions on both end sides of the cord-like body from openings at its both end sides.

BEST MODE FOR CARRYING OUT THE INVENTION

Figure 1:
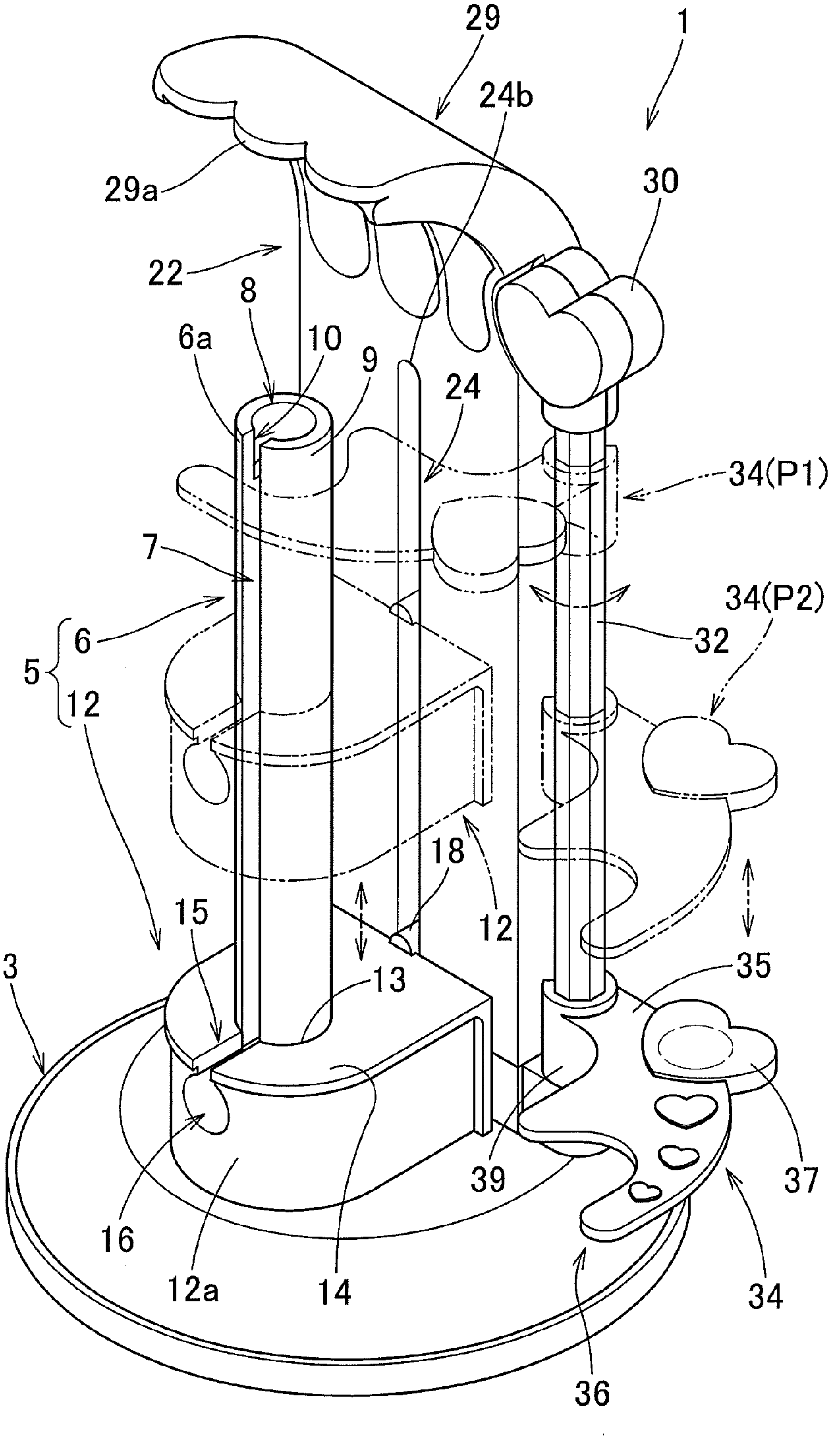
FIG. 1 is a perspective view showing an accessory making device which is an embodiment of the present invention.
Figure 2:
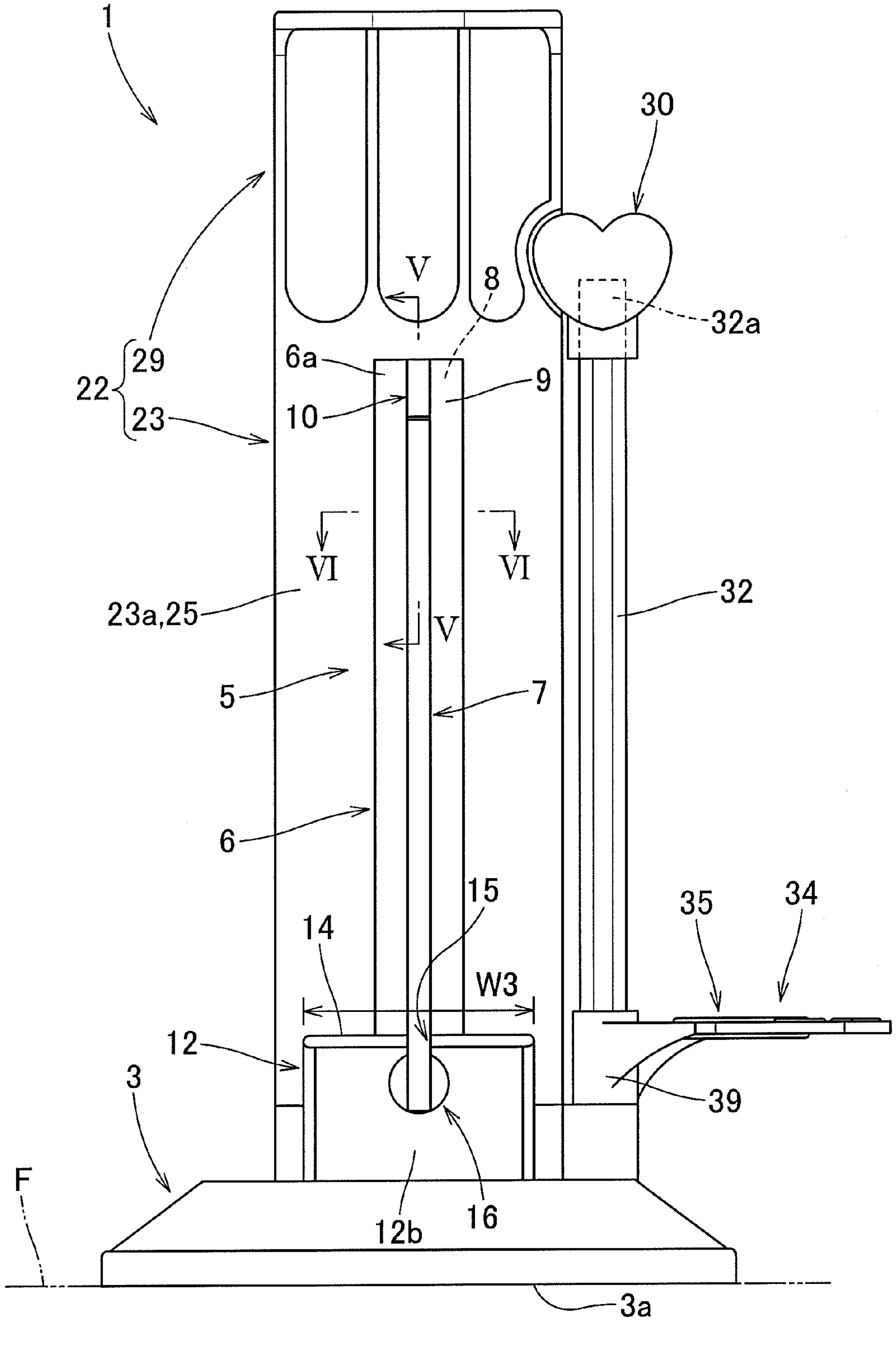
FIG. 2 is a front view of the accessory making device of the embodiment.
Figure 3:
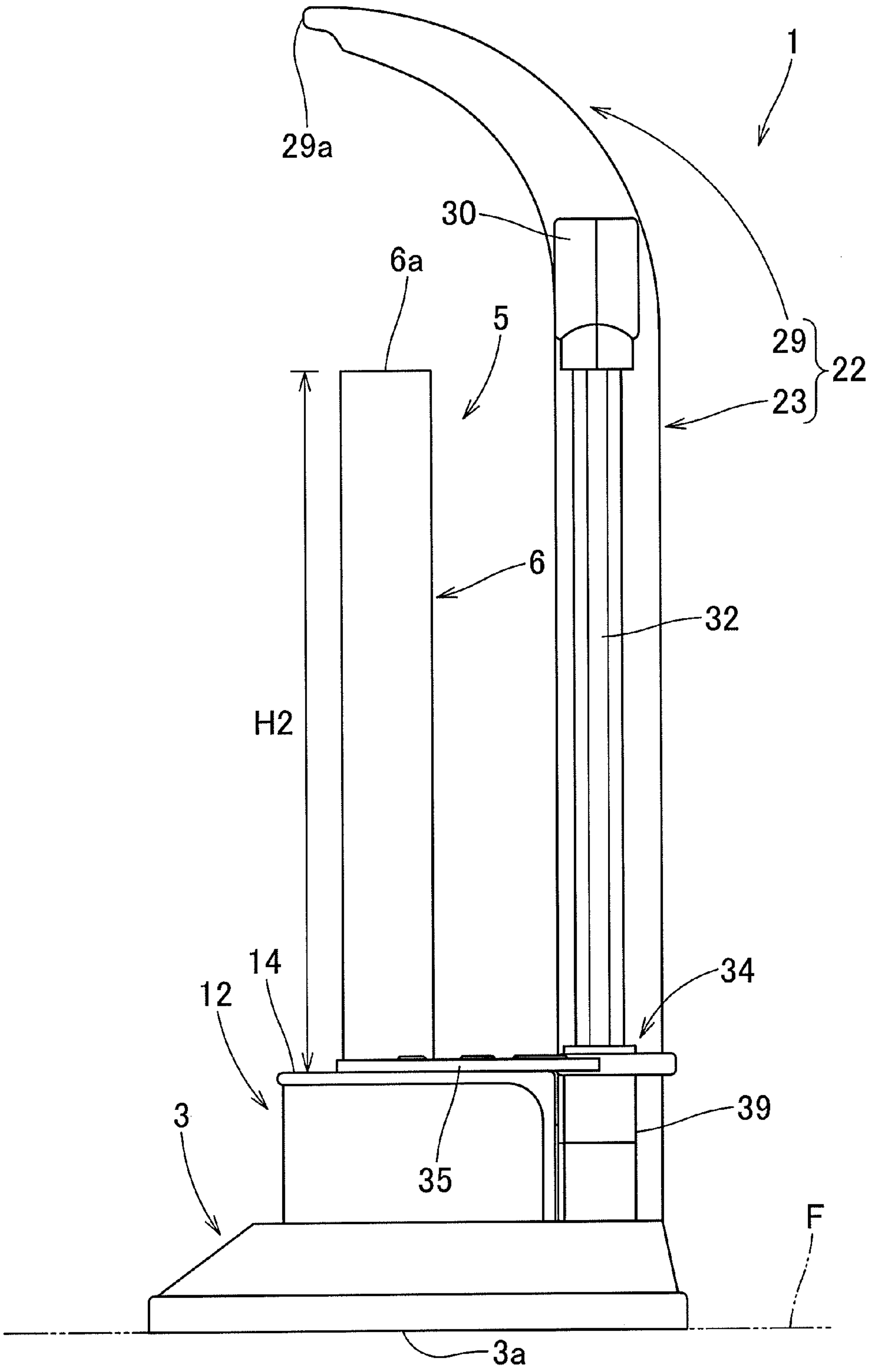
FIG. 3 is a side view of the accessory making device of the embodiment.

Hereinafter, an embodiment of the present invention will be described based on the drawings. An accessory making device (hereinafter, abbreviated to simply a "making device") 1 of the embodiment, as shown in FIGS. 1 to 3, includes a mount portion 3, a holder 5 disposed so as to project from the mount portion 3, a cover portion 22 disposed so as to cover the holder 5, a stopper 34 that can be disposed around a support portion 6 to be described later of the holder 5, and a support shaft 32 for supporting the stopper 34. The making device 1 of the embodiment is entirely made of a synthetic resin except connection means such as screws (not shown) that connect base materials to form the respective parts.

In the embodiment, unless otherwise noted, the front and rear, left and right, and up-and-down directions of the making device 1 of the embodiment will be described by, in the making device 1 with a bottom surface 3*a* of the mount portion 3 placed on a mounting surface F substantially parallel to a horizontal plane, as shown in FIGS. 2 and 3, referring to the side of the cover portion 22 as the rear, and the side of the holder 5 as the front.

The mount portion 3 is, in the case of the embodiment, provided in a substantially semicircular plate shape having at its lower surface side a bottom surface 3*a* that can be placed on the mounting surface F (refer to the alternate long and two short dashed lines of FIGS. 2 and 3). Specifically, the mount portion 3 is, as shown in FIGS. 1 to 3, arranged in an upwardly tapered manner as a semicircular truncated cone shape.

The holder 5 is, in the case of the embodiment, disposed at a position to be substantially the middle in the left and right direction of the mount portion 3 so as to be supported by the mount portion 3, and as shown in FIGS. 1 to 4, includes a long support portion 6 projecting from the mount portion 3 and a slider portion 12 disposed around the support portion 6. Moreover, there are formed in the holder 5 two retaining portions (upper retaining recess 8, lower retaining recess 16) that can retain connecting portions 47 (47M, 47F) on both end sides of a cord-like body 46 in a core material 45 (core 82), respectively, with the connecting portions 47 (47M, 47F) separated from each other.

Figure 4:
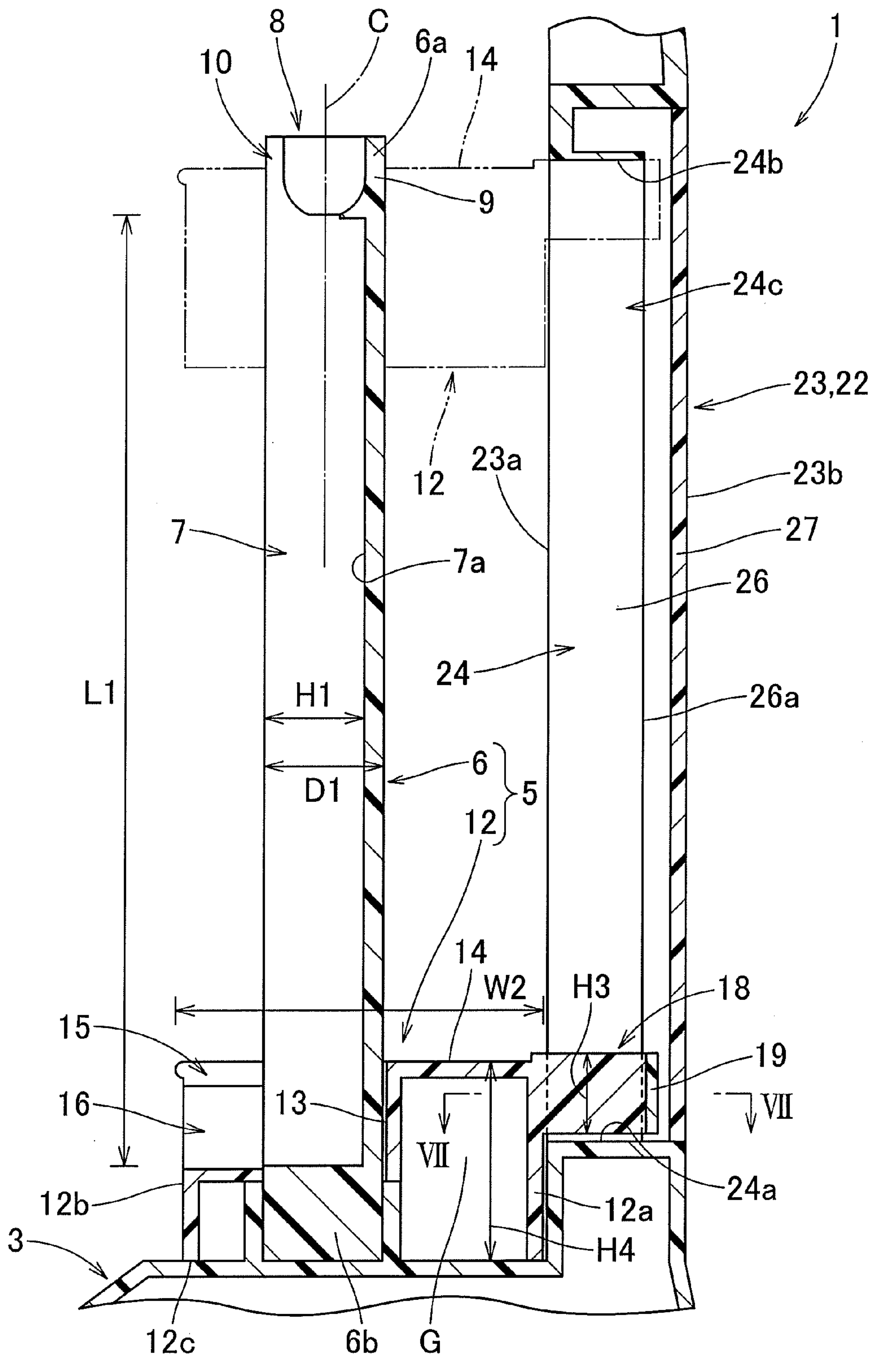
FIG. 4 is a partially enlarged longitudinal sectional view showing a section of a holder and a cover portion in the accessory making device of the embodiment.
Figure 6:
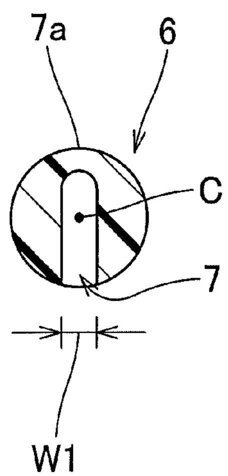
FIG. 6 is a partially enlarged sectional view of a section taken along a VI-VI line of FIG. 2.

The support portion 6 is connected at the side of its lower end 6*b* to the mount portion 3 and provided in a long, substantially linear shape, and formed projecting upward from the mount portion 3 so as to lie substantially in the up-and-down direction. The support portion 6 is, in the case of the embodiment, provided in a substantially columnar shape whose axial direction lies substantially in the up-and-down direction. At a front surface side of the support portion 6, a recessed groove 7 that can store the cord-like body 46 of the core material 45 (core 82) of an accessory S1 is formed in such a manner so as to recess the front surface of the support portion 6 toward the rear. The recessed groove 7 is, as shown in FIGS. 1, 2, and 4, formed at the middle in the left and right direction in the front surface of the support portion 6 continuously in the axial direction (up-and-down direction) of the support portion 6. Specifically, the recessed groove 7 is formed across substantially the entire region in the up-and-down direction, except a region of the upper retaining recess 8 to be described later formed on the side of an upper end 6*a* of the support portion 6. The recessed groove 7 has an opening width dimension W1 (refer to FIG. 6) set to a dimension that allows insertion therethrough of the cord-like body 46 in the core material 45 (core 82). In the case of the embodiment, the opening width dimension W1 of the recessed groove 7 is set to approximately 1.5 times the diameter of the cord-like body 46. Moreover, the recessed groove 7 is arranged to have an up-and-down length dimension L1 (refer to FIG. 4) made substantially coincident with a length dimension L2 (refer to FIG. 14) of the cord-like body 46 in an unstretched state (linearly developed state without causing a stretch). Further, the recessed groove 7 is formed so as to have a tip (bottom surface 7*a*) of the recess located in the rear further than a center axis C of the support portion 6 (refer to FIGS. 4 and 6). In the case of the embodiment, the depth H1 (distance in the front and rear direction from the opening end to the bottom surface 7*a*, refer to FIG. 4) of the recessed groove 7 is set to approximately ⅘ of an outer diameter dimension D1 (refer to FIG. 4) of the support portion 6. Therefore, in the making device 1 of the embodiment, even if a cord-like body 46 having a longer length dimension in an unstretched state than when it was new because of being worn out due to long-term use is used, the cord-like body 46 can be stored in a curved state inside the recessed groove 7 when the core material 45 (core 82) is attached to the holder 5, so that the entire body is easily stored inside the recessed groove 7, which can prevent the cord-like body 46 from projecting forward of the support portion 6. Of course, in the making device 1 of the embodiment, even a core material including a cord-like body having a length dimension in an unstretched state in a brand-new condition set larger than that of the recessed groove is used, the core material can be attached to the holder, with the cord-like body suppressed from projecting forward of the support portion, and entirely stored inside the recessed groove.

Figure 5:
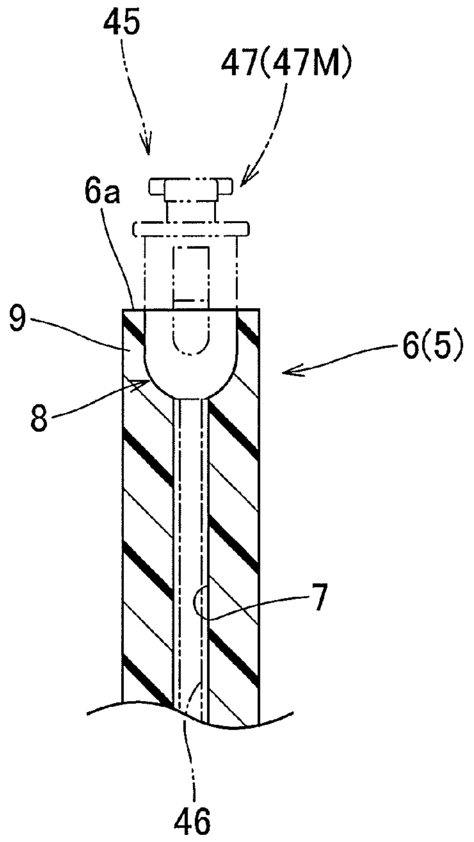
FIG. 5 is a partially enlarged sectional view of a section taken along a V-V line of FIG. 2.
Figure 21:
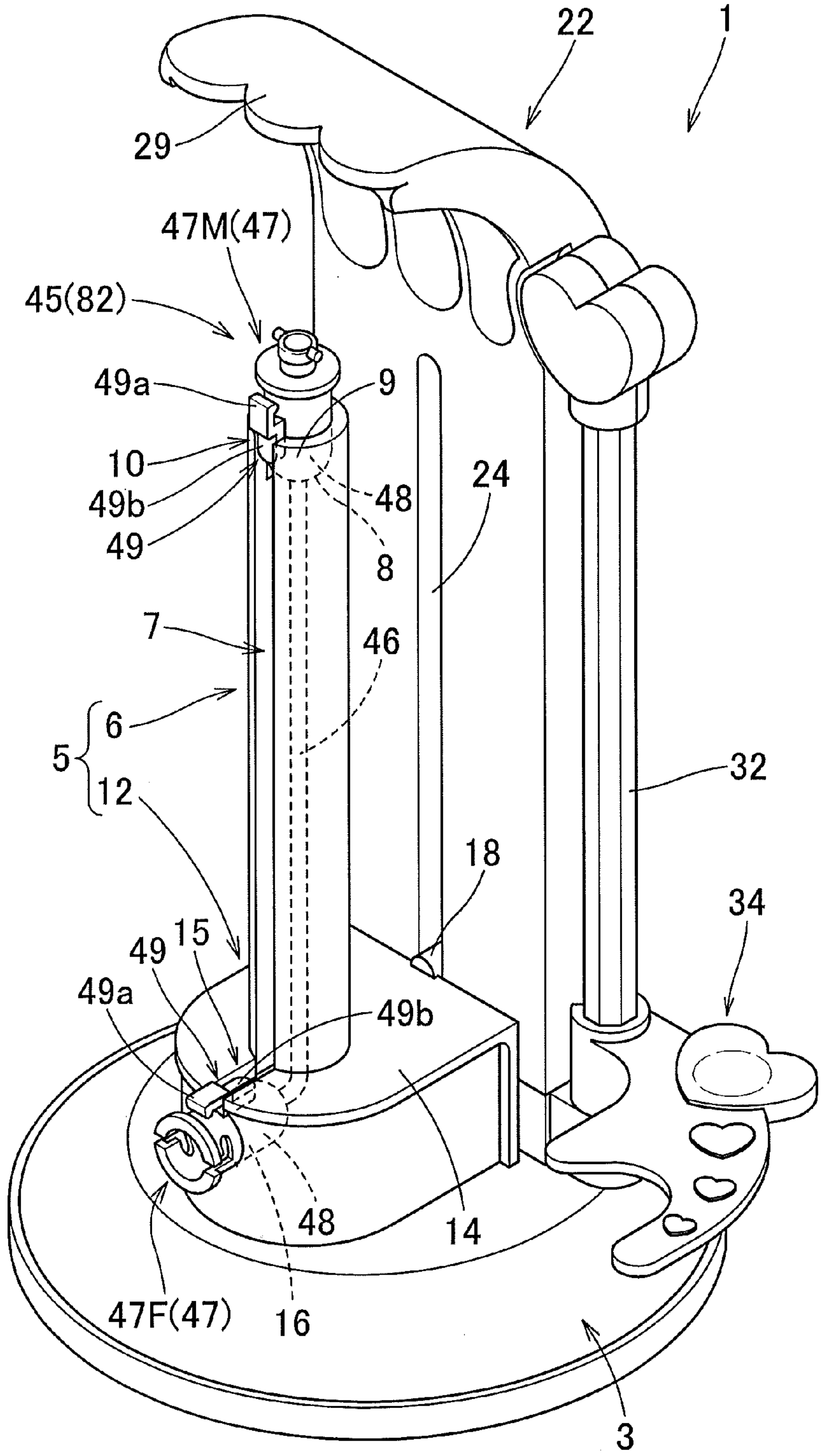
FIG. 21 is a view for explaining a step of making an accessory by using the accessory making device of the embodiment, and is a perspective view showing a state of a core material attached to a holder.
Figure 22:
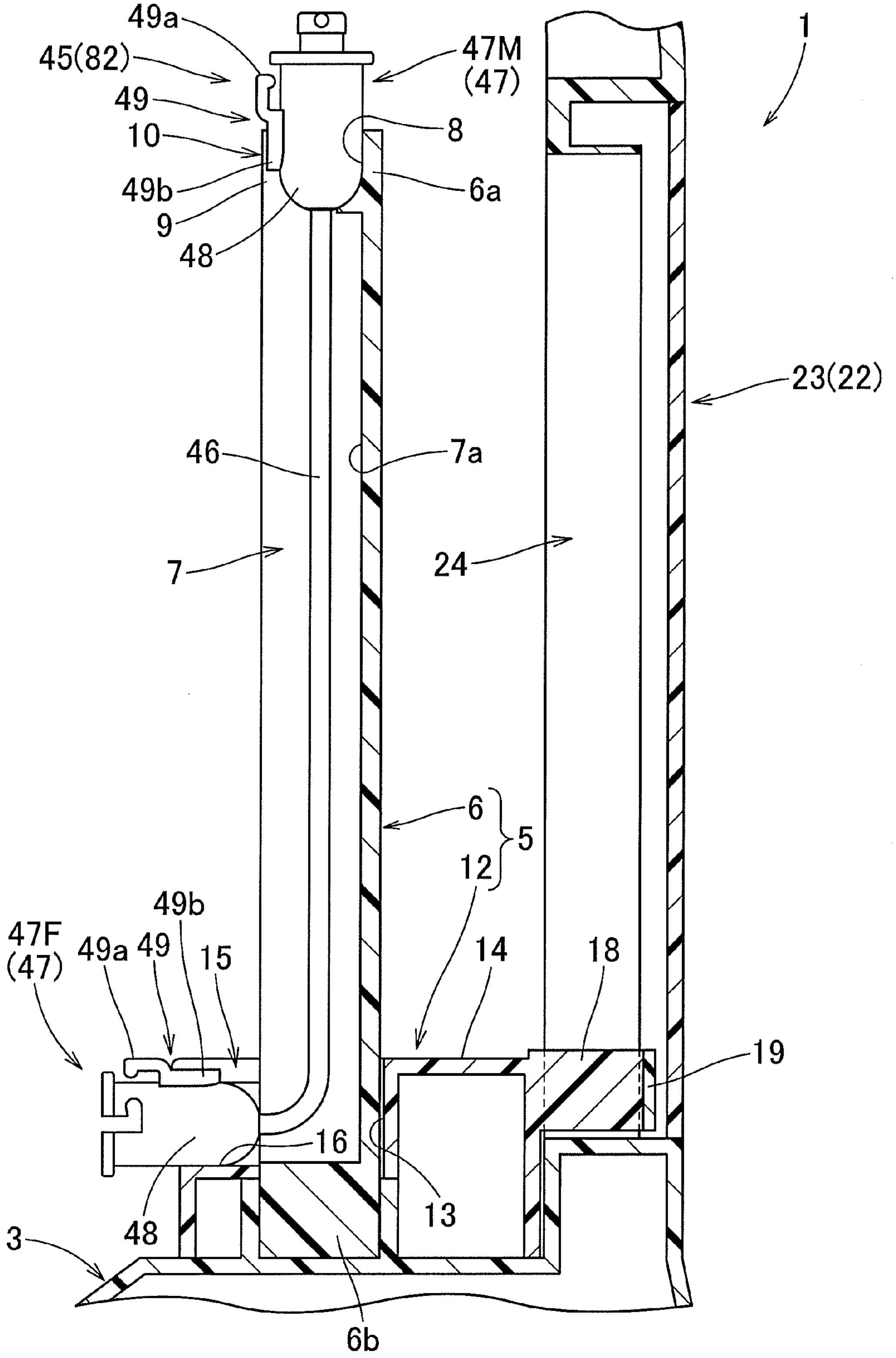
FIG. 22 is a view for explaining a step of making an accessory by using the accessory making device of the embodiment, and is a partially enlarged longitudinal sectional view showing a state of a core material attached to a holder.

At the tip (upper end 6*a*) side of the support portion 6, an upper retaining recess 8 (retaining portion) that can retain the connecting portion 47 (47M, 47F) disposed on one end side of the cord-like body 46 in the core material 45 (core 82) is formed. The upper retaining recess 8 is formed so as to recess the support portion 6 at its upper surface side and open the upside, in order to allow insertion from above and retaining of a base portion 48 to be described later disposed at a root portion side of the connecting portion 47. In the case of the embodiment, the upper retaining recess 8 is formed opened in a substantially U-shape in section to match the outer shape of the base portion 48 (refer to FIG. 5). Moreover, at a front surface side of a peripheral wall portion 9 that forms a peripheral edge of the upper retaining recess 8, as shown in FIGS. 1 and 2, a cut-away portion 10 to be continuous from the recessed groove 7 is formed, and the upper retaining recess 8 communicates with the recessed groove 7 via the cut-away portion 10 (refer to FIG. 4). The cut-away portion 10 is arranged, in such a manner so as to have an opening width dimension coincident with that of the recessed groove 7, by cutting away a region at the front surface side of the peripheral wall portion 9 to form a peripheral edge of the upper retaining recess 8 across the entire region in the up-and-down direction, and is arranged so as to allow insertion therethrough of the side of a root portion 49*b* of a catching hook 49 formed so as to project to the outer peripheral side from the base portion 48 of the connecting portion 47 (refer to FIGS. 21 and 22). In the case of the embodiment, the connecting portion 47 (47M, 47F) of the core material 45 is retained on the upper retaining recess 8 in such a manner so as to insert from above the base portion 48 into the upper retaining recess 8 while inserting the root portion 49*b* side of the catching hook 49 formed so as to project from the base portion 48 into the cut-away portion 10. In addition, at the time of retaining of the connecting portion 47 onto the upper retaining recess 8, the catching hook 49 is, as shown in FIG. 22, disposed so as to make its tip 49*a* project upward further than the peripheral wall portion 9 (upper retaining recess 8).

The slider portion 12 is, as shown in FIGS. 2 to 4, in such a manner so as to bring the side of its lower end 12*c* into contact with the mount portion 3, disposed near the end portion (lower end 6*b*) on a side closer to the mount portion 3 in the support portion 6, and in the case of the embodiment, the slider portion 12 has an outer shape (planar shape) viewed from above provided in a flattened pillar shape as a substantial D-shape whose linear rear edge lies substantially in the left and right direction (refer to FIG. 1). Also, the slider portion 12 is arranged, at a position slightly ahead of the middle, having a through-hole 13 (refer to FIG. 4) that penetrates in the up-and-down direction so as to allow insertion therethrough of the support portion 6, so as to be capable of sliding movement (up-down motion) on the support portion 6. The slider portion 12 is arranged so its rear wall 12*a* as to lie in the vertical direction and lie in the left and right direction in order to make it lie along a front surface 23*a* of a rear side portion 23 to be described later of the cover portion 22, and the rear wall 12*a* of the slider portion 12 is disposed close to the front surface 23*a* of the rear side portion 23 of the cover portion 22 (refer to FIG. 4). The slider portion 12 has a width dimension W2 (refer to FIG. 4) in the front and rear direction set to approximately four times the outer diameter dimension D1 of the support portion 6, and has a width dimension W3 (refer to FIG. 2) in the left and right direction set to approximately 2.7 times the outer diameter dimension D1 of the support portion 6. Moreover, in the case of the embodiment, the slider portion 12 is formed to a size not to allow its insertion through a tubular decoration main body 83 (decoration main body material 62) to form an accessory S1. In the case of the embodiment, the slider portion 12 has a width dimension W2 in the front and rear direction and a width dimension W3 in the left and right direction that are respectively set larger than the inner diameter dimension of a decoration main body cloth 63 of the decoration main body material 62.

Further, in the embodiment, the slider portion 12 has the through-hole 13 through which the support portion 6 is inserted provided at a position slightly ahead of the middle, and has an upper surface 14 disposed across substantially the entire peripheral edge of the through-hole 13 to form a pressing surface that can, at the time of sliding movement in making of an accessory S1, press and move an end face of the decoration main body 83 (decoration main body material 62) that covers the outer periphery of the support portion 6. The upper surface 14 of the slider portion 12 is, as shown in FIGS. 2 to 4, formed so as to lie substantially along a horizontal plane (so as to be substantially perpendicular to the center axis C of the support portion 6), and disposed so as to cover the periphery of the support portion 6 across substantially the entire region except a part to be the front side of the recessed groove 7. Moreover, at the upper surface 14 in the slider portion 12, a cut-away portion 15 to cut away a region on the front side of the recessed groove 7 in the support portion 6 across the entire region in the front and rear direction so as to be continuous to the recessed portion 7 is formed (refer to FIGS. 1, 2, and 4). The cut-away portion 15 is formed, with its opening width dimension coincident with that of the recessed groove 7, so as to communicate with the lower retaining recess 16 to be described later, and is a part to pass therethrough, the root portion 49*b* side of the catching hook 49 projecting to the outer peripheral side from the base portion 48 of the connecting portion 47, when the connecting portion 47 (47M, 47F) disposed on the other end side of the cord-like body 46 in the core material 45 (core 82) is retained on the lower retaining recess 16 (refer to FIGS. 21 and 22).

At the side of a front surface 12*b* of the slider portion 12, a lower retaining recess 16 (retaining portion) that can retain the connecting portion 47 (47M, 47F) disposed on the other end side of the cord-like body 46 in the core material 45 is formed. The lower retaining recess 16 is formed at a position that is the middle in the left and right direction and slightly below the upper surface 14 of the slider portion 12, and formed in such a manner so as to recess the slider portion 12 at its front surface 12*b* side and open the front, in order to allow insertion from the front and retaining of a base portion 48 to be described later disposed at a root portion side of the connecting portion 47. In the case of the embodiment, the lower retaining recess 16 is, as shown in FIGS. 1 and 2, a substantially circular shape in section to allow insertion thereinto of the base portion 48, is formed to penetrate up to the through-hole 13 through which the support portion 6 is inserted (refer to FIG. 4). That is, the lower retaining recess 16, as shown in FIG. 4, communicates with the recessed groove 7 of the support portion 6. Moreover, the lower retaining recess 16 communicates also with the cut-away portion 15 formed by providing a cut-away in the upper surface 14 of the slider portion 12. Also, in the case of the embodiment, the connecting portion 47 is retained to the lower retaining recess 16 in such a manner so as to insert the root portion 49*b* side of the catching hook 49 formed so as to project from the base portion 48 through the cut-away portion 15 formed in such a manner so as to provide a cut-away in the upper surface 14 of the slider portion 12 while inserting from the front the base portion 48 into the lower retaining recess 16. Also, the connecting portion 47 (47F) is, as shown FIG. 22, retained on the lower retaining recess 16 so as to project forward, a side substantially perpendicular to the axial direction (up-and-down direction) of the support portion 6. At the time of retaining of the connecting portion 47 onto the lower retaining recess 16, the catching hook 49 is disposed so as to make its tip 49*a* project forward further than the slider portion 12 (refer to FIG. 22).

Figure 7:
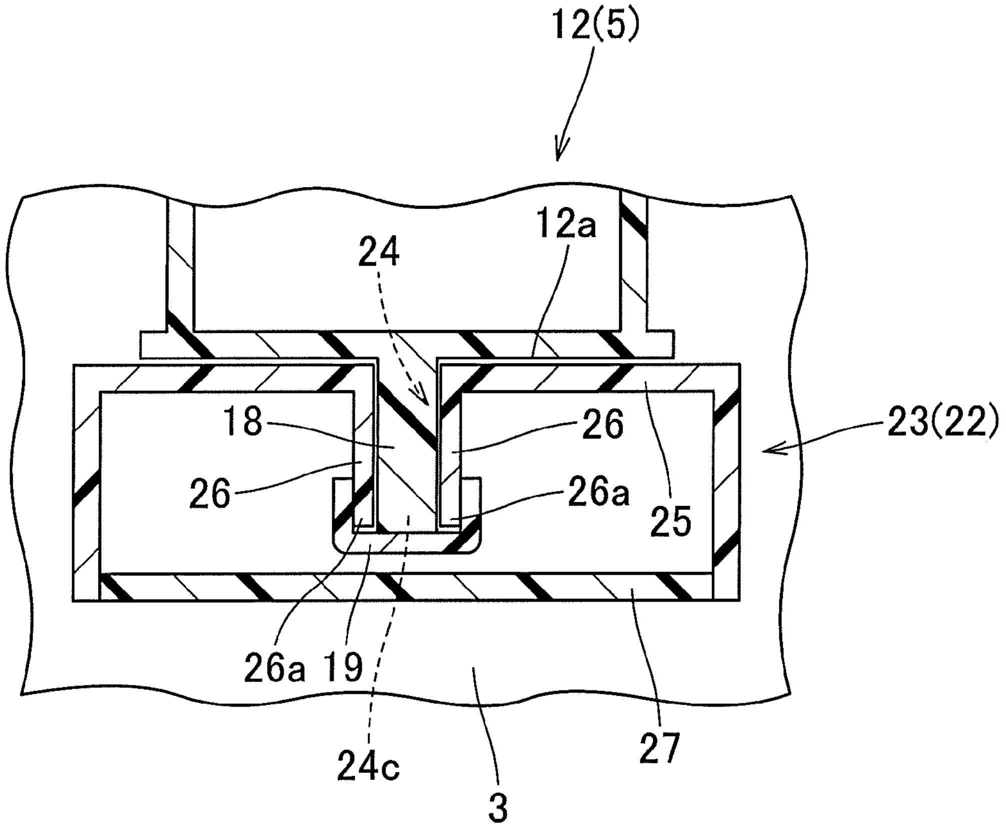
FIG. 7 is a partially enlarged sectional view of a section taken along a VII-VII line of FIG. 4.

Moreover, near the upper end at the middle in the left and right direction of the rear wall 12*a* in the slider portion 12, a guide protrusion 18 that is slidable on a guide groove portion 24 formed in the rear side portion 23 of the cover portion 22 is formed projecting rearward (refer to FIGS. 4 and 7). The guide protrusion 18 is, in a substantially rectangular plate shape to allow insertion into the guide groove portion 24, disposed at an upper end side of the slider portion 12, and is arranged to have an up-and-down width dimension H3 (refer to FIG. 4) that is approximately ⅙ of the up-and-down width dimension H4 (refer to FIG. 4) of the slider portion. Also, the slider portion 12 is, by sliding the guide protrusion 18 along the guide groove portion 24, suppressed from rotation in the circumferential direction of the support portion 6, and is made slidable up and down on the support portion 6. Moreover, in the case of the embodiment, the slider portion 12 is arranged so that, at the time of upward movement, it can be prevented from coming off the support portion 6 by bringing the guide protrusion 18 into contact with an upper edge 24*b* of the guide groove portion 24 (refer to the alternate long and two short dashed line of FIG. 4). Concretely, in the case of the embodiment, the slider portion 12 is, in a state where the guide protrusion 18 is in contact with the upper edge 24*b* of the guide groove portion 24, disposed so as to locate the upper surface 14 above the upper end of the recessed groove 7 and at substantially the middle in the up-and-down direction of the peripheral wall portion 9 to form the upper retaining recess 8.

In the case of the embodiment, the guide groove portion 24 along which the guide protrusion 18 is slid is arranged so as to open, inside the rear side portion 23 of the cover portion 22 formed hollow as to be described later, also the rear side (refer to FIGS. 4 and 7), and the guide protrusion 18 includes a retaining piece 19 formed, so that it can be retained on the peripheral edge (rear ends 26*a*, 26*a* of side wall portions 26, 26 to be described later) of a rear side opening 24*c* in the guide groove portion 24, in a substantially flat plate shape lying in the left and right direction so as to project to the left and right at the rear end side. The retaining piece 19 is, as shown in FIG. 4, formed across the entire region in the up-and-down direction of the guide protrusion 18, and when described in detail, in the case of the embodiment, the retaining piece 19 is bent so as to turn its tip side forward in order to wrap the rear ends 26*a* of the side wall portions 26 to form the guide groove portion 24 across substantially the entire circumference (refer to FIG. 7).

Figure 8:
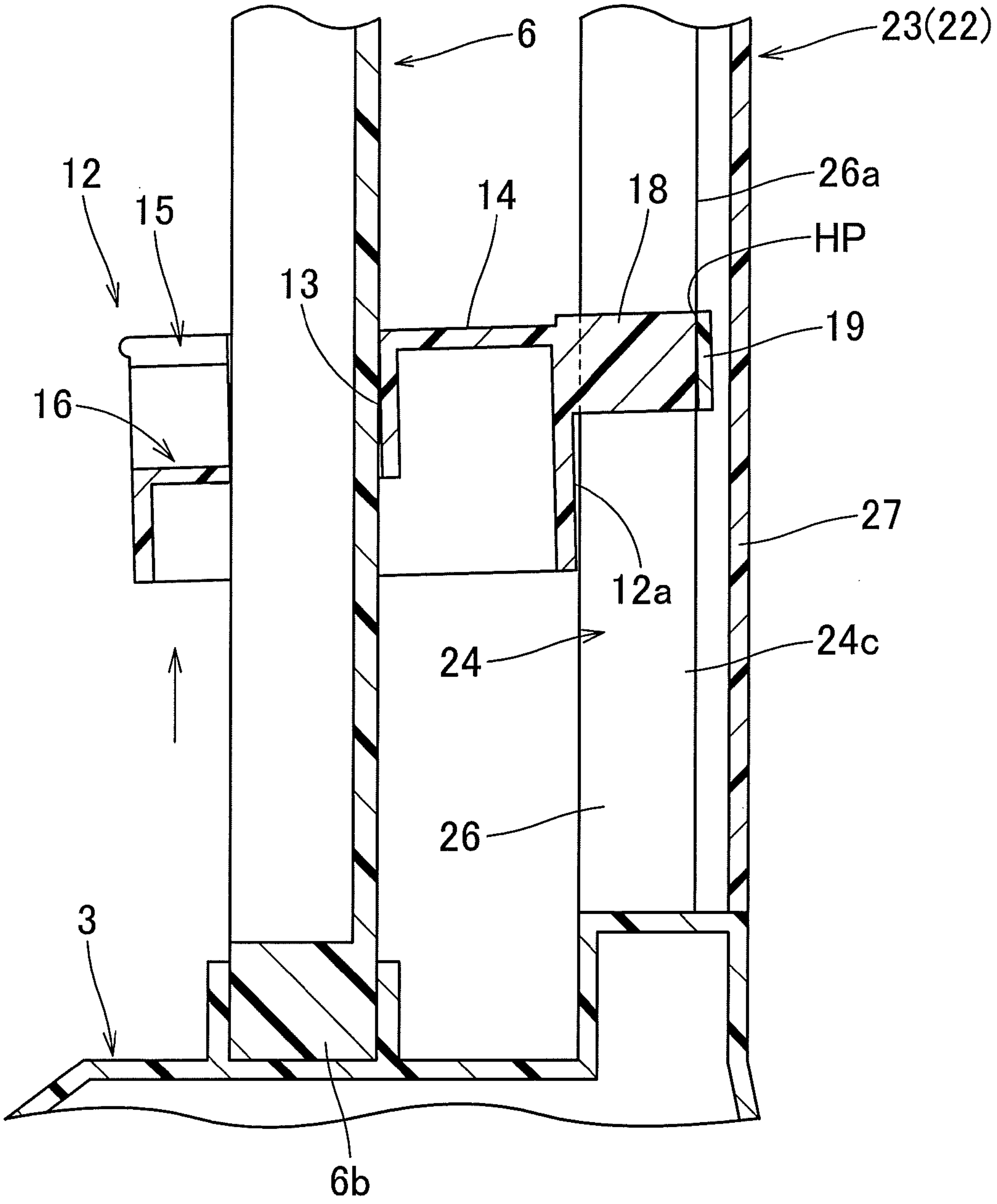
FIG. 8 is a partially enlarged longitudinal sectional view of a state of a slider portion moved upward in the accessory making device of the embodiment.

Also, in the case of the embodiment, the guide protrusion 18 is formed in only a region on the upper end side of the slider portion 12, and the slider portion 12 has a center of gravity G located ahead of the rear side portion 23 of the cover portion 22 and below the guide protrusion 18 (refer to FIG. 4). Therefore, the slider portion 12, when moved to slide upward, takes a mode of inclination so as to locate its front edge side below a horizontal plane, and thus when a user's hand is released from the slider portion 12 having been moved upward, the slider portion 12 is, as shown in FIG. 8, disposed slightly inclined in the front and rear direction with respect to the horizontal direction so as to bring the upper end of the retaining piece 19 in the guide protrusion 18 into contact with the peripheral edge (the rear end 26*a* of the side wall portion 26) of the rear side opening 24*c* of the guide groove portion 24. And, the slider portion 12 is prevented from falling freely by a frictional force produced at a contact part HP (refer to FIG. 8) between the upper end of the retaining piece 19 and the peripheral edge of the rear side opening 24*c* of the guide groove portion 24. As a result, in the embodiment, even when a user's hand is released from the slider portion 12 that has once been moved upward, the slider portion 12 can be prevented from downward movement to fall freely along the support portion 6. The frictional force to be produced at the contact part HP between the slider portion 12 and the rear side portion 23 in the cover portion 22 is slight, and even a less powerful child can easily move the slider portion 12 downward by pressing the slider portion 12 downward with a hand.

In the making device 1 of the embodiment, for ease of catching by fingers in operation, the slider portion 12 is formed so as to make the peripheral edge of a region at the upper surface 14 side project slightly outward (refer to FIGS. 1 to 3). Still moreover, in the case of the embodiment, the slider portion 12 is formed hollow for a reduction in weight (refer to FIGS. 4 and 7).

The cover portion 22 is formed so as to project upward from the mount portion 3, and in the case of the embodiment, as shown in FIGS. 1 to 3, includes a rear side portion 23 that projects upward from a rear edge side of the mount portion 3 so as to cover the holder 5 from behind and an upper side portion 29 that projects obliquely forward and upward while curving from an upper end side of the rear side portion 23 and covers the holder 5 from above. The rear side portion 23 is disposed, in a rectangular plate shape wider in the left and right direction than the slider portion 12, with its width direction aligned substantially in the left and right direction, is formed so as to extend substantially in the up-and-down direction, and is arranged so as to extend up to slightly above the upper end 6*a* of the support portion 6 and cover the holder 5 (support portion 6) from behind across the entire region. The upper side portion 29 is formed continuously from the rear side portion 23, and is arranged so as to curve obliquely forward and upward from the upper end of the rear side portion 23 in a substantially arc shape when viewed laterally. In the case of the embodiment, a tip 29*a* of the upper side portion 29 is arranged so as to project slightly forward of the upper end 6*a* of the support portion 6 when viewed laterally (refer to FIG. 3).

Moreover, in the rear side portion 23, as shown in FIGS. 1 and 4, the guide groove portion 24 along which the guide protrusion 18 formed on the slider portion 12 can be slid is formed. The guide groove portion 24 is formed so as to recess the front surface 23*a* of the rear side portion 23 toward the rear, and is formed, at substantially the middle in the left and right direction of the rear side portion 23, continuously substantially in the up-and-down direction. Specifically, the guide groove portion 24 is formed so as to dispose its lower edge 24*a* at a position slightly below the lower end 12*c* of the slider portion 12 when the guide protrusion 18 is brought into contact, and dispose its upper edge 24*b* at a position which is slightly below the upper end 6*a* of the support portion 6 and where the upper surface 14 of the slider portion 12 is above the recessed groove 7 when the guide protrusion 18 is brought into contact (refer to FIG. 4). Moreover, in the case of the embodiment, the rear side portion 23 of the cover portion 22 is, as shown in FIGS. 4 and 7, formed hollow for a reduction in weight, and the guide groove portion 24 is formed by a gap between the side wall portions 26, 26 disposed substantially parallel to each other substantially in the front and rear direction in such a manner so as to bend rearward edge portions of a substantially plate-shaped front side wall portion 25 that forms a region at a front surface side in the rear side portion 23. Also, the guide groove portion 24 (side wall portions 26, 26) is not closed at its rear end side, and is formed opened within the region of the rear side portion 23 in such a manner so as to provide a gap with a cover plate 27 that forms the side of a rear surface 23*b* of the rear side portion 23 and is separated from the front side wall portion 25.

Figure 12:
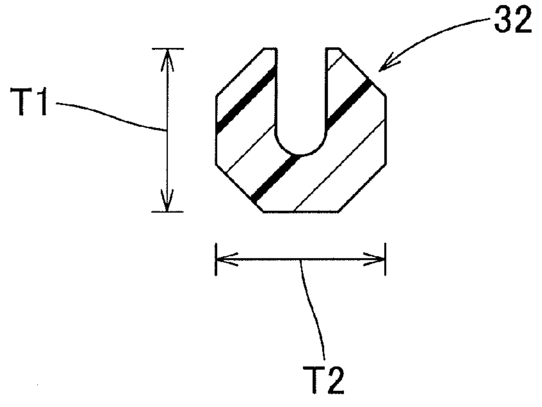
FIG. 12 is an enlarged transverse sectional view of a support shaft to be used for the accessory making device of the embodiment.
Figure 13A:
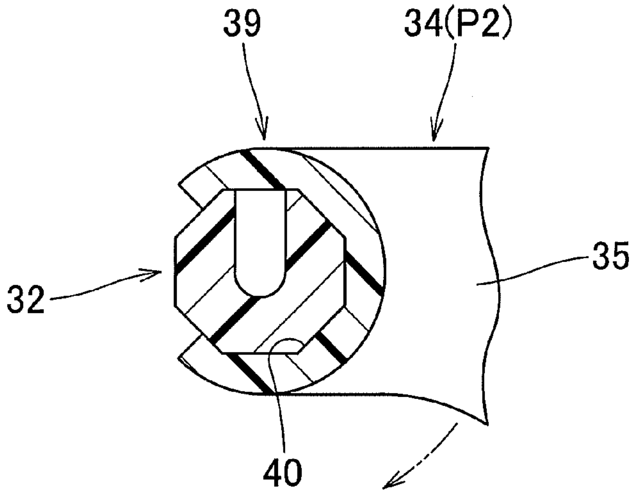
FIG. 13 includes partially enlarged sectional views showing a state of a stopper rotated in the circumferential direction of the support shaft in the accessory making device of the embodiment.

The support shaft 32 for supporting the stopper 34 that can be disposed around the support portion 6 in the holder 5 is formed projecting from the mount portion 3, as shown in FIGS. 1 to 3, on the left side of the rear side portion 23 of the cover portion 22 so as to lie substantially along the support portion 6 and substantially in the up-and-down direction. In the case of the embodiment, the support shaft 32 is, as shown in FIG. 12, in a long, substantially octagonal prism shape having a substantially octagonal shape as a sectional shape. Moreover, in the case of the embodiment, the support shaft 32 is arranged so as not to be exposed outside at its upper end 32 by being covered with a decorative cover 30 formed so as to project to the left side from the vicinity of the upper end of the rear side portion 23 of the cover portion 22 (refer to FIGS. 1 to 3). Moreover, the support shaft 32 is arranged to slidably support the stopper 34 in an engaged state with an attaching base portion 39 formed in the stopper 34 (refer to FIG. 13), and has a sectional shape that is not a regular octagonal shape but an octagonal shape for which a regular octagon is slightly flattened. Specifically, the support shaft 32 of the embodiment has a section whose width dimension T1 in the front and rear direction is set slightly smaller than a width dimension T2 in the left and right direction (refer to FIG. 12). In the case of the embodiment, the support shaft 32 is arranged, for a reduction in weight, with a cut-away in part (in the case of the embodiment, its rear surface side) across substantially the entire region in the up-and-down direction (refer to FIG. 12).

Figure 9:
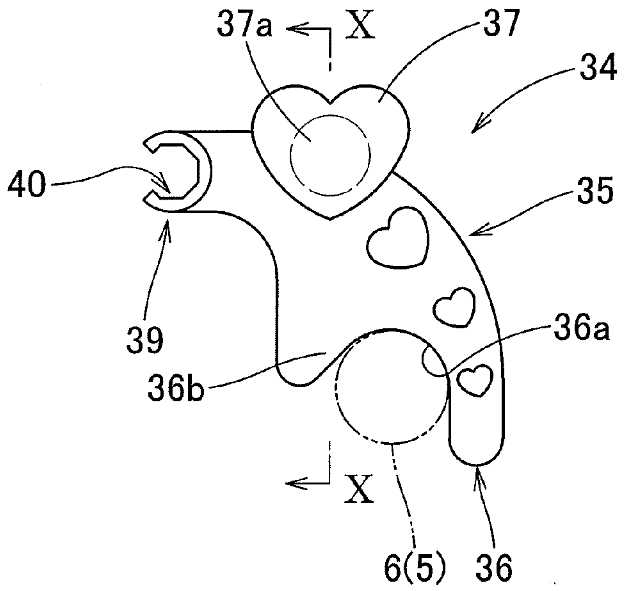
FIG. 9 is a plan view of a stopper to be used for the accessory making device of the embodiment.

The stopper 34 to be supported on the support shaft 32, as shown in FIGS. 1, 2, and 9, includes a stopper main body 35 disposed in a substantially flat plate shape and arranged substantially in the horizontal direction and an attaching base portion 39 disposed at a root portion side of the stopper main body 35 and attached to the support shaft 32.

The stopper main body 35 has, as an outer shape, a substantially L-shape that is wider toward a tip-side part 36 to be disposed around the support portion 6 in a plan view (refer to FIG. 9). When described in detail, the stopper main body 35 has, as an outer shape when viewed from above, a shape such as to once extend forward from the attaching base portion 39 and be bent so as to turn its tip rightward (refer to FIG. 27), and, as shown in FIG. 9, become wider toward the tip, in a state where the stopper main body 35 is disposed at such a pressing position P1 as to locate the tip-side part 36 near the support portion 6 (in the case of the embodiment, so as to make the tip-side part 36 lie substantially in the left and right direction). Also, at a tip side of the tip-side part 36, a cut-away portion 36*a* cut away in a substantially semicircular shape corresponding to the support portion 6 is formed so that the tip-side part 36 can be disposed around the support portion 6 while the support portion 6 is bypassed when the stopper main body 35 is disposed at a pressing position such as to press an end edge of the decoration main body 83 (decoration main body cloth 63 or a first decoration main body cloth 67 of a split decoration main body 84 to be described later). In other words, the stopper main body 35 is arranged so as to allow insertion of the support portion 6 inside the cut-away portion 36*a* formed in the tip-side part 36 in a state where it is disposed at the pressing position P1 (refer to the alternate long and two short dashed lines of FIG. 1, and FIG. 27). Also, in the embodiment, the stopper main body 35, when disposed at the pressing position P1, causes a peripheral edge part 36*b* of the cut-away portion 36*a* to be disposed around the support portion 6, and in other words, the tip-side part 36 of the stopper main body 35 is continuously disposed in substantially three directional regions from the front, through the left, to the rear around the support portion 6 (refer to FIG. 9). Moreover, in the embodiment, near the bent part (a region at a root portion side of the tip-side part 36) in the stopper main body 35, a grip portion 37 to be gripped and held during use is formed so as to project outward in the horizontal direction. The grip portion 37 is arranged in a substantially flat plate shape such as to be continuous from the stopper main body 35, and includes recesses 37*a*, 37*a* formed by slightly recessing it at the upper surface side and the lower surface side, respectively, for ease of gripping and holding during use (refer to FIG. 10). The recesses 37*a* are formed at positions substantially coincident in the up-and-down direction and to be coincident in outer shape, and are, in the case of the embodiment, formed by recessing the upper surface and lower surface of the grip portion 37 in substantially spherical shapes, respectively.

Figure 10:
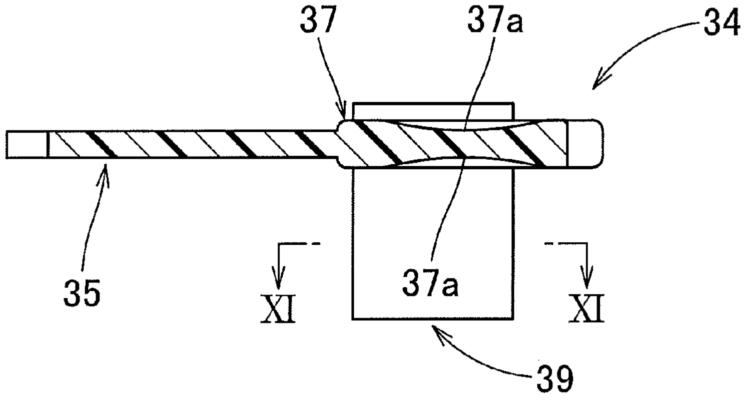
FIG. 10 is a partially enlarged sectional view of a section taken along a X-X line of FIG. 9.
Figure 11:
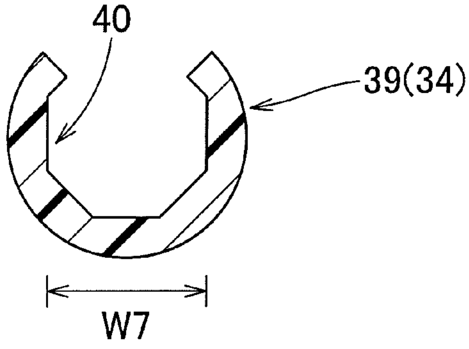
FIG. 11 is a partially enlarged sectional view of a section taken along a XI-XI line of FIG. 10.

The attaching base portion 39 is, as shown in FIG. 10, formed wider in the up-and-down direction than the stopper main body 35 and so as to project downward from the root portion side of the stopper main body 35, and has a substantially cylindrical shape with a cut-away provided in part across the entire region in the up-and-down direction. In the case of the embodiment, the attaching base portion 39 is arranged in such a manner so as to cut away a region of approximately ⅕ of the entire circumference, when viewed from above, of a cylindrical body provided at its inner peripheral surface side in a substantially octagonal shape corresponding to the support shaft 32 (refer to FIGS. 9 and 11). In other words, the attaching base portion 39 includes a through portion 40 that is opened in a substantially octagonal shape in section and penetrates up and down so as to allow insertion thereinto of the support shaft 32. In the embodiment, the attaching base portion 39 has a cut-away in a region to face the stopper main body 35. Also, similar to the support shaft 32, the through portion 40 formed in the attaching base portion 39 is also formed opened, so as to allow insertion thereinto of the support shaft 32, to have a sectional shape that is not a regular octagonal shape but an octagonal shape for which a regular octagon is by slightly flattened. In the case of the embodiment, the through portion 40 is arranged so as to make the opening shape (sectional shape) of an inner peripheral surface coincident with the sectional shape of the support shaft 32 in a state where the stopper 34 is disposed at a pressing release position P2 (refer to FIG. 13A). That is, the through portion 40 is arranged to have an opening width dimension W7 (refer to FIG. 11) at its side to be perpendicular to the cut-away region made substantially coincident with the width dimension T1 in the front and rear direction set smaller in the support shaft 32.

Figure 13B:
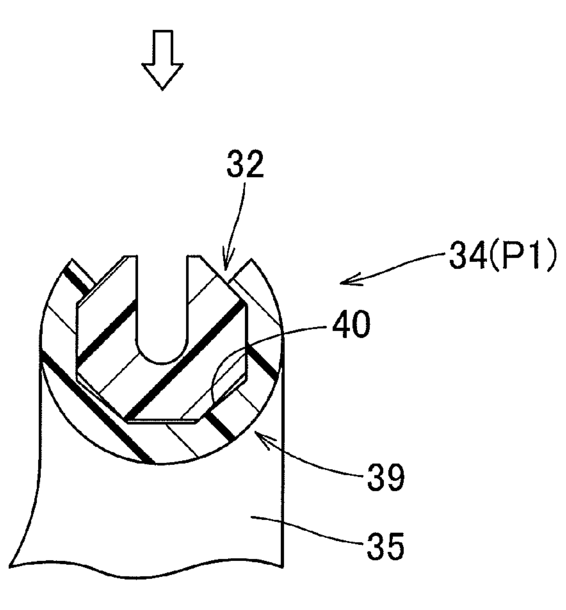

Also, in the case of the embodiment, the through portion 40 of the attaching base portion 39 in the stopper 34 and the support shaft 32 both have octagonal shapes as sectional shapes, and can thus be easily turned in the circumferential direction of the support shaft 32 by pulling while gripping and holding by hand the grip portion 37 of the stopper main body 35, and by releasing the hand, the turn in the circumferential direction of the support shaft 32 of the stopper main body 35 can be easily stopped at a desired position. Further, the through portion 40 of the attaching base portion 39 and the support shaft 32 have slightly flattened octagonal shapes as sectional shapes so as to become coincident in sectional shape in a state where the stopper 34 is disposed at the pressing release position P2. Therefore, at the pressing release position P2, the stopper 34 can be smoothly moved up and down along the support shaft 32, but as shown in FIG. 13B, when the stopper 34 is turned in the circumferential direction of the support shaft 32 and disposed at the pressing position P1, there is brought about a mode such that corner portions of the support shaft 32 contact the through portion 40 to press and expand the attaching base portion 39 slightly, so that even when the hand is released from the grip portion 37, the stopper main body 35 is prevented from falling freely by a frictional force produced between the through portion 40 in the attaching base portion 39 and the corner portions of the support shaft 32.

The frictional force to be produced between the through portion 40 and the corner portions of the support shaft 32 is slight, so also at the pressing position P1, by sliding up and down while gripping and holding the grip portion 37 of the stopper main body 35, even a less powerful child can easily move the stopper main body 35 freely up and down in the axial direction of the support shaft 32. Moreover, in the embodiment, the through portion 40 of the attaching base portion 39 and the support shaft 32 both have, as sectional shapes, octagonal shapes in section having large internal angles, and thus resistance when turning the stopper main body 35 in the circumferential direction of the support shaft 32 is also not large, and even a less powerful child can easily turn the stopper main body 35 in the circumferential direction of the support shaft 32.

Next, an accessory making kit (hereinafter, abbreviated to simply a "kit") 43 from which an accessory can be made by using the making device 1 of the present invention will be described. The kit 43 includes the making device 1 and the accessory material 44 shown in FIG. 14. The accessory material 44 includes, in the case of the embodiment, a core material 45 to form a core 82, a decoration main body material 62 to form a decoration main body 83, a split decoration main body material 66 to form a split decoration main body 84 split into two colors, a decorative cover material 71 that forms a decorative cover 86 that allows seeing through the inside, and a beads part 73 and a charm 78 as auxiliary decorations. However, the accessory material shown in FIG. 14 is a mere example, and an accessory material that is appropriately changed in combination and number of component members can be used.

Figure 14:
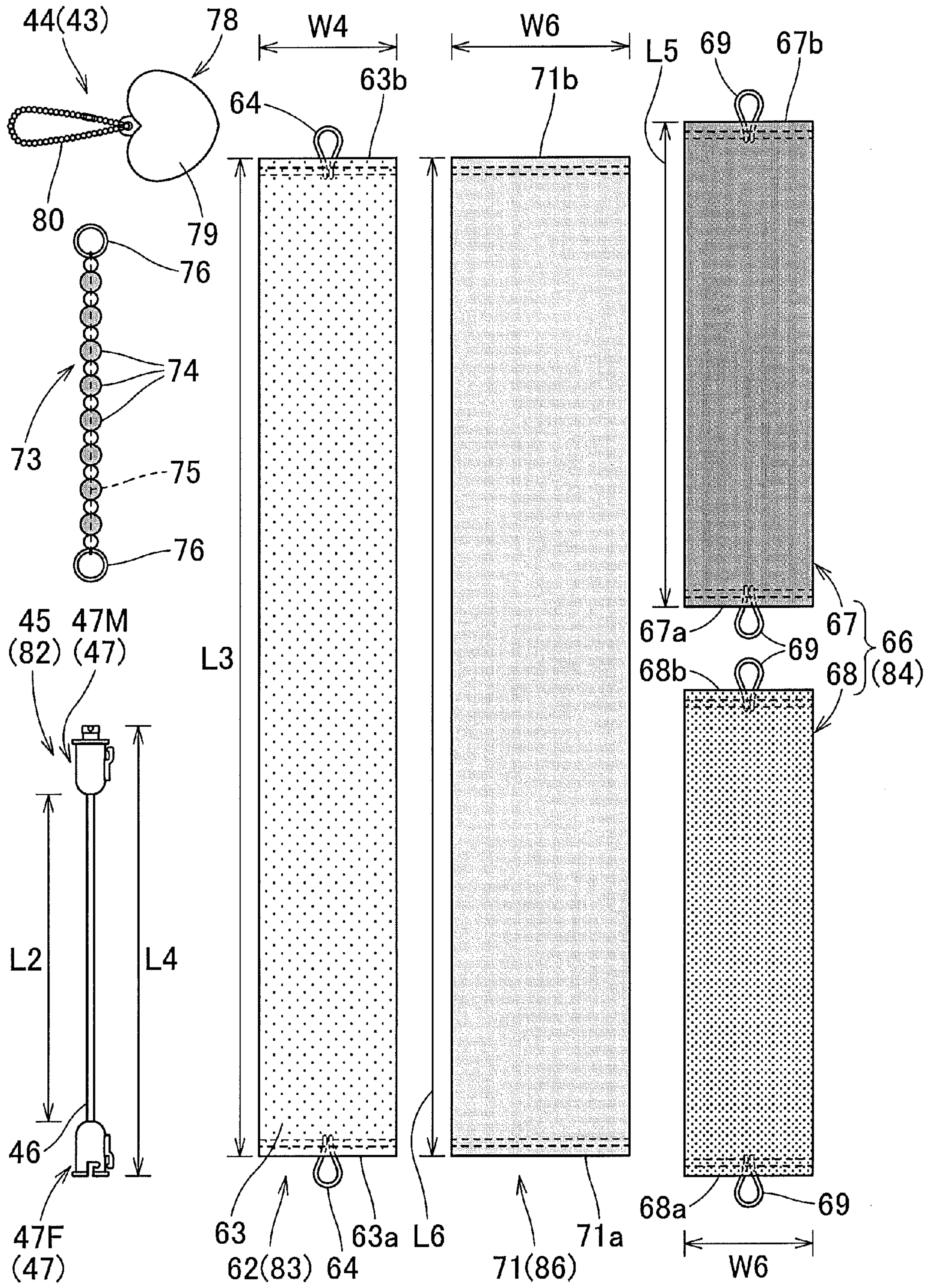
FIG. 14 is a development view of displayed components of an accessory making kit from which an accessory can be made by using the accessory making device of the embodiment.

The core material 45, as shown in FIG. 14, includes a stretchable cord-like body 46 having rubber-like elasticity and a pair of connecting portions 47M, 47F (47) disposed on both end sides of the cord-like body 46 and made connectable to each other. In the case of the embodiment, the cord-like body 46 is formed of a general-purpose elastic cord commonly used for tying hair. As the elastic cord to form the cord-like body 46, one whose outer surface is covered with a freely stretchable decorative cloth made of a knitted fabric or one with no decorative cloth disposed on its outer surface side so as to expose the elastic itself can be used, but in the kit 43 of the embodiment, an elastic cord whose outer surface is covered with a decorative cloth is used as the cord-like body 46 from the viewpoint of an improvement in design. Moreover, the cord-like body 46 is arranged, as described above, to have the length dimension L2 in an unstretched state (linearly developed state without causing a stretch) made substantially coincident with the up-and-down length dimension L1 of the recessed groove 7 formed in the support portion 6 of the making device 1.

The paired connecting portions 47M, 47F are made of a synthetic resin, and in the case of the embodiment, each includes either of a female-type portion 55 or a male-type portion 50 that can be connected to each other by bayonet coupling. When described in detail, each of the connecting portions 47M, 47F, as shown in FIGS. 15 to 19, includes a base portion 48, a female-type portion 55 or male-type portion 50 disposed on a tip side of the base portion 48, and a catching hook 49. Each of the base portions 48 has a substantially columnar shape whose axial direction is made coincident with the longitudinal direction of the cord-like body 46, and is arranged so as to make its root portion side to be a side closer to the cord-like body 46 project in a hemispherical shape. The catching hooks 49 are formed one each on the connecting portions 47M, 47F, and each is formed so as to project outward from the base portion 48 and extend from the side of a root portion 49*b* connected to the base portion 48 toward the tip side of the base portion 48 in order to lie substantially in the axial direction of the base portion 48, and separates the side of its tip 49*a* from the base portion 48. Moreover, the catching hooks 49 are arranged so as to make the tips 49*a* project outward (upward of the peripheral wall portion 9, forward of the slider portion 12) in the axial direction of the base portion 48 from the circumferential wall portion 9 and the slider portion 12 that form peripheral edges of the cut-away portions 10, 15, respectively, when the connecting portions 47M, 47F are retained on the upper retaining recess 8 and the lower retaining recess 16, respectively (refer to FIGS. 21 and 22).

Figure 15:
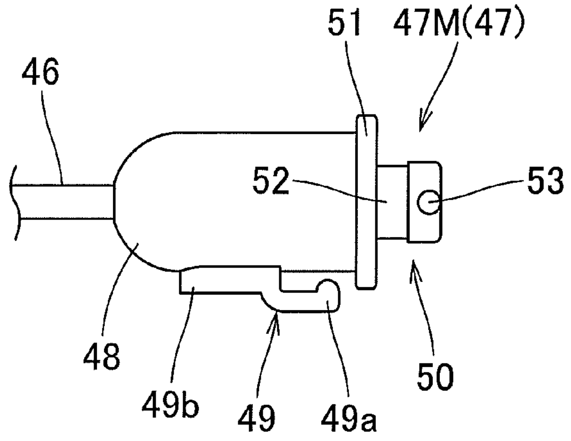
FIG. 15 is a plan view of a connecting portion including a male-type portion in a core material of an accessory making kit.
Figure 16:
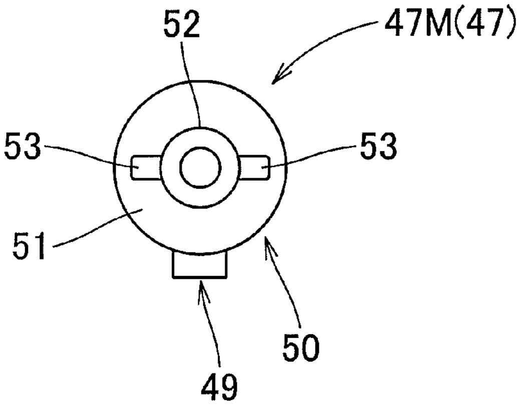
FIG. 16 is a side view of the connecting portion of FIG. 15.
Figure 17:
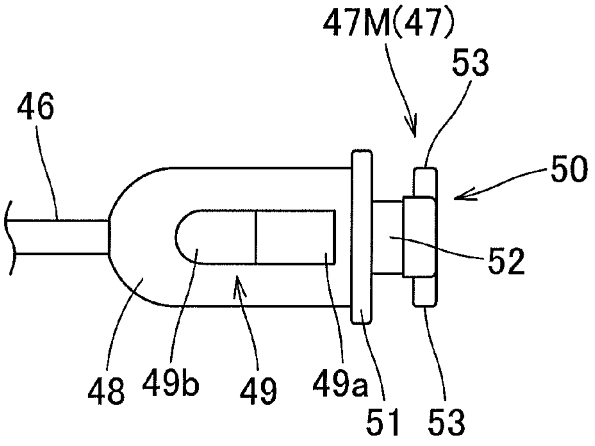
FIG. 17 is a front view of the connecting portion of FIG. 15.

The male-type portion 50 formed in one connecting portion 47M, as shown in FIGS. 15 to 17, includes a flange portion 51 formed across the entire circumference so as to project from the tip side of the base portion 48 toward the side in a direction perpendicular to the axis of the base portion 48 and having a diameter larger than that of the base portion 48, and a substantially cylindrical insertion protrusion portion 52 projecting in the axial direction of the base portion 48 from the flange portion 51, and is arranged with two retaining pins 53, 53 provided on a tip side of the insertion protrusion portion 52; the retaining pins 53, 53 projecting outward to be in a direction perpendicular to the axis of the insertion protrusion portion 52 and being provided at two symmetrical sites. The retaining pins 53, 53 have substantially columnar shapes. The insertion protrusion portion 52 has a diameter smaller than that of the base portion 48, and is arranged so as to dispose the tips of the retaining pins 53, 53 at positions to be substantially flush with the outer surface of the base portion 48.

Figure 18:
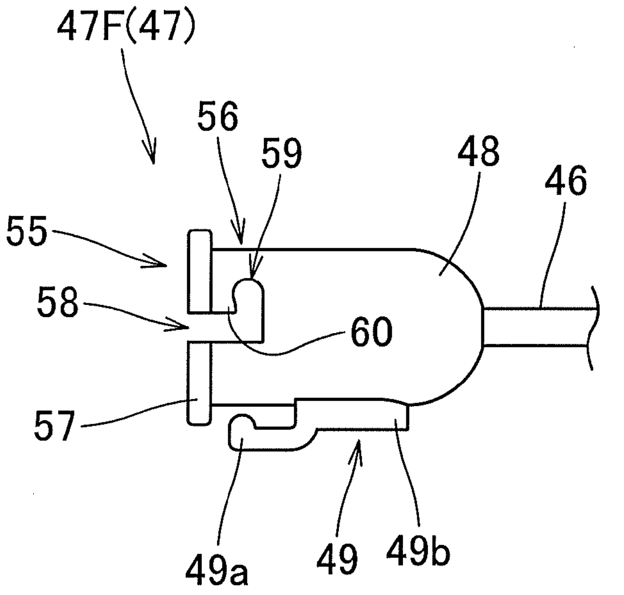
FIG. 18 is a plan view of a connecting portion including a female-type portion in a core material of an accessory making kit.
Figure 19:
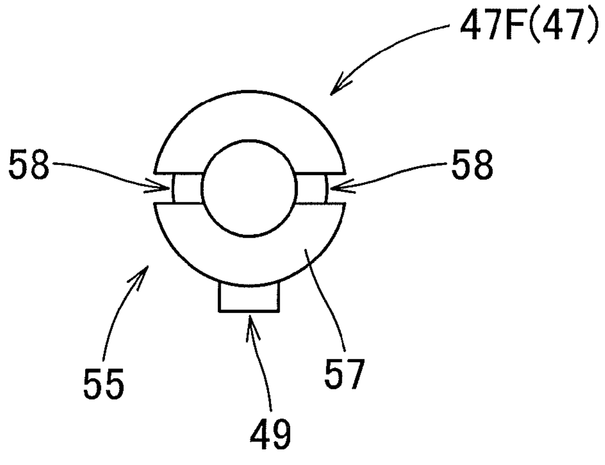
FIG. 19 is a side view of the connecting portion of FIG. 18.
Figure 20A:
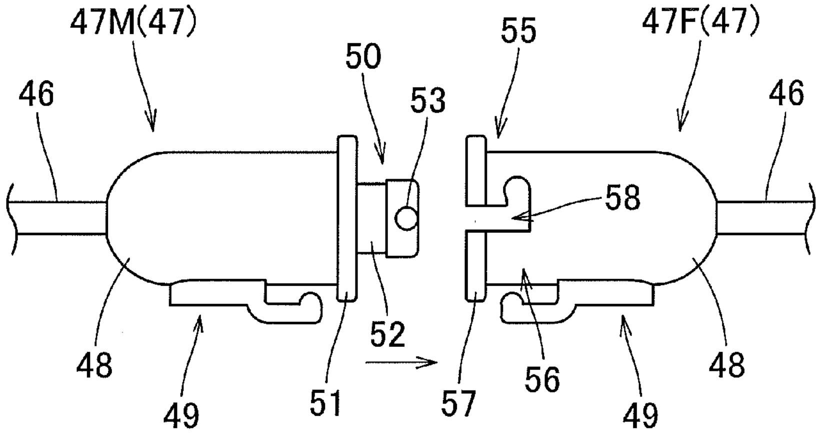
FIG. 20 includes views showing a state of interconnecting connecting portions in a core material.
Figure 20B:
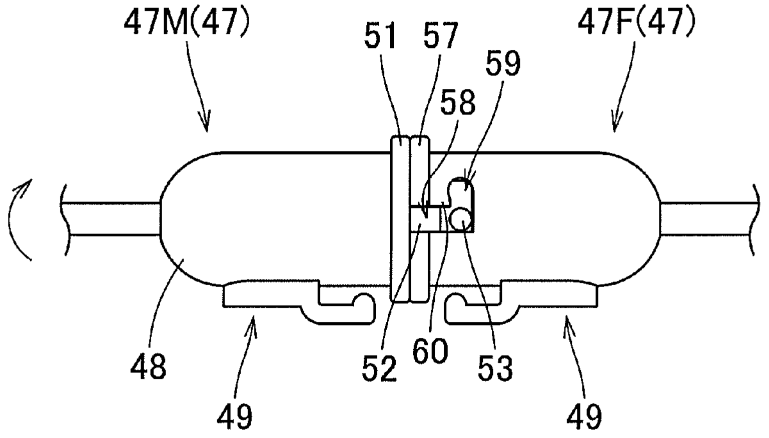
Figure 20C:
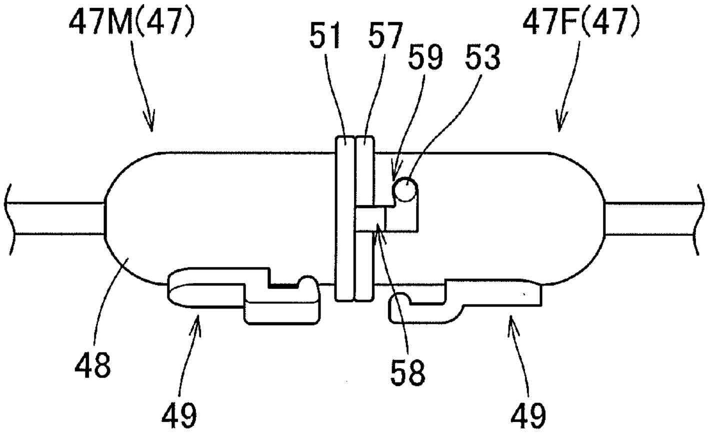

The female-type portion 55 formed in the other connecting portion 47F, as shown in FIGS. 18 and 19, includes an insertion cylinder portion 56 formed in a substantially cylindrical shape so as to allow insertion thereinto of the insertion protrusion portion 52 of the male-type portion 50 and a flange portion 57 formed so as to project outward on a tip side of the insertion cylinder portion 56. And, in the female type portion 55, at positions corresponding to the retaining pins 53, 53, through-groove portions 58, that allow insertion thereinto of the retaining pins 53, 53 when the insertion protrusion portion 52 is inserted into the insertion cylinder portion 56 are formed in such a manner so as to provide cut-aways continuously from the flange portion 57 to the insertion cylinder portion 56 in the axial direction of the insertion cylinder portion 56. The insertion cylinder portion 56 is formed, with an outer diameter dimension and a central axis coincident with those of the base portion 48, so as to be continuous from the base portion 48, and the flange portion 57 is arranged to have an outer diameter dimension made substantially coincident with that of the flange portion 51 of the male-type portion 50. Also, on a tip side of each of the through-groove portions 58, a retaining groove portion 59 into which the retaining pin 53 is inserted and retained is formed in the circumferential direction of the insertion cylinder portion 56 so as to project from each of the through-groove portions 58 (refer to FIG. 18). These retaining groove portions 59 are formed at a position to allow insertion thereinto of the retaining pin 53, with the insertion protrusion portion 52 of the male-type portion 50 inserted into the insertion cylinder portion 56 of the female-type portion 55 in such a manner so as to insert each of the retaining pins 53 into the through-groove portion 58, and the flange portions 51, 57 brought into contact with each other (refer to FIG. 20B), and by rotating the male-type portion 50 to the female-type portion 55 in the circumferential direction of the base portion 48 in such a manner so as to twist the male-type portion 50 by hand with the flange portions 51, 57 brought into contact with each other, each of the retaining pins 53 can be inserted into the retaining groove portion 59, as shown in FIG. 20C, so that the connecting portions 47M, 47F can be interconnected to each other by bayonet coupling. Moreover, in the case of the embodiment, at a peripheral edge in the vicinity of a boundary part with the through-groove portion 58 in each of the retaining groove portions 59, a retaining projection 60 that projects slightly to prevent the retaining pin 53 from coming off is formed (refer to FIG. 18). A force to retain the retaining pin 53 by the retaining projection 60 is small, so by rotating the male-type portion 50 to the female-type portion 55 in a direction reverse to the retaining direction in such a manner so as to twist the male-type portion 50 by hand, the retaining pin 53 can be caused to climb over the retaining projection 60, so that a retained state between the retaining pin 53 and the retaining groove portion 59 can be released.

The decoration main body material 62 is formed of a flexible sheet body, and includes, in the case of the embodiment, as shown in FIG. 14, a decoration main body cloth 63 made of a woven fabric and formed by being sewn up into a substantially tubular shape such as to be opened at both end sides and ring portions 64, 64 disposed on both end sides (peripheral edge of opening 63*a*) of the decoration main body cloth 63. The decoration main body cloth 63 has a length dimension L3 (refer to FIG. 14) in a flatly developed state set larger than a length dimension L4 (refer to FIG. 14) of the core material 45 including the connecting portions 47M, 47F. In the case of the embodiment, the length dimension L3 of the decoration main body cloth 63 is set to approximately 2.3 times the length dimension L4 of the core material 45, and is set larger than a height dimension H2 (refer to FIG. 3) from the upper surface 14 of the slider portion 12 to the upper end 6*a* in the support portion 6. Moreover, it suffices that the inner diameter dimension of the decoration main body cloth 63 is a dimension to allow insertion therethrough of the core material 45, and in the case of the embodiment, the decoration main body cloth 63 has a width dimension W4 (refer to FIG. 14) in a flatly developed state set to approximately ⅛ of the length dimension L3. It suffices that the length dimension L3 of the decoration main body cloth 63 is larger than the length dimension L4 of the core material 45 and that the inner diameter dimension (width dimension W4 in a flatly developed state) of the decoration main body cloth 63 is large enough to allow insertion therethrough of the core material 45, and the length dimension L3 and the inner diameter dimension can be respectively set arbitrarily. The ring portions 64, 64 can be caught on the catching hooks 49 of the connecting portions 47M, 47F in the core material 45, and are, in the case of the embodiment, formed of a flexible knitted fabric cord, and are sewn on the peripheral edge of the opening 63*a* of the decoration main body cloth 63 simultaneously when sewing it up, to be connected to the decoration main body cloth 63.

The split decoration main body material 66 is, as shown in FIG. 14, arranged with a first decoration main body cloth 67 and a second decoration main body cloth 68 separated from each other and four ring portions 69 provided on both end sides (peripheral edges of openings 67*a*, 68*a*) of the first decoration main body cloth 67 and the second decoration main body cloth 68, respectively. Similar to the decoration main body cloth 63 described above, the first decoration main body cloth 67 and the second decoration main body cloth 68 are each made of a woven fabric and formed by being sewn up into a substantially tubular shape such as to be opened at both end sides, and have the same outer shape, with a length dimension L5 (refer to FIG. 14) in a flatly developed state that is approximately ½ of the length dimension L3 of the decoration main body cloth 63, and an inner diameter dimension set to a dimension to allow insertion therethrough of the core material 45. In the case of the embodiment, the width dimension W5 (refer to FIG. 14) in a flatly developed state of each of the first decoration main body cloth 67 and the second decoration main body cloth 68 is set smaller than the width dimension W4 of the decoration main body cloth 63. The first decoration main body cloth 67 and the second decoration main body cloth 68 are formed of woven fabrics of different color tones and patterns. Similar to the ring portions 64 described above, the ring portions 69 are formed of a flexible knitted fabric cord. The split decoration main body material 66 of the embodiment is used with the first decoration main body cloth 67 and the second decoration main body cloth 68 always inserted together through the core material 45, and the length dimension of the split decoration main body material 66 as a whole in a state where the first decoration main body cloth 67 and the second decoration main body cloth 68 juxtaposed with their one-side openings abutted against each other is substantially the same as the length dimension of the decoration main body cloth 63 described above, and is set larger than the length dimension of the core material 45.

The materials to form the decoration main body cloth 63, the first decoration main body cloth 67, and the second decoration main body cloth 68 are not limited to woven fabrics, but materials made of flexible sheet bodies, such as fabrics including knitted fabrics and non-woven fabrics, leather, synthetic leather, and soft synthetic resin sheets, formed into tubular shapes can be used.

Moreover, the outer surface of the decoration main body cloth 63, the first decoration main body cloth 67, the second decoration main body cloth 68, and the decorative cover material 71 may be decorated by applying a thermochromic material capable of changing the color tone due to a change in temperature, a photochromic material capable of changing the color tone due to light irradiation, a light storing material, or the like, and alternatively, the first decoration main body cloth 67, the second decoration main body cloth 68, and the decorative cover material 71 may be formed of fabrics woven with yarn containing a thermochromic material, a photochromic material, or a light storing material.

As the thermochromic material, liquid crystal, $Ag_2HgI_4$, $Cu_2HgI_4$, etc., or a reversible thermochromic composition containing three components of an electron-donating color-forming organic compound, an electron-accepting compound, and a catalytic organic compound that reversibly causes a coloring reaction between both compounds can be used.

Examples of the reversible thermochromic composition containing three components of the electron-donating color-forming organic compound, the electron-accepting compound, and the catalytic organic compound that reversibly causes a coloring reaction between both compounds include thermally decoloring reversible thermochromic compositions described in JP51-44706 B, JP51-44707 B, JP01-29398 B, JP04-17154 B, JP07-179777 A, JP07-33997 A, JP08-39936 A, etc., and thermally color-developing reversible thermochromic compositions described in JP51-44706 B, JP11-5973 A, JP11-129623 A, JP2001-105732 A, and JP2003-253149 A.

Moreover, the reversible thermochromic composition is effective even when applied as it is, but is preferably used as a microcapsule pigment encapsulated in microcapsules, and when used encapsulated in microcapsules, it hardly receives influence due to changes in usage conditions, chemical and physical properties can be stabilized even under various usage conditions, and the reversible thermochromic composition can be kept with the same composition, so that the same working effect can be provided. Concretely, when the reversible thermochromic composition is encapsulated in microcapsules, it is preferable to use microcapsules having a mean particle size set to be in a range of 0.1 μm to 50 μm, preferably, in a range of 0.5 μm to 30 μm, and more preferably, in a range of 1 μm to 20 μm. Measurement of the particle size and particle size distribution of the microcapsules is performed by using a laser diffraction/scattering particle size distribution measuring apparatus [manufactured by HORIBA, Ltd.; LA-300], and a mean particle size (median size) is calculated based on the numerical values. Moreover, a method for microencapsulation can be appropriately selected according to the usage from conventionally known examples including interfacial polymerization, in-situ polymerization, submerged curing coating, phase separation from an aqueous solution, phase separation from an organic solvent, melt dispersion cooling, air suspension coating, and spray drying. Further, microcapsules on the surface of which a secondary resin coating is further provided according to the purpose to be imparted with durability or with surface characteristics modified may be used.

In the case of imparting reversible thermochromism to a decoration main body cloth, the following fabric can be used as an example. By performing solid printing with a 120-mesh screen plate on the surface of a white T/C broadcloth material having a unit weight of 120 g/m$^2$ by use of, as a reversible thermochromic material, an ink prepared by uniformly dispersing 30 parts of a microcapsule pigment (discoloration temperature: 30° C., mean particle size: 6 μm) for which a reversible thermochromic composition that changes from blue to colorless is encapsulated in microcapsules, 50 parts of an acrylic emulsion resin, 2 parts of a thickening agent, 0.5 parts of a leveling agent, 0.5 parts of an antifoaming agent, and 5 parts of a crosslinking agent, and then subjecting to drying and curing, a fabric having a reversible thermochromic layer can be produced. When such a fabric is used as a decoration main body cloth, under a room temperature of 25° C., the decoration main body cloth turns blue because the reversible thermochromic material contained in the reversible thermochromic layer develops blue color, and in outdoors of 35° C., the reversible thermochromic material loses color, and the decoration main body cloth changes to white. Then, when the decoration main body cloth is used again in an environment of 25° C., the reversible thermochromic material again develops blue color, and the decoration main body cloth changes to blue, and thus changes in color tone can be enjoyed.

Moreover, as the decoration main body cloth, there may be an arrangement such that the same white fabric material as the above is used, and a user finds enjoyment in freely drawing pictures, symbols, etc., thereon using writing materials holding inks containing thermochromic materials and stamps, stencils, and the like holding inks containing thermochromic materials.

Examples of the photochromic material include photochromic compounds such as spiropyran derivatives, fulgide derivatives, dihydropyrene derivatives, indigo derivatives, aziridines, polycyclic aromatic derivatives, azobenzene derivatives, salicylideneaniline derivatives, xanthene derivatives, spirooxazine derivatives, diarylethene derivatives, naphthopyran derivatives, and naphthoxazine derivatives. Such photochromic compounds are preferably used dissolved in a styrene-based oligomer, and a styrene-based oligomer having a weight average molecular weight in a range of 200 to 6000, and preferably, in a range of 200 to 4000 is used. The above-described range is set because when the weight average molecular weight of a styrene-based oligomer is less than 200, the monomer content is high, and insufficient stability makes it difficult to develop a light-fastness enhancing effect, and when the weight average molecular weight of a styrene-based oligomer exceeds 6000, a residual color effect occurs due to light irradiation, and the light developing density declines to deteriorate discoloration sensitivity. The weight average molecular weight is measured by a GPC method (gel permeation chromatography). Moreover, as the styrene-based oligomer, there may be mentioned low-molecular-weight polystyrenes, styrene-α-methylstyrene copolymers, α-methylstyrene polymers, α-methylstyrene vinyltoluene copolymers, and the like.

Examples of the light storing material include a CaS:Bi-based material, a CaSrS:Bi-based material, a ZnS:Cu-based material, and a ZnCdS:Cu-based material, $SrAl_2O_4$, $Sr_4Al_{14}O_{25}$, and $CaAl_2O_4$ to which europium, dysprosium, samarium, etc., are added as activators disclosed in JP07-11250 A, and $Sr(AlB)_2O_4$; EuDy, $Sr(AlB)_3O_6$;EuDy, and $Sr(AlB)_4O_7$;EuDy disclosed in JP10-168448 A.

Moreover, the decoration main body cloth 63, the first decoration main body cloth 67, the second decoration main body cloth 68, and the decorative cover material 71 may be arranged so as to discolor upon contact with water, and specifically, there may be provided a porous layer containing at its outer surface a low refractive index pigment and a binder resin and different in transparency between a water-absorbed state and a water-unabsorbed state. The porous layer is a layer to which a low refractive index pigment is fixed in a dispersed state together with a binder resin, and is a layer different in transparency between a dry state and a water-absorbed state.

As the low refractive index pigment, there may be mentioned silicic acid and salts thereof, barite powder, barium sulfate, barium carbonate, calcium carbonate, gypsum, clay, talc, alumina white, magnesium carbonate, and the like and these low refractive index pigments may be used alone or in combination of two or more. These low refractive index pigments are set with a refractive index ranging from 1.4 to 1.8 and show excellent transparency when they absorb water. As the salts of silicic acid, there may be mentioned aluminum silicate, aluminum potassium silicate, aluminum sodium silicate, aluminum calcium silicate, potassium silicate, calcium silicate, calcium sodium silicate, sodium silicate, magnesium silicate, magnesium potassium silicate, and the like.

The low refractive index pigment dispersed in a vehicle containing a binder resin as a binding agent is applied to the support (decoration main body cloth), followed by removal of volatile components by drying to form a porous layer. As the binder resin, there may be mentioned urethane resins, nylon resins, vinyl acetate resins, acrylate resins, acrylate copolymer resins, acrylic polyol resins, vinyl chloride-vinyl acetate copolymer resins, maleic acid resins, polyester resins, styrene resins, styrene copolymer resins, polyethylene resins, polycarbonate resins, epoxy resins, styrene-butadiene copolymer resins, acrylonitrile-butadiene copolymer resins, methyl methacrylate-butadiene copolymer resins, butadiene resins, chloroprene resins, melamine resins, and resin emulsions of all the foregoing, as well as casein, starch, cellulose derivatives, polyvinyl alcohol, urea resins, phenolic resins, and the like.

When a decorative cover material 71 that allows seeing through the inside is used as a decoration main body, thermochromism, photochromism, or a light storing ability may be imparted to the cord-like body 46 of the core material 45. Concretely, a decorative layer may be provided by using an ink or paint containing a thermochromic material, a photochromic material, or a light storing material for a freely stretchable decorative cloth made of a knitted fabric to be disposed so as to cover the outer surface side of the cord-like body 46, or a cord-like body 46 having a decorative cloth on its outer surface side may also be dipped in the above-described ink or paint, and alternatively, a cord-like body 46 with no decorative cloth disposed may also be formed of a resin itself containing a thermochromic material, a photochromic material, or a light storing material.

The decorative cover material 71 is a flexible sheet body, and is, in the case of the embodiment, made of a woven fabric such as organdie or lace that allows seeing through the inside and formed by being sewn up into a substantially tubular shape such as to be opened at both end sides. The decorative cover material 71 is arranged to have a length dimension L6 (refer to FIG. 14) in a flatly developed state made substantially coincident with the length dimension L3 in a flatly developed state of the decoration main body cloth 63. Moreover, the decorative cover material 71 is arranged to have a width dimension W6 (refer to FIG. 14) in a flatly developed state larger than the width dimension W4 of the decoration main body cloth 63 so as to allow insertion of the decoration main body cloth 63 through the inside. Further, the decorative cover material 71 has an inner diameter dimension set smaller than the width dimensions W2, W3 in the front and rear and left and right directions of the slider portion 12, so as not to allow insertion therethrough of the slider portion 12.

The beads part 73 is, as shown in FIG. 14, arranged by linearly connecting a plurality of beads 74 by inserting therethrough a stretchable connection wire 75 having rubber-like elasticity and disposing on both end sides catching ring portions 76. The catching ring portions 76 can be caught on the catching hooks 49 of the connecting portions 47M, 47F in the core material 45, and in the case of the embodiment, arranged in ring shapes made of a flexible and stretchable synthetic resin. The charm 78 is, as shown in FIG. 14, arranged with a charm body 79 made of a synthetic resin, metal, fabric, or the like and a connecting ring 80 made of a ball chain, an elastic cord, or the like for attaching the charm body 79 to an accessory.

Next, making an accessory using the making device 1 of the embodiment will be described. First, when description is given of making an accessory S1 using the core material 45 and the decoration main body material 62, the making device 1 is placed in such a manner so as to place the bottom surface 3*a* of the mount portion 3 on the mounting surface F. At this time, as shown in FIG. 21, the slider portion 12 is lowered in advance so as to bring the lower end 12*c* into contact with the mount portion 3, and the stopper 34 is disposed in advance at a position to have substantially the same height as that of the slider portion 12 while the tip-side part 36 of the stopper main body 35 is turned forward so as to set the stopper main body 35 away from above the slider portion 12. Then, the cord-like body 46 of the core material 45 (core 82) is attached to the holder 5 of the making device 1 (refer to FIGS. 21 and 22). Specifically, the cord-like body 46 of the core material 45 (core 82) is attached to the holder 5 by inserting the base portions 48 of the connecting portions 47M, 47F disposed on both end sides of the cord-like body 46 into the upper retaining recess 8 formed on the upper end 6*a* side of the support portion 6 and the lower retaining recess 16 formed in the slider portion 12, respectively, while inserting the cord-like body 46 through the recessed groove 7 formed in the support portion 6. In FIGS. 21 and 22, the core material 45 is attached to the holder 5 in such a manner so as to retain the connecting portion 47M having the male-type portion 50 on the upper retaining recess 8 and retain the connecting portion 47F having the female-type portion 55 on the lower retaining recess 16, but the core material may be attached to the holder with the connecting portions reversed.

Also, in each of the upper retaining recess 8 and the lower retaining recess 16, there is formed a cut-away portion 10, 15 to allow insertion therethrough of the catching hook 49 disposed on each of the connecting portions 47M, 47F of the core material 45, respectively, at the time of attachment of the core material 45 to the holder 5, as shown in FIG. 22, the catching hook 49 formed so as to project from the base portion 48 to the side in a direction perpendicular to the axis is unlikely to project largely to the side in the direction perpendicular to the axis (front side of the support portion 6 and upper side of the slider portion 12) from the holder 5, so that the outer surface of the holder 5 can be made substantially flush. Moreover, the catching hook 49 formed on each of the connecting portions 47M, 47F is inserted through the inside of the cut-away portion 10, 15 in such a manner so as to make the tip 49*a* to be inserted into the ring portions 64, 69 of the decoration main body material 62 and split decoration main body material 66 and the catching ring portion 76 of the beads part 73 project outward (upward of the peripheral wall portion 9, forward of the slider portion 12) in the axial direction of the base portion 48 from the peripheral wall portion 9 and the slider portion 12 to form the peripheral edge of the cut-away portion 10, 15 (refer to FIG. 22).

Figure 23:
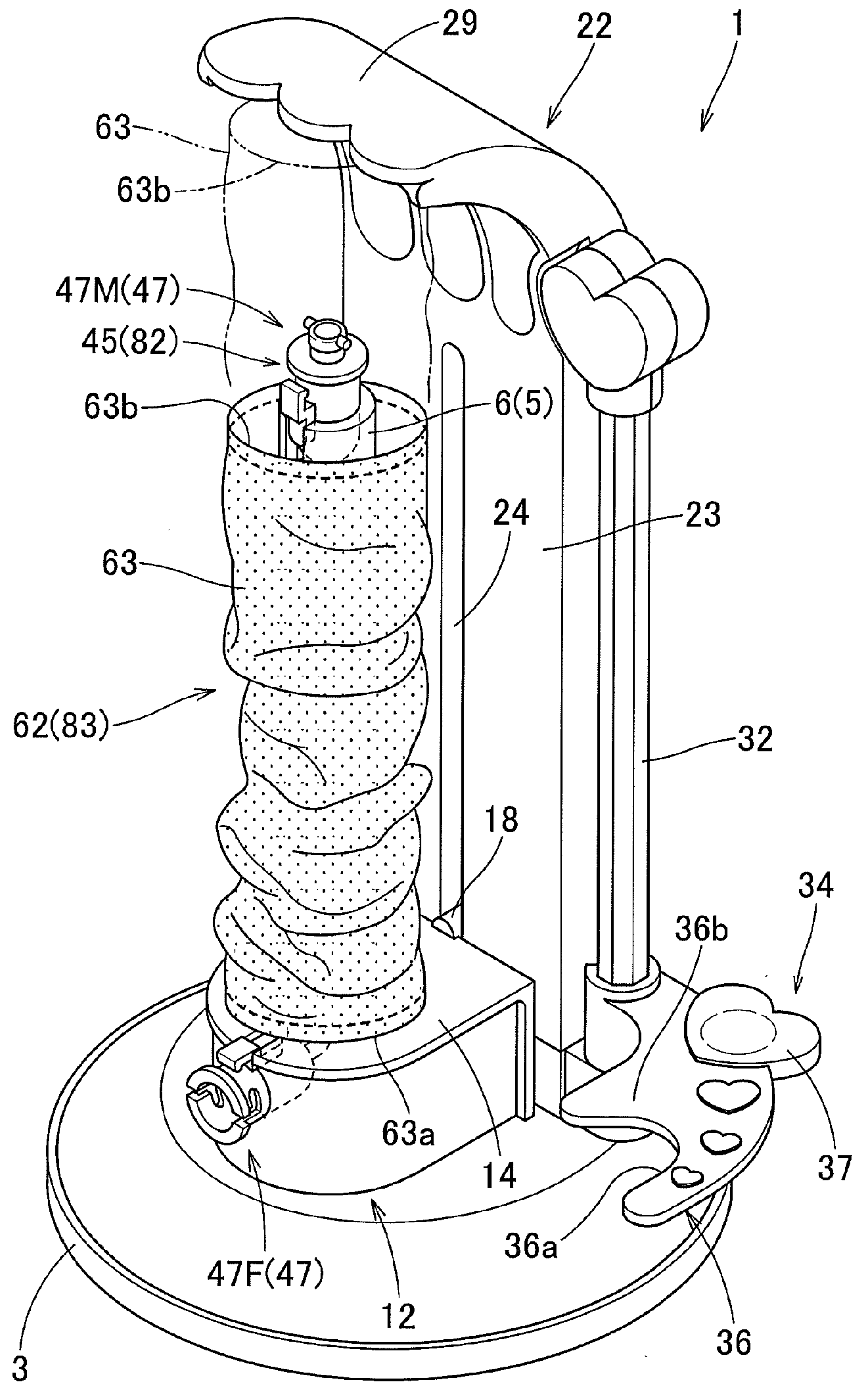
FIG. 23 is a view for explaining a step after FIG. 21, and is a perspective view showing a state of a support portion of the holder with the core material attached inserted through a decoration main body material.
Figure 24:
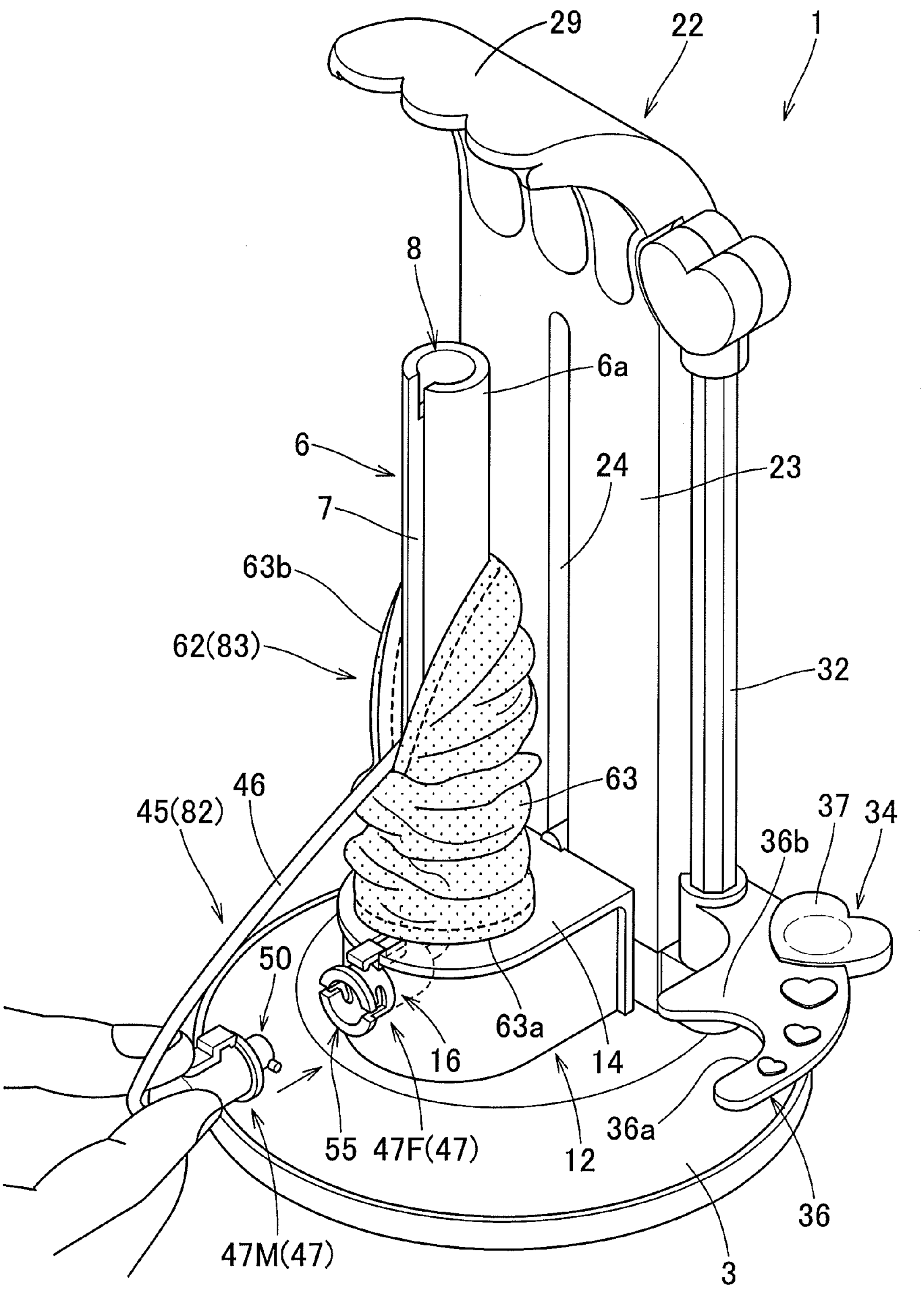
FIG. 24 is a view for explaining a step after FIG. 23, and is a perspective view showing a step of interconnecting connecting portions of the core material.

Next, the decoration main body cloth 63 is disposed so as to cover the outer peripheral side of the support portion 6 by inserting the upper end 6*a* of the support portion 6 through the opening 63*a* at one end side of the decoration main body cloth 63 in such a manner so as to put the decoration main body material 62 over the holder 5 from above, inserting the support portion 6 of the holder 5 to which the core material 45 has been attached through the decoration main body cloth 63 (decoration main body 83) of the decoration main body material 62, pushing down the decoration main body cloth 63 downward through the use of hands etc., and making the connecting portion 47M retained on the upper retaining recess 8 disposed on the upper end 6*a* side of the support portion 6 project from an opening 63*b* at the other end side of the decoration main body cloth 63 (refer to FIG. 23). At this time, the decoration main body cloth 63 in a contracted state so as to be reduced in axial length is placed on the upper surface 14 of the slider portion 12. Subsequently, as shown in FIG. 24, by detaching the connecting portion 47M that has been retained on the upper retaining recess 8 from the upper retaining recess 8 to move the male-type portion 50 at its tip side downward so as to turn it to the tip side (female-type portion 55) of the connecting portion 47F that has been retained on the lower retaining recess 16, inserting the insertion protrusion portion 52 of the male-type portion 50 into the insertion cylinder portion 56 of the female-type portion 55, and then rotating the male-type portion 50 to the female-type portion 55, the connecting portions 47M, 47F are interconnected by bayonet coupling (refer to FIG. 20) to have the cord-like body 46 in a ring shape, thereby forming the core 82.

Figure 25:
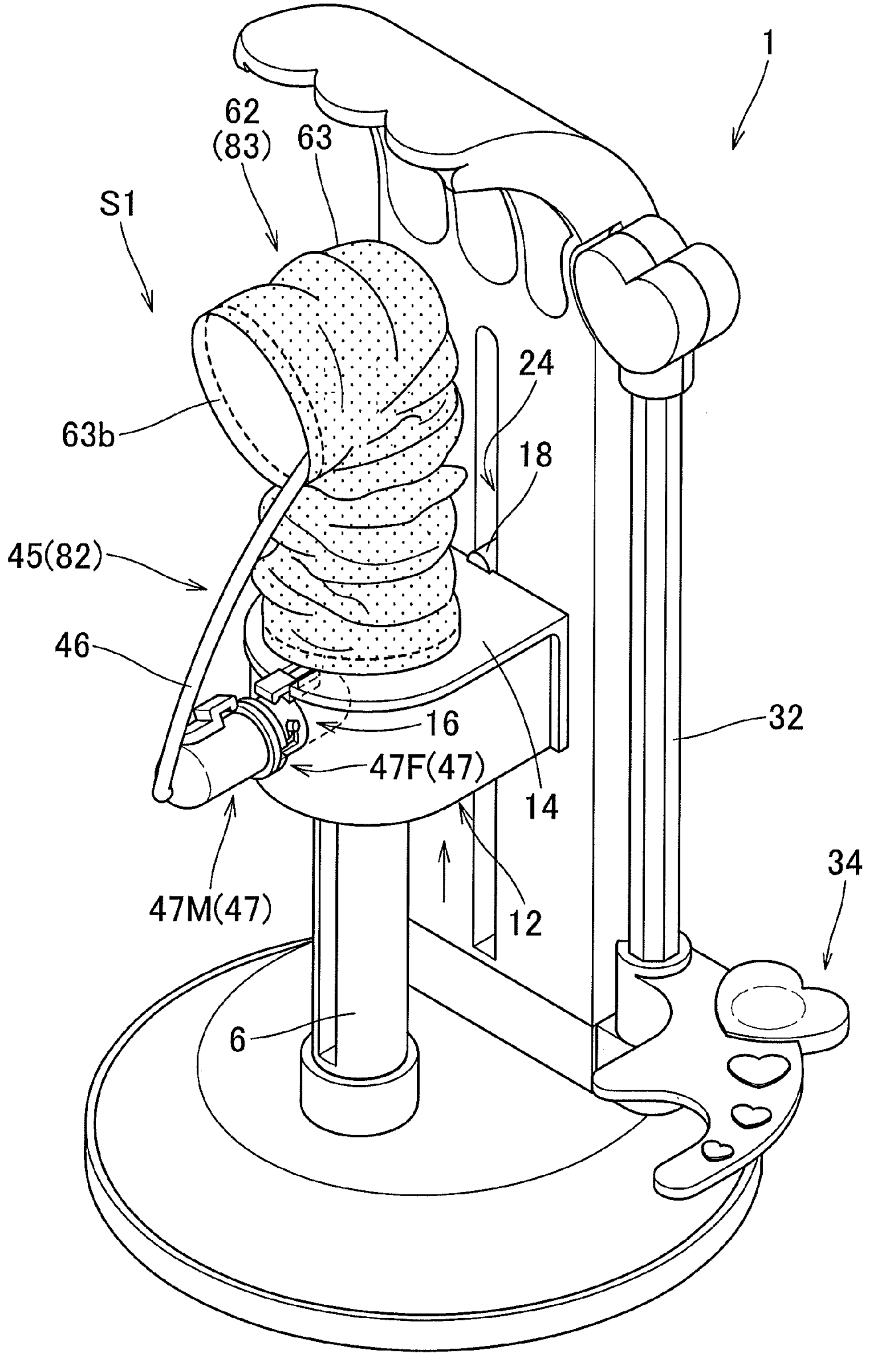
FIG. 25 is a view for explaining a step after FIG. 24, and is a perspective view showing a state of the slider portion moved to slide upward.
Figure 26:
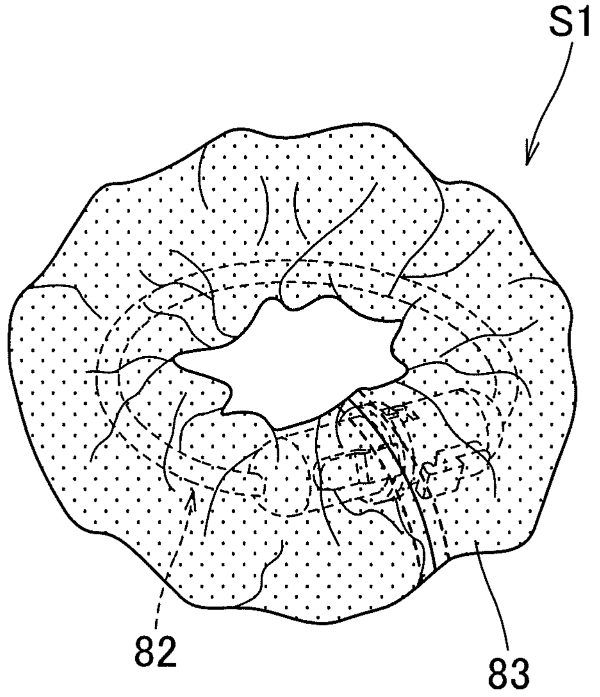
FIG. 26 is a perspective view of an accessory made by the steps shown in FIGS. 22 to 25.

Subsequently, as shown in FIG. 25, the slider portion 12 with the decoration main body cloth 63 placed on the upper surface 14 side is moved to slide on the support portion 6 so as to be raised, together with the decoration main body cloth 63 and the ring-shaped cord-like body 46 (core 82). Then, by removing the holder 5 from the decoration main body cloth 63 in such a manner so as to pull the decoration main body cloth 63 out of the support portion 6 while drawing the connecting portion 47F out of the lower retaining recess 16 of the slider portion 12 moved upward up to near the upper end 6*a* of the support portion 6, and by adjusting the decoration main body cloth 63 contracted so as to be reduced in axial length so as to cover the periphery of the core 82 (cord-like body 46) across the entire circumference by hand etc., the accessory S1 the periphery of the core 82 of which is covered with the decoration main body 83 across the entire circumference can be made, as shown in FIG. 26.

Figure 27:
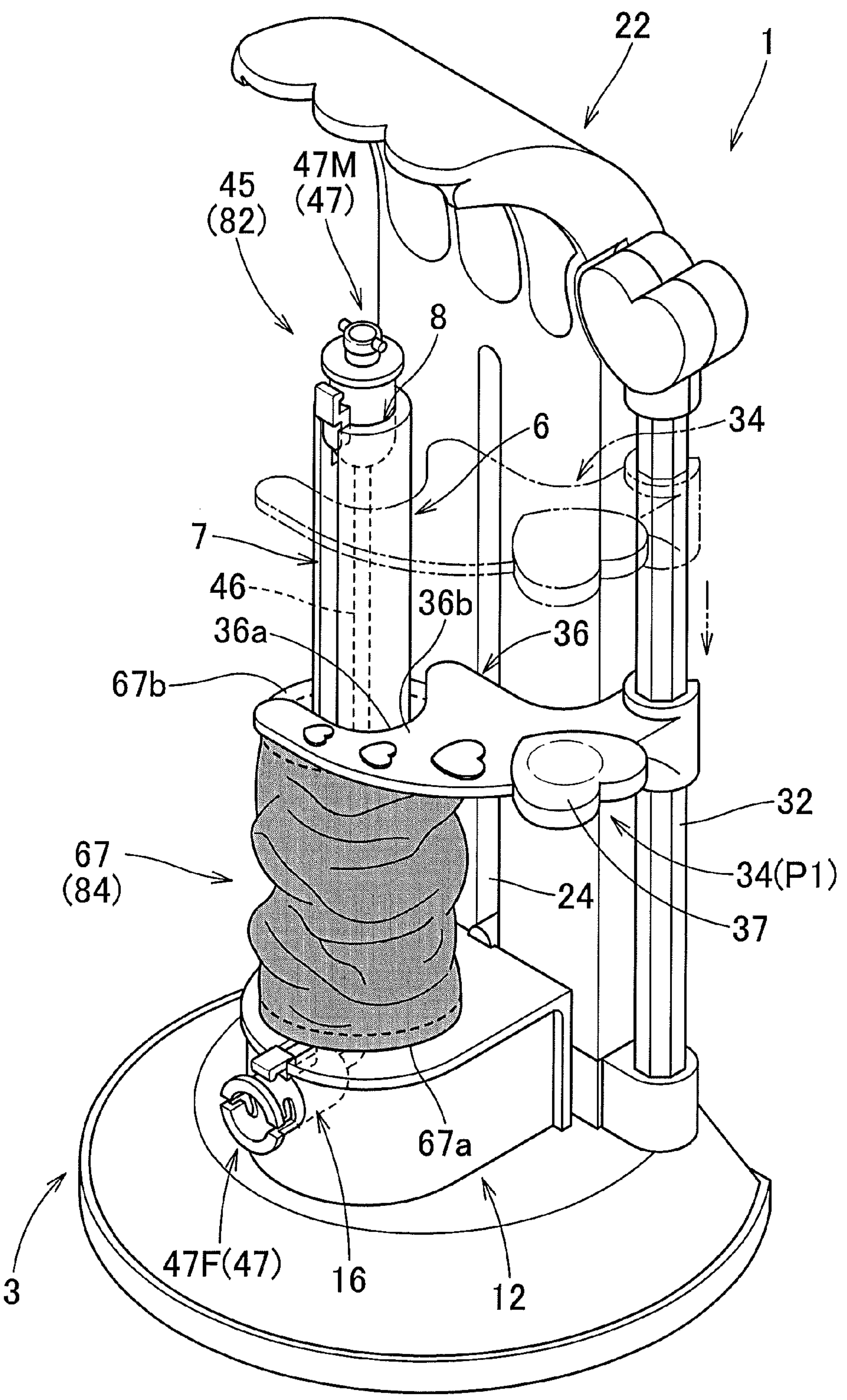
FIG. 27 is a view for explaining a step of making another accessory by using the accessory making device of the embodiment, and is a perspective view showing a state of the support portion of the holder with a core material attached inserted through a first decoration main body cloth of a split decoration main body material and an upper end of the first decoration main body cloth pressed by the stopper.

Next, making an accessory S2 using the core material 45 and the split decoration main body material 66 will be described. First, the upper end 6*a* of the support portion 6 is inserted through the opening 67*a* at one end side of the first decoration main body cloth 67 in such a manner so as to put from above the first decoration main body cloth 67 of the split decoration main body material 66 over the holder 5 to which the core material 45 has been attached in the same manner as the above. Then, the support portion 6 of the holder 5 to which the core material 45 has been attached is inserted through the first decoration main body cloth 67, the first decoration main body cloth 67 is pushed downward through the use of hands etc., to dispose the first decoration main body cloth 67 so as to cover the outer peripheral side of the support portion 6 in a contracted state to be reduced in axial length. Next, the stopper 34 disposed so as to face its tip-side part 36 forward is slid on the support shaft 32 so as to move in the axial direction of the support shaft 32 in order to pull it above the upper end side of the first decoration main body cloth 67, and subsequently, the stopper 34 is rotated to the right side on the support shaft 32 so as to move in the circumferential direction of the support shaft 32, and disposed at a pressing position P1 by inserting the support portion 6 into the cut-away portion 36*a* of the tip-side part 36 (refer to the alternate long and two short dashed lines of FIG. 27). Then, the stopper 34 disposed at the pressing position P1 is pushed downward in the axial direction of the support shaft 32 to press, as shown in FIG. 27, the upper end side (peripheral edge of the opening 67*a*) of the first decoration main body cloth 67 by the peripheral edge part 36*b* of the cut-away portion 36*a* in the tip-side part 36, thereby restricting the first decoration main body cloth 67 covering the outer peripheral side of the holder 5 (support portion 6) from extending such as to be restored from a contracted state.

Figure 28:
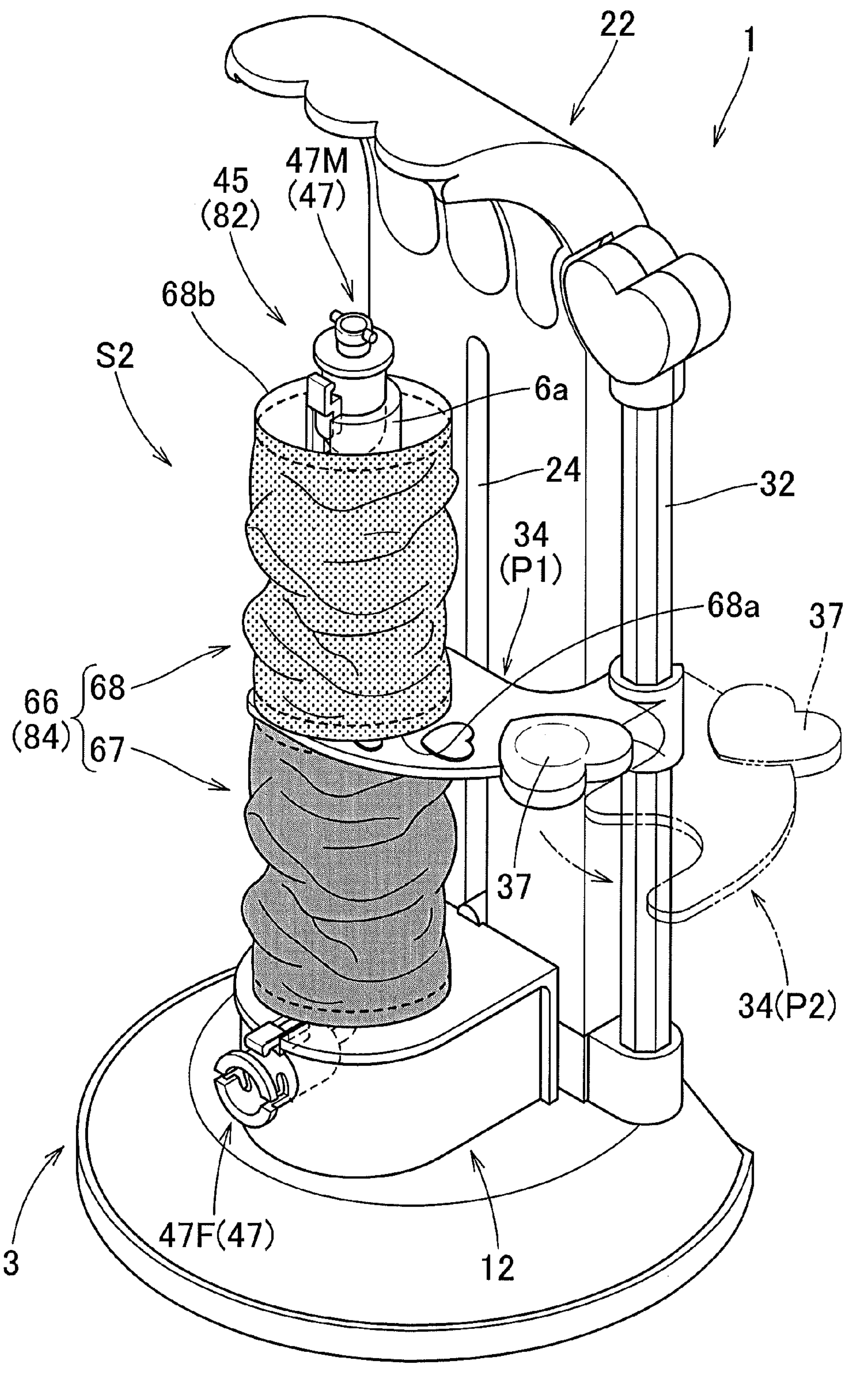
FIG. 28 is a view for explaining a step after FIG. 27, and is a perspective view showing a state of the support portion of the holder inserted through a second decoration main body cloth of a split decoration main body material.
Figure 29:
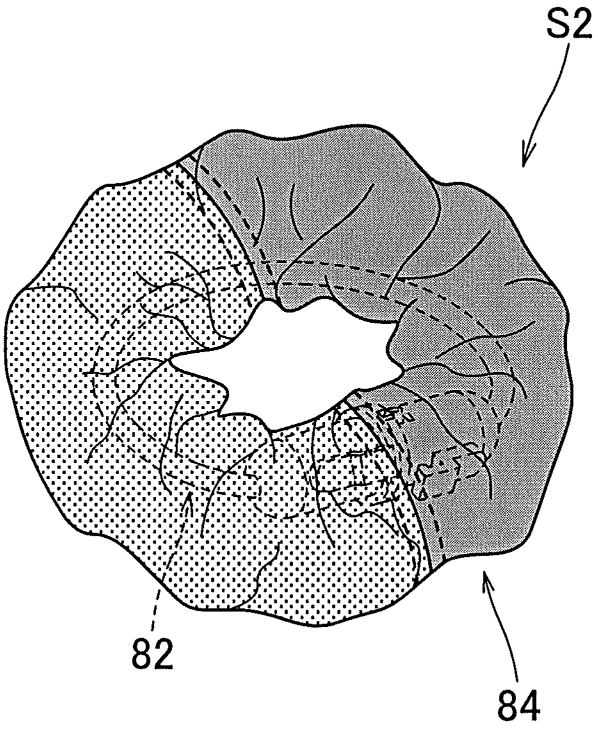
FIG. 29 is a perspective view of an accessory made by the steps shown in FIGS. 27 and 28.

Subsequently, the second decoration main body cloth 68 is disposed so as to cover the outer peripheral side of the support portion 6 by inserting the upper end 6*a* of the support portion 6 through the opening 68*a* at one end side of the second decoration main body cloth 68 in such a manner so as to put the second decoration main body cloth 68 over the holder 5 from above, inserting the support portion 6 through the second decoration main body cloth 68, and making the connecting portion 47M retained on the upper retaining recess 8 disposed on the upper end 6*a* side of the support portion 6 project from an opening 68*b* at the other end side of the second decoration main body cloth 68 (refer to FIG. 28). Next, the stopper 34 pressing the upper end side of the first decoration main body cloth 67 is, as shown by the alternate long and two short dashed lines of FIG. 28, rotated to the left side on the support shaft 32 so as to move in the circumferential direction of the support shaft 32, and moved from the pressing position P1 to a pressing release position P2. Subsequently, in the same manner as the above, by interconnecting the connecting portions 47M, 47F of the core material 45 by bayonet coupling to form the core 82 in a ring shape, and then moving the slider portion 12 upward, pulling the first decoration main body cloth 67 and the second decoration main body cloth 68 out of the support portion 6, and then adjusting the first decoration main body cloth 67 and the second decoration main body cloth 68 contracted so as to be reduced in axial length so as to cover the periphery of the core 82 (cord-like body 46) across the entire circumference by hand etc., the accessory S2 the periphery of the core 82 of which is covered with the split decoration main body 84 across the entire circumference can be made, as shown in FIG. 29.

Figure 30:
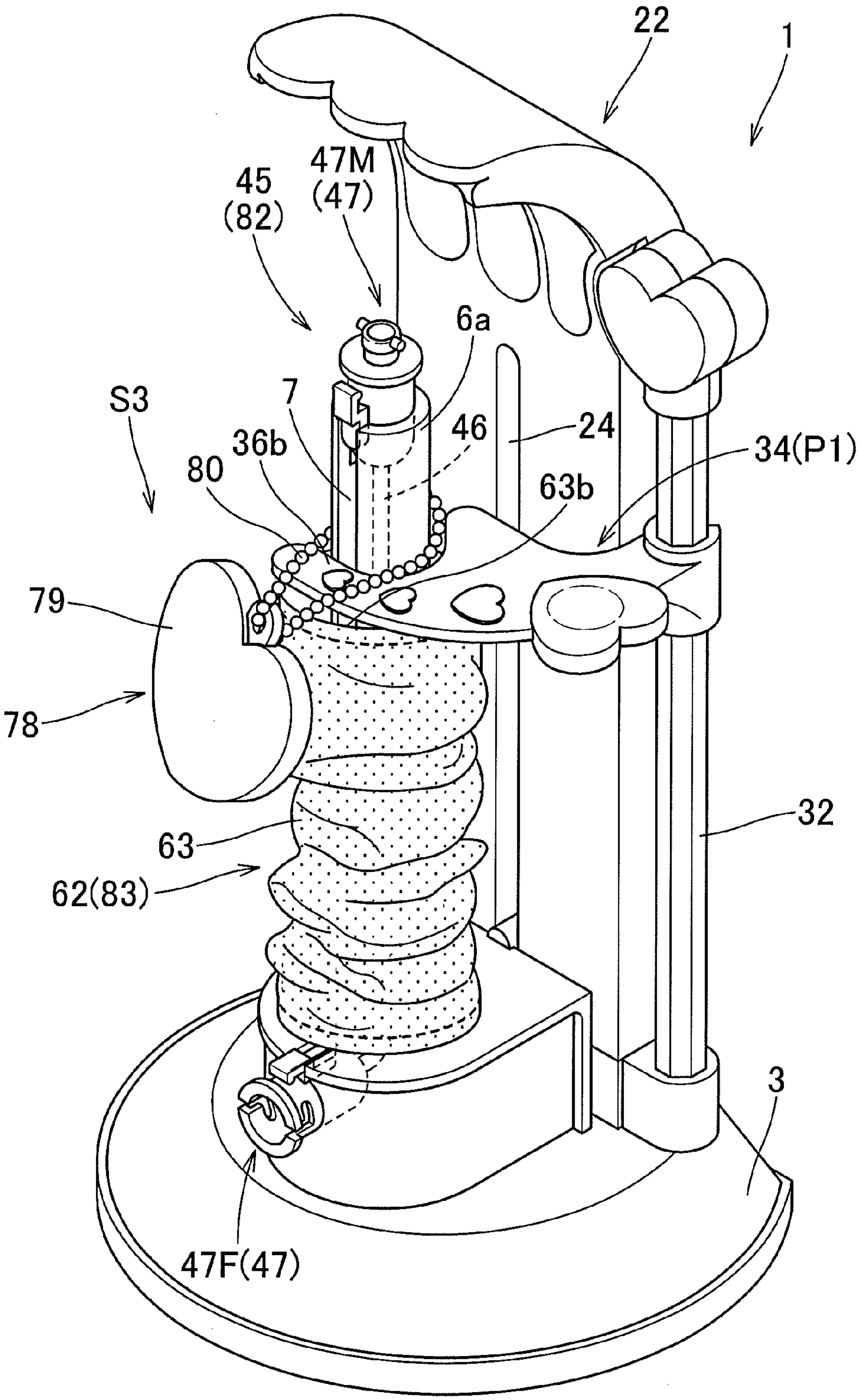
FIG. 30 is a view for explaining a step of making still another accessory by using the accessory making device of the embodiment, and is a perspective view showing a state of the support portion of the holder with a core material attached inserted through a decoration main body material, an upper end of the decoration main body material pressed by the stopper, and a charm attached around the support portion.

Moreover, the stopper 34 of the making device 1 can also be used, when bayonet-coupling the connecting portions 47M, 47F to each other in making of the accessories S1, S2 described above, for pressing the peripheral edge of the opening 63*b* at the upper end side of the decoration main body cloth 63 or the peripheral edge of the opening 68*b* at the upper end side of the second decoration main body cloth 68. Moreover, the stopper 34 can be suitably used also when making an accessory S3 with the charm 78 disposed as an auxiliary decoration in addition to the decoration main body 83, and as shown in FIG. 30, pressing in advance by the stopper 34 disposed at the pressing position P1 the peripheral edge of the opening 63*b* at the upper end side of the decoration main body cloth 63 through which the support portion 6 has been inserted makes the operation of inserting the support portion 6 (cord-like body 46) through the connecting ring 80 of the charm 78 easy.

Figure 31:
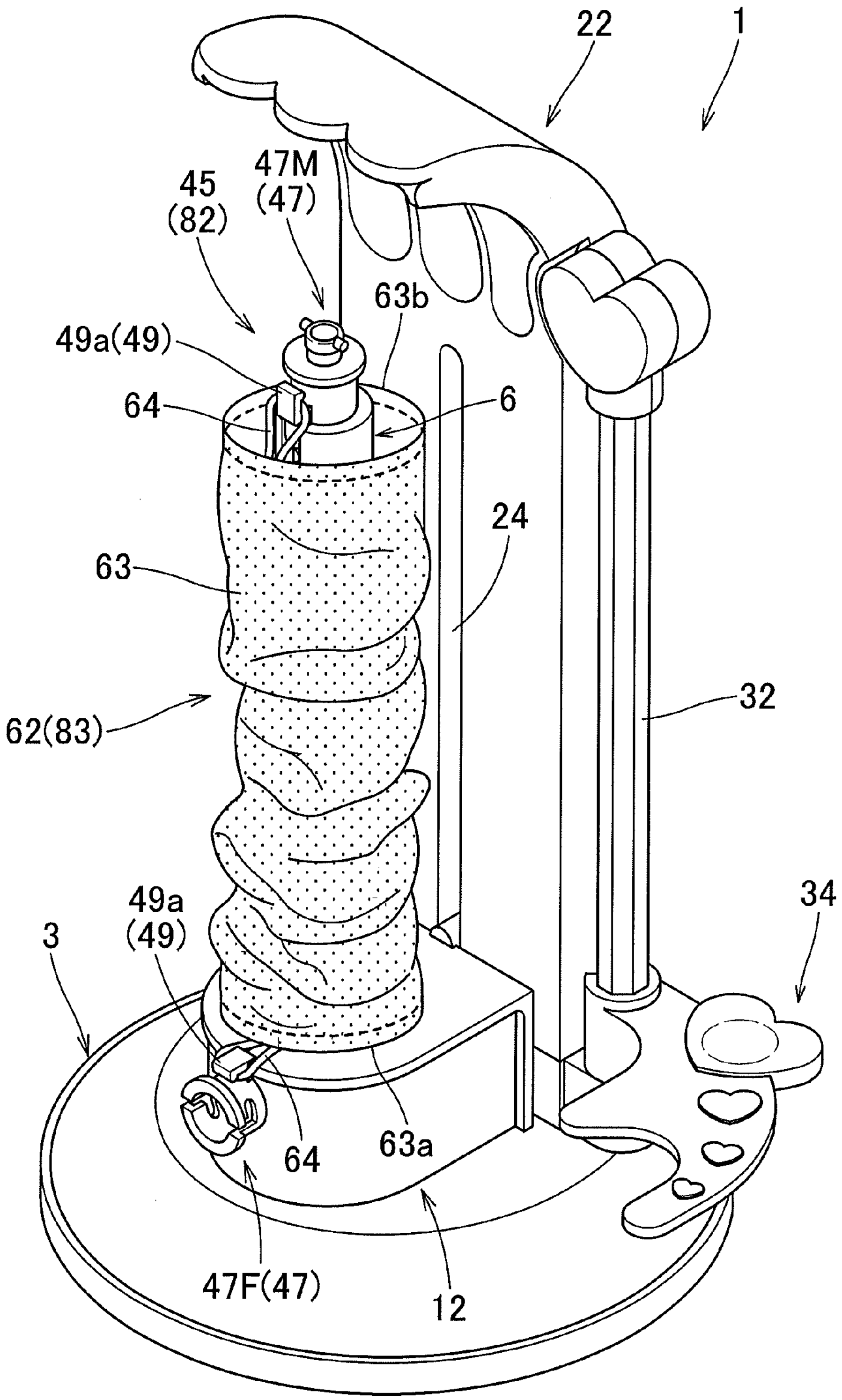
FIG. 31 is a view for explaining a step of making still another accessory by using the accessory making device of the embodiment, and is a perspective view showing a state in which a ring portion is caught on a catching hook formed on each connecting portion of a core material attached to the holder while the support portion is inserted through a decoration main body material.
Figure 32:
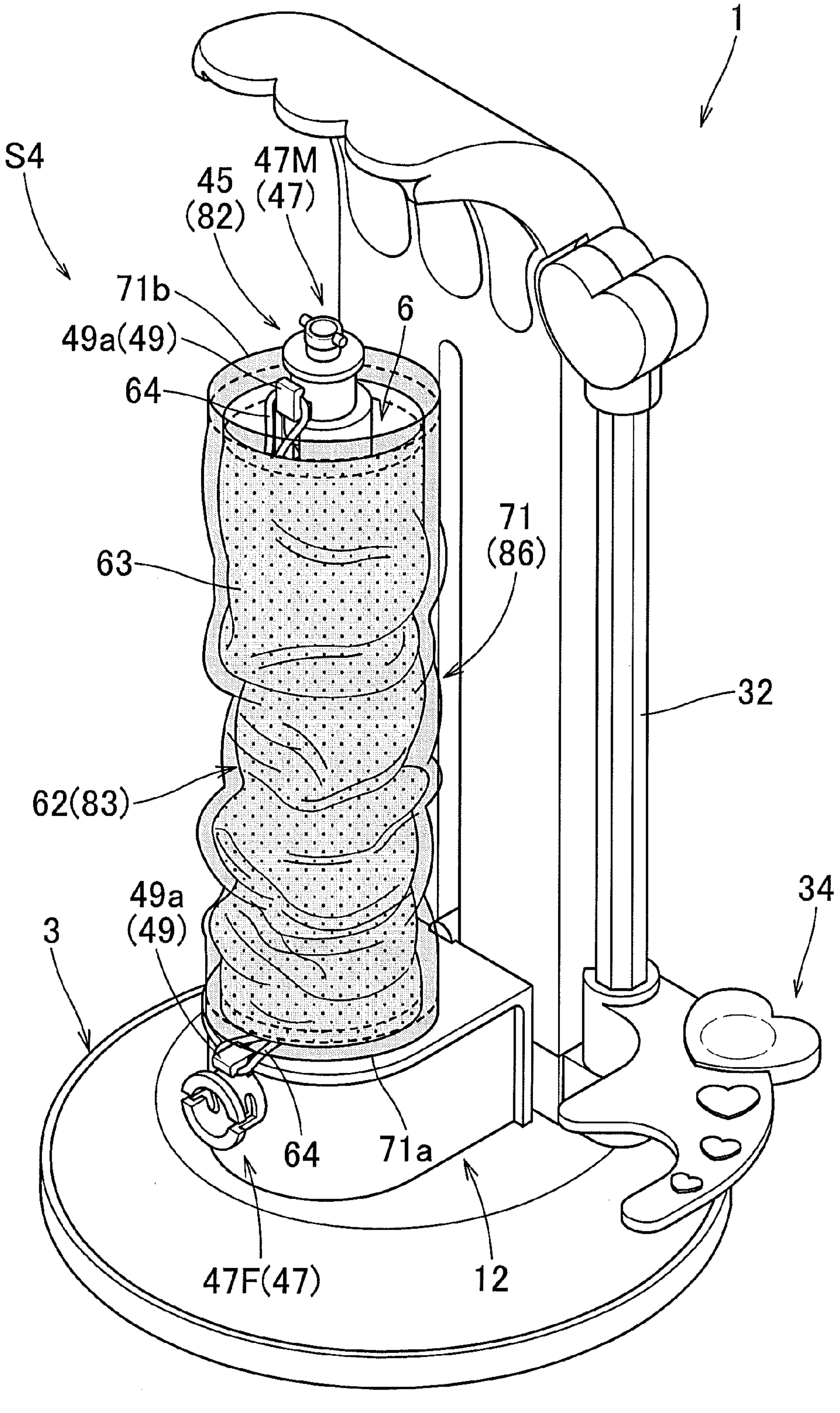
FIG. 32 is a view for explaining a step after FIG. 31, and is a perspective view showing a state of a decorative cover material disposed on the outer peripheral side of the decoration main body material.
Figure 33:
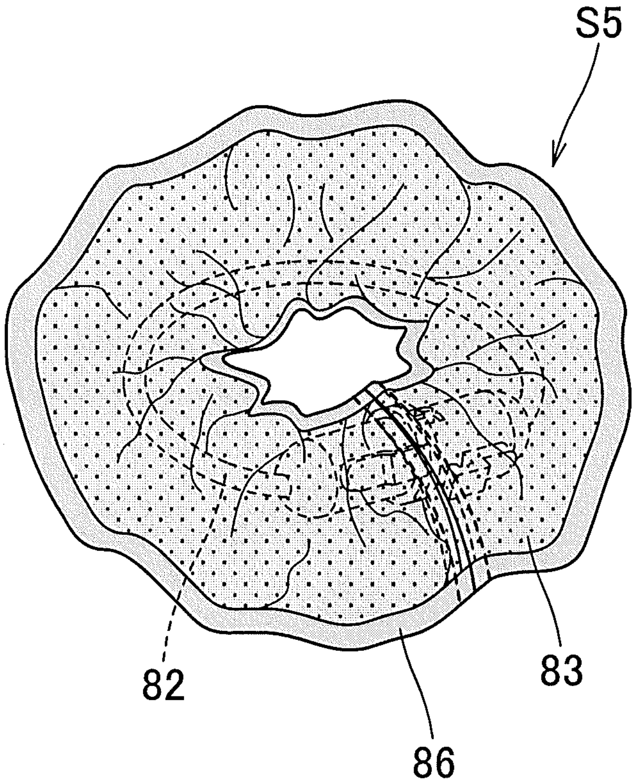
FIG. 33 is a perspective view of an accessory made by the steps shown in FIGS. 31 and 32.

Next, making an accessory S4 using the core material 45, the decoration main body material 62, and the decorative cover material 71 will be described. The support portion 6 is inserted through the decoration main body cloth 63 in such a manner so as to put from above the decoration main body cloth 63 of the decoration main body material 62 over the holder 5 to which the core material 45 has been attached in the same manner as the above, and the decoration main body cloth 63 is disposed on the outer peripheral side of the support portion 6. Next, the ring portions 64, 64 are caught on the catching hooks 49 of the connecting portions 47M, 47F in such a manner so as to insert the tip 49*a* sides of the catching hooks 49 through the ring portions 64, 64 disposed on both end sides (peripheral edges of the openings 63*a*, 63*b*) of the decoration main body cloth 63, respectively (refer to FIG. 31). Subsequently, the decorative cover material 71 is, in such a manner so as to insert the support portion 6 and the decoration main body cloth 63 through an opening 71*a* at one end side, put over the outer peripheral side of the decoration main body cloth 63 from above the support portion 6 with the decoration main body cloth 63 disposed on its periphery, and the decorative cover material 71 is disposed on the outer peripheral side of the decoration main body cloth 63 in such a manner so as to make the connecting portion 47M project from an opening 71*b* at the other end side (refer to FIG. 32). Subsequently, in the same manner as the above, by interconnecting the connecting portions 47M, 47F of the core material 45 by bayonet coupling to form the core 82 in a ring shape, and then moving the slider portion 12 upward, pulling the decoration main body cloth 63 and the decorative cover material 71 out of the support portion 6, and then adjusting the decoration main body cloth 63 and the decorative cover material 71 so as to cover the periphery of the core 82 (cord-like body 46) across the entire circumference by hand etc., the accessory S4 the periphery of the core 82 of which is covered double with the decoration main body 83 and the decorative cover 86 across the entire circumference can be made, as shown in FIG. 33.

Figure 34:
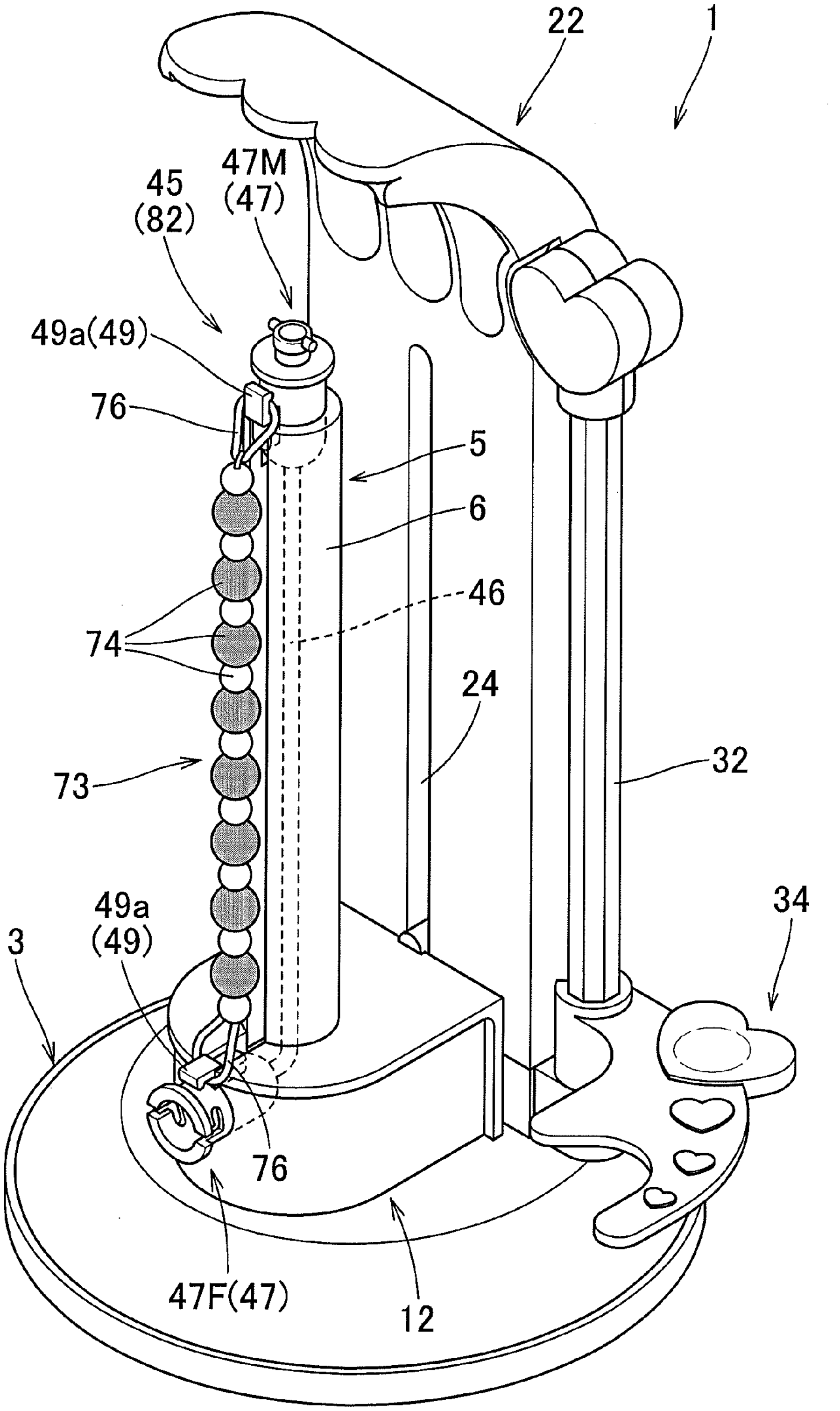
FIG. 34 is a view for explaining a step of making still another accessory by using the accessory making device of the embodiment, and is a perspective view showing a state in which a beads part is attached to a core material attached to the holder in such a manner so as to make a catching ring portion be caught on a catching hook formed on each connecting portion of the core material.
Figure 35:
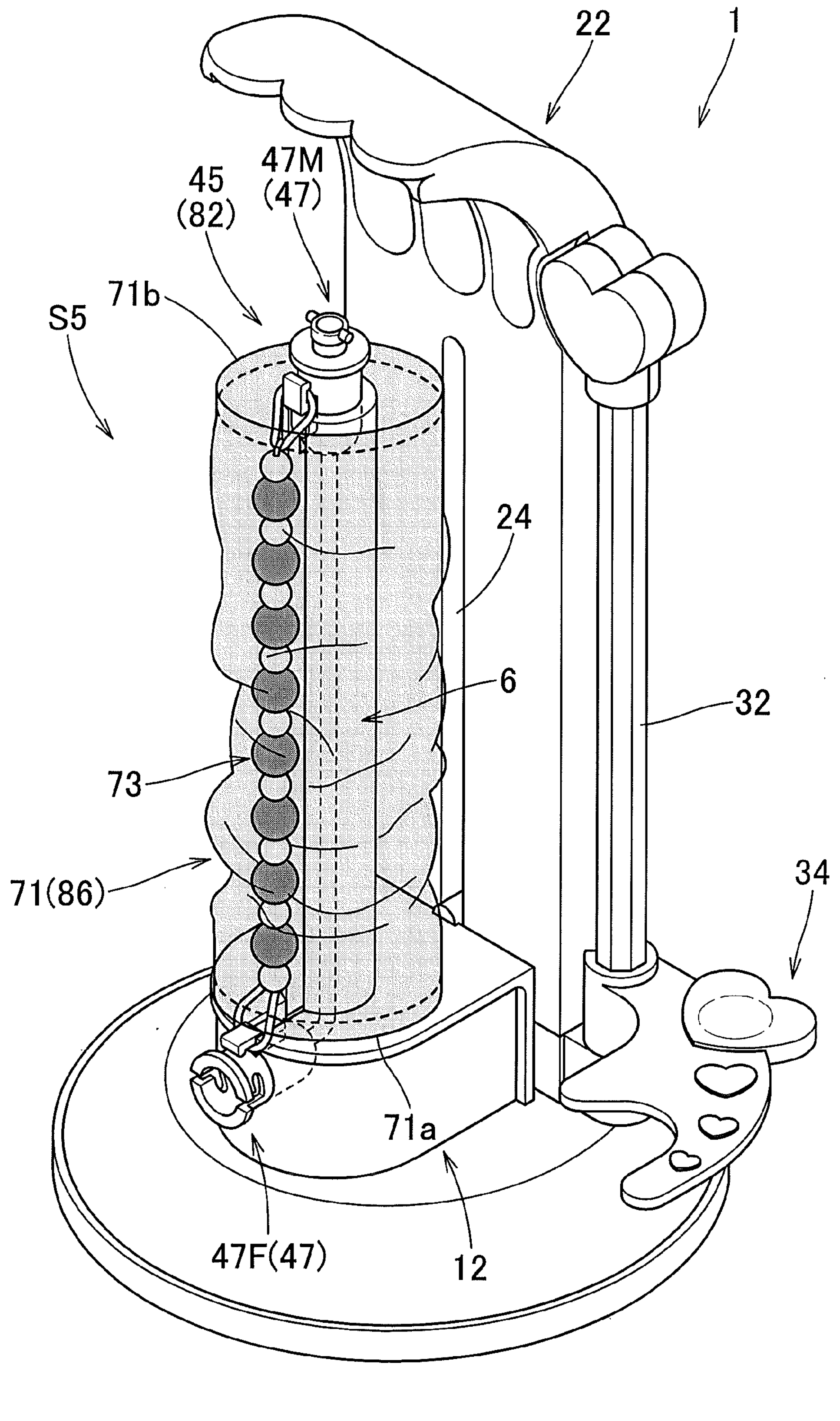
FIG. 35 is a view for explaining a step after FIG. 34, and is a perspective view showing a state of a decorative cover material disposed around the core material and beads part attached to the holder.

Next, making an accessory S5 using the core material 45, the decorative cover material 71, and the beads part 73 as an auxiliary decoration will be described. First, the beads part 73 is attached to the core material 45 in such a manner so as to make the catching ring portions 76 on both end sides be caught on the catching hooks 49 of the connecting portions 47M, 47F of the core material 45 that has been attached to the holder 5 in the same manner as the above (refer to FIG. 34). At this time, the beads part 73 is disposed substantially along the support portion 6. Subsequently, the decorative cover material 71 is, in such a manner so as to insert the support portion 6 and the beads part 73 through an opening 71*a* at one end side, put from above over the holder 5 to which the core material 45 and the beads part 73 have been attached, and the decorative cover material 71 is disposed on the outer peripheral side of the beads part 73 and the support portion 6 in such a manner, as shown in FIG. 35, so as to make the connecting portion 47M project from an opening 71*b* at the other end side. Subsequently, in the same manner as the above, by interconnecting the connecting portions 47M, 47F of the core material 45 by bayonet coupling to form the core 82 in a ring shape, and then moving the slider portion 12 upward, pulling the decorative cover material 71 out of the support portion 6, and then adjusting the decorative cover material 71 so as to cover the periphery of the core 82 (cord-like body 46) across the entire periphery of the core 82 of which is covered with the decorative cover 86 serving as a decoration main body across the entire circumference so as to allow seeing through the beads part 73 disposed along the core 82 from the outside can be made.

Accessories that can be made by using the kit 43 of the embodiment are not limited to those described in the above, and optional accessories can be made, such as, for example, an accessory provided as a double structure by disposing a decorative cover on the outer peripheral side of a split decoration main body, and an accessory in which a beads part is disposed, with both catching ring portions disposed on both end sides caught on a catching hook of one of the connecting portions, so as to project in a ring shape between both ends of a decoration main body disposed in an abutted manner.

Also, the making device 1 of the embodiment includes a long rigid, substantially linear holder 5 (support portion 6), and by attaching a cord-like body 46 to form a core 82 to the holder 5 (support portion 6) in such a manner so as to retain the connecting portions 47 (47M, 47F) disposed on both end sides of the cord-like body 46 while separating the connecting portions 47M, 47F from each other (refer to FIGS. 21 and 22), and as shown in FIG. 23, inserting the support portion 6 of the holder 5 to which the cord-like body 46 has been attached through a decoration main body material 62 to form a decoration main body 83, the cord-like body 46 can be inserted through the decoration main body material 62 (decoration main body 83). Subsequently, while the connecting portions 47M, 47F of the cord-like body 46 inserted through the decoration main body material 62 (decoration main body 83) are interconnected to have the cord-like body 46 in a ring shape (refer to FIG. 25), the holder 5 (support portion 6) is removed from the decoration main body material 62 (decoration main body 83), and by adjusting the decoration main body 83 so as to cover the periphery of the core 82 (cord-like body 46) across the entire circumference by hand etc., the accessory S1 as shown in FIG. 26 can be made. Also, in the making device 1 of the embodiment, because the support portion 6 of the holder 5 has rigidity, even an elementary school child can simply insert the support portion 6 to which the cord-like body 46 has been attached through the decoration main body material 62 (decoration main body 83), and by tucking by hand a decoration main body cloth 63 (decoration main body 83) of the decoration main body material 62 through which the support portion 6 of the holder 5 has been inserted, the decoration main body cloth 63 (decoration main body 83) is easily caused to contract so as to expose the connecting portions 47M, 47F on both end sides of the cord-like body 46 from openings 63*a*, 63*a* at its both end sides.

Therefore, with the making device 1 of the embodiment, even a child can easily make the accessory S1 (scrunchie) for which the tubular decoration main body 83 is disposed in a contracted state around the ring-shaped core 82.

Moreover, in the making device 1 of the embodiment, because the support portion 6 of the holder 5 has a long, substantially linear shape, the cord-like body 46 can be easily attached to the holder 5 with the connecting portions 47M, 47F separated from each other, and further, the support portion 6 of the holder 5 is easily inserted through the decoration main body material 62 (decoration main body 83), so that an accessory can be made more easily. Of course, the holder is not necessarily in a linear shape if this point is not taken into consideration, and for example, a holder bent in a chevron shape or bent in a substantially arc shape may be used.

Further, in the making device 1 of the embodiment, there is formed in the holder 5 the upper retaining recess 8 and the lower retaining recess 16 as retaining recesses that can be inserted with and retain the connecting portions 47M, 47F, in such a manner so as to recess the outer surface of the holder 5, and a recessed groove 7 to insert the cord-like body 46, in such a manner so as to recess the outer surface of the support portion 6 in the holder 5, continuously in the axial direction so as to be able to store the entire length of the cord-like body 46. Therefore, as shown in FIG. 22, in a state where the cord-like body 46 (core material 45) is attached, the cord-like body 46 or the connecting portions 47M, 47F do not partially project on the outer surface side of the holder 5, so that the cord-like body 46 and the connecting portions 47M, 47F are unlikely to interfere with the decoration main body cloth 63 when passing the holder 5 (support portion 6) through the decoration main body cloth 63 of the decoration main body material 62 to form the decoration main body 83, and the holder 5 (support portion 6) can be more easily passed through the decoration main body cloth 63.

Figure 36:
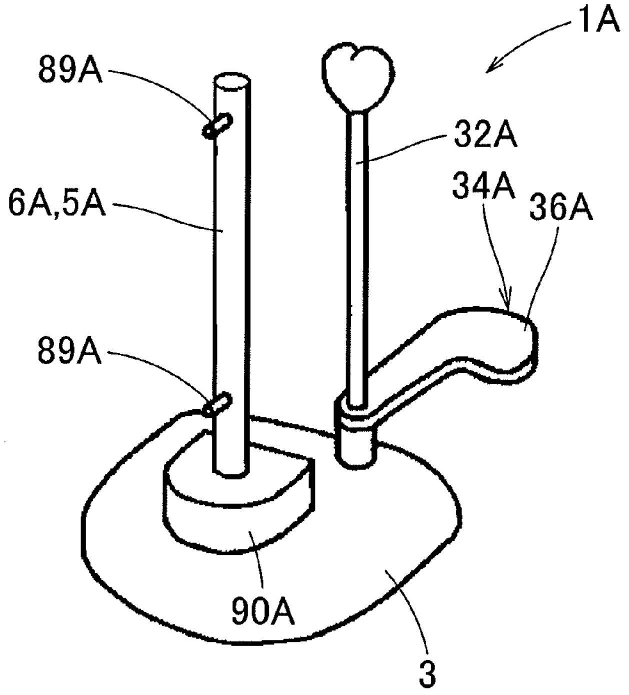
FIG. 36 is a schematic perspective view of an accessory making device which is a modification of the present invention.
Figure 41:
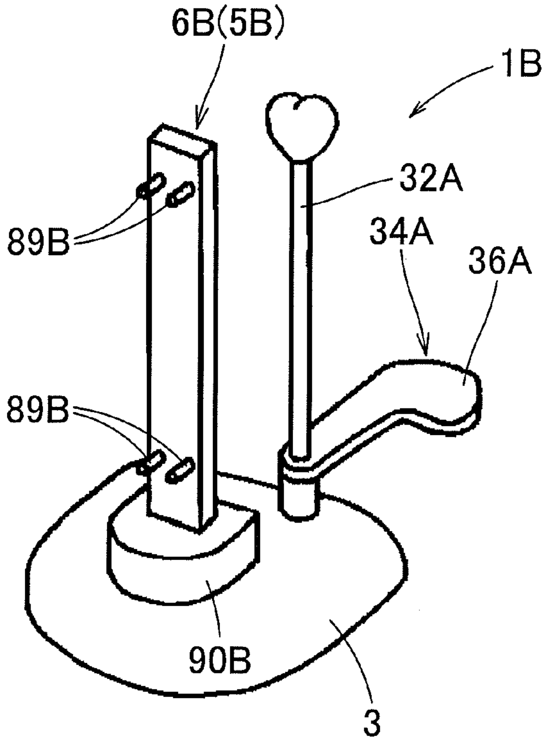
FIG. 41 is a schematic perspective view of an accessory making device which is another modification of the present invention.
Figure 46:
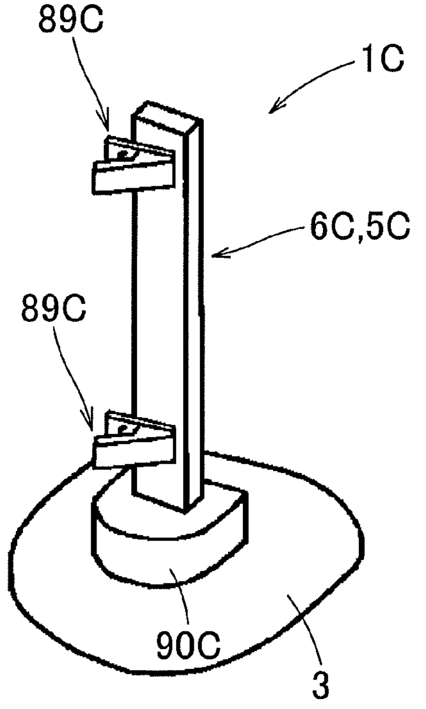
FIG. 46 is a schematic perspective view of an accessory making device which is still another modification of the present invention.
Figure 47:
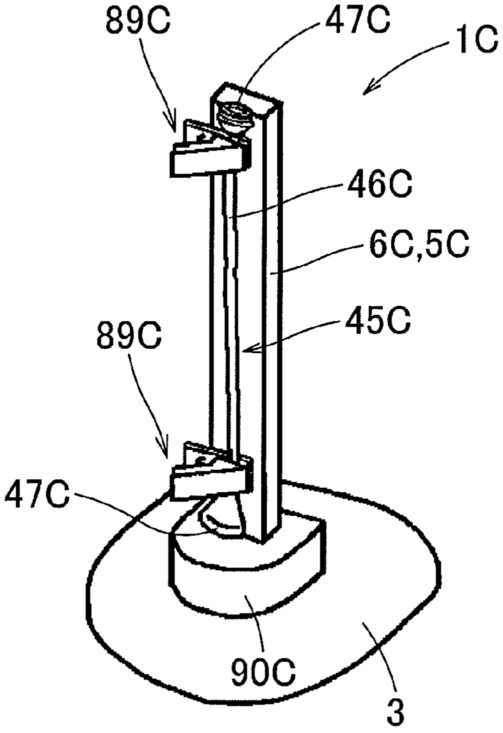
FIG. 47 is a view for explaining an accessory making step using the accessory making device of FIG. 46, and is a schematic perspective view showing a state of a core material attached to a support portion.
Figure 49:
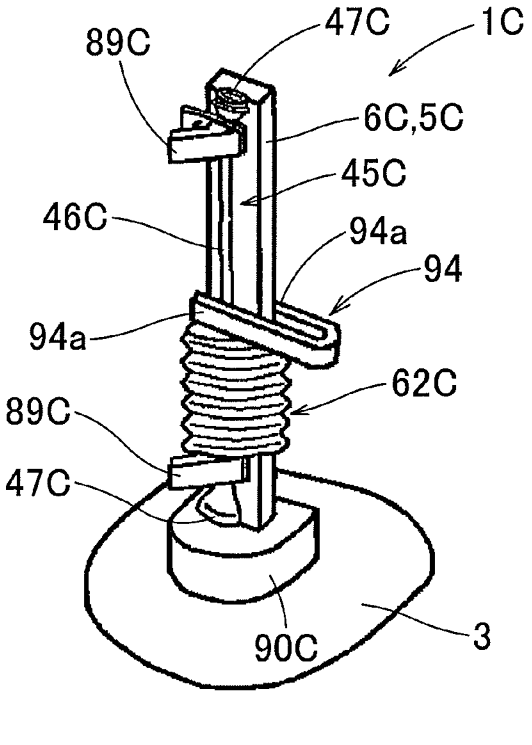
FIG. 49 is a view for explaining a step after FIG. 48, and is a schematic perspective view showing a state of an upper end of the decoration main body material pressed by a stopper.

Of course, if this point is not taken into consideration, as in the making device 1A shown in FIG. 36, the making device 1B shown in FIG. 41, and the making device 1C shown in FIG. 47, there may be disposed on a support portion 6A, 6B, 6C of a holder 5A, 5B, 5C catching portions 89A, 89B, 89C arranged such as to project from the support portion 6A, 6B, 6C. The holder 5A, 5B, 5C of the making device 1A, 1B, 1C is formed only of the support portion 6A, 6B, 6C and has no slider portion. Moreover, in the making device 1A, 1B, a stopper 34A slidably supported on a support shaft 32A does not include a cut-way portion provided at its tip-side part 36A, as shown in FIGS. 36 and 41, and is arranged to dispose a part at a rear edge side of the tip-side part 36A around the support portion 6A, 6B with the stopper 34A disposed at a pressing position (refer to FIGS. 39 and 44). In the making device 1C, as shown in FIG. 49, a stopper 94 separated from the device is used. Further, in the holder 5A, 5B, 5C of the making device 1A, 1B, 1C, there is disposed between the support portion 6A, 6B, 6C and the mount portion 3 a support base portion 90A, 90B, 90C to be formed smaller in outer shape than the mount portion 3 and so as to protrude in an expanded condition in a direction perpendicular to the axis of the support portion 6A, 6B, 6C from near the lower end of the support portion 6A, 6B, 6C (refer to FIGS. 36, 41, and 46). Still moreover, the making device 1A, 1B, 1C does not include a cover portion to cover the periphery of the holder 5A, 5B, 5C.

Figure 37:
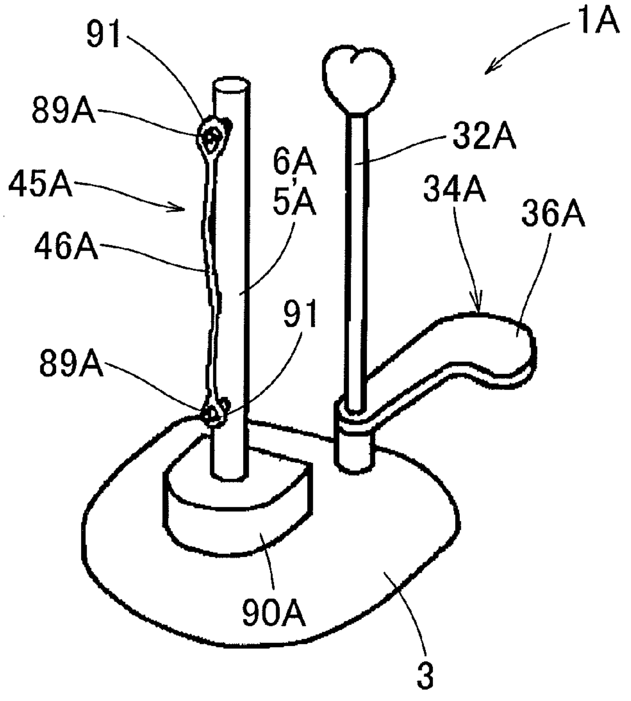
FIG. 37 is a view for explaining an accessory making step using the accessory making device of FIG. 36, and is a schematic perspective view showing a state of a core material attached to a support portion.
Figure 38:
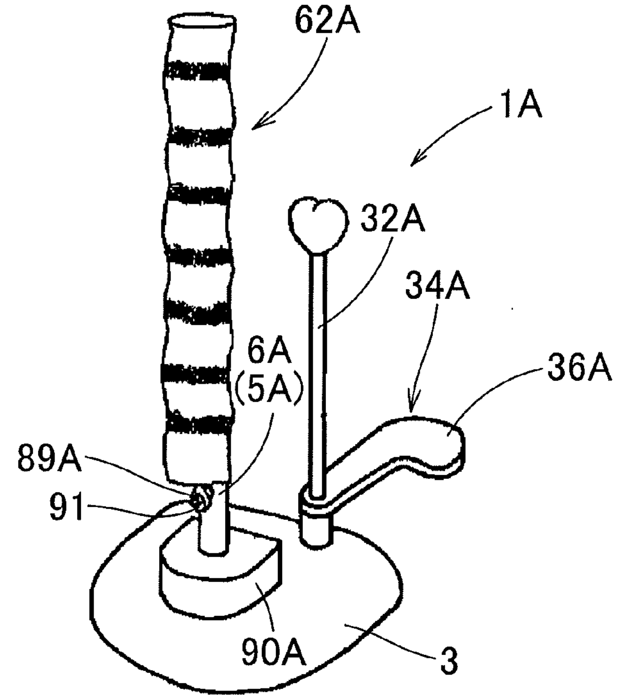
FIG. 38 is a view for explaining a step after FIG. 37, and is a schematic perspective view showing a state of the support portion with the core material attached inserted through a decoration main body material.
Figure 39:
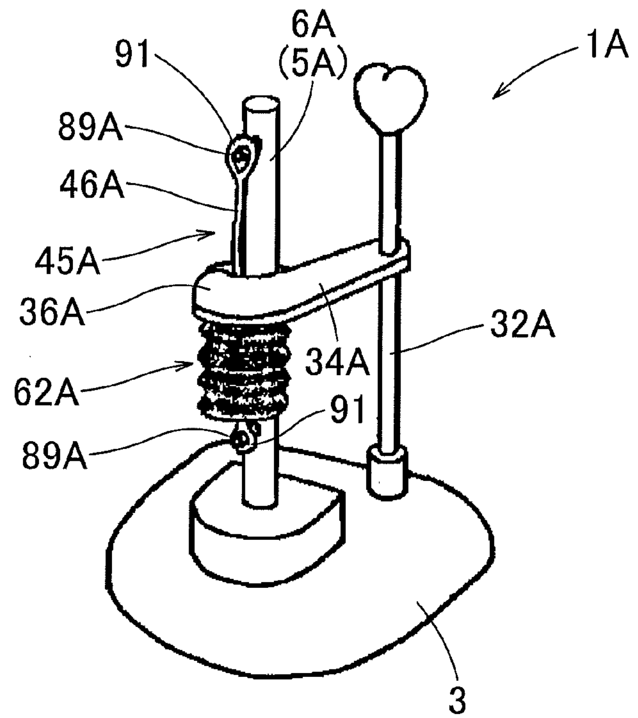
FIG. 39 is a view for explaining a step after FIG. 38, and is a schematic perspective view showing a state of an upper end of the decoration main body material pressed by a stopper.
Figure 40:
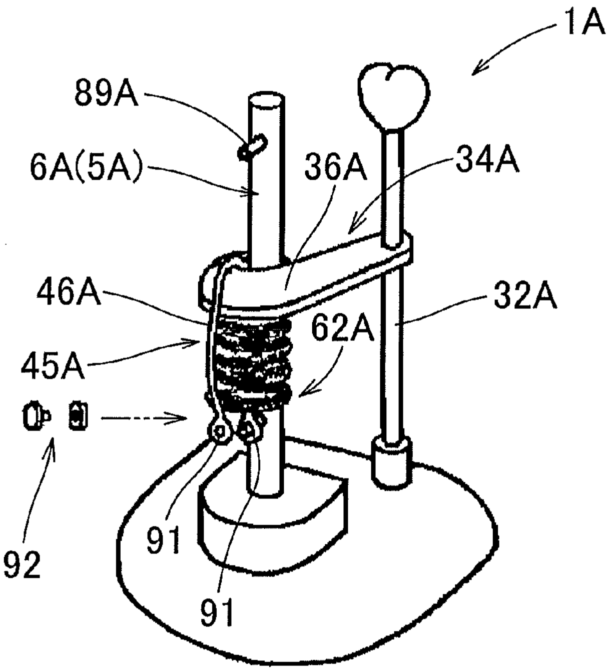
FIG. 40 is a view for explaining a step after FIG. 39, and is a schematic perspective view showing a step of interconnecting connecting portions of the core material.

When described in detail, in the making device 1A, as shown in FIG. 36, there are provided, at both upper and lower end sides of a columnar support portion 6A, catching portions 89A each having a substantially columnar outer shape such as to project forward. The catching portion 89A is arranged to be inserted through ring-shaped connecting portions 91, 91 disposed on both end sides of a cord-like body 46A in a core material 45A to retain the connecting portions 91, 91, respectively (refer to FIG. 37). Moreover, in the core material 45A, the connecting portions 91, 91 are connected to each other in a mutually aligned state by use of a pair of separate fastenings 92 (refer to FIG. 40). Also, when the making device 1A is used, while, as shown in FIG. 38, a decoration main body material 62A is put over the support portion 6A to which the core material 45A has been attached in such a manner, as shown in FIG. 37, so as to insert the catching portions 89A, 89A through the connecting portions 91, 91, respectively, the support portion 6A is inserted through the decoration main body material 62A, and as shown in FIGS. 39 and 40, the peripheral edge of an opening of the decoration main body material 62A is pressed by the stopper 34A, the connecting portions 91, 91 are interconnected to each other by use of the fastenings 92 to have the cord-like body 46A in a ring shape, and by removing the support portion 6A from the decoration main body material 62A in this state, an accessory can be made.

Figure 42:
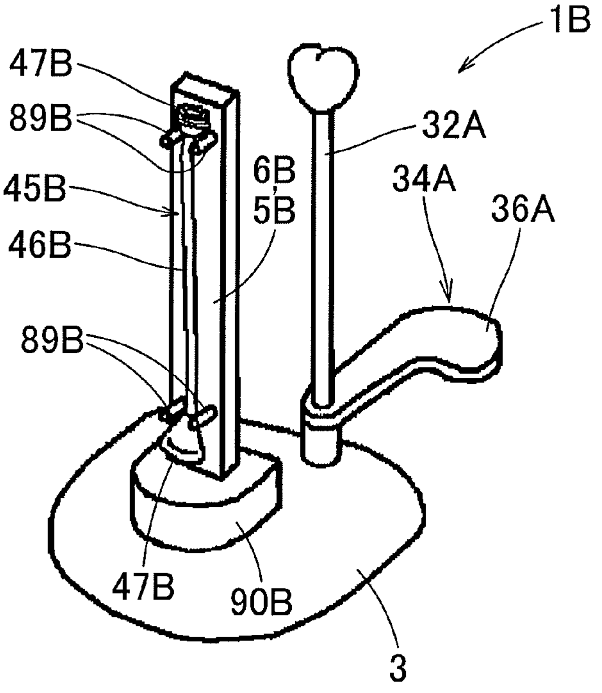
FIG. 42 is a view for explaining an accessory making step using the accessory making device of FIG. 41, and is a schematic perspective view showing a state of a core material attached to a support portion.
Figure 43:
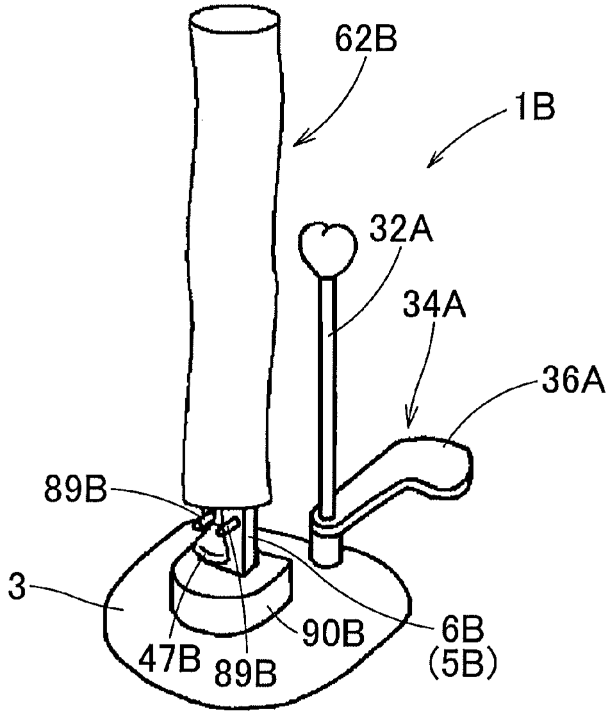
FIG. 43 is a view for explaining a step after FIG. 42, and is a schematic perspective view showing a state of the support portion with the core material attached inserted through a decoration main body material.
Figure 44:
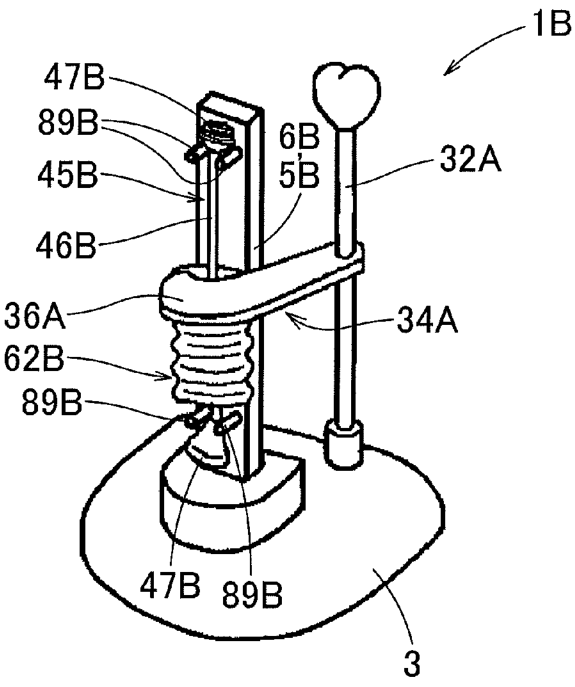
FIG. 44 is a view for explaining a step after FIG. 43, and is a schematic perspective view showing a state of an upper end of the decoration main body material pressed by a stopper.
Figure 45:
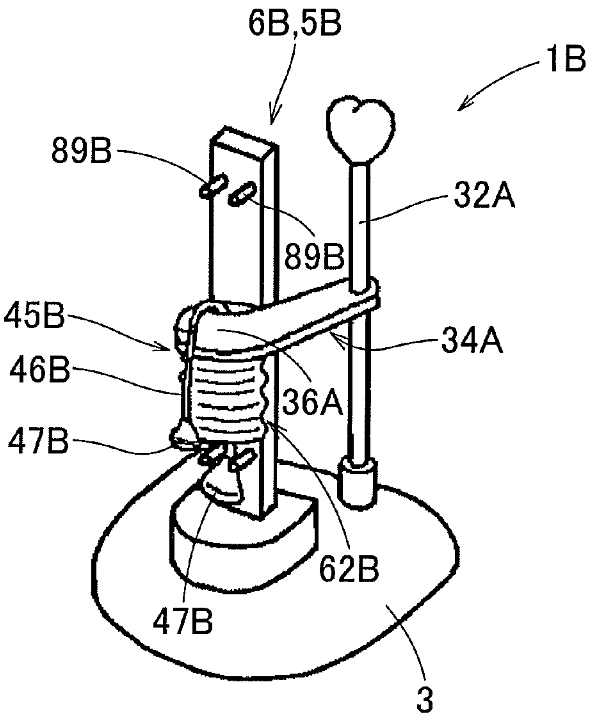
FIG. 45 is a view for explaining a step after FIG. 44, and is a schematic perspective view showing a step of interconnecting connecting portions of the core material.

In the making device 1B, as shown in FIG. 41, the support portion 6B has a long plate shape, and at both upper and lower end sides of the long plate-shaped support portion 6B, there are provided catching portions 89B, each having a substantially columnar outer shape such as to project forward, provided two each, juxtaposed in the left and right direction. In the making device 1B, a core material 45B including connecting portions 47B, 47B having the same arrangement as that of the connecting portions 47 described above except not including catching hooks is used. Also, the catching portions 89B are disposed near root portions of the connecting portions 47B, 47B disposed on both end sides of a cord-like body 46B in the core material 45, respectively, and arranged to catch the connecting portions 47B, 47B in such a manner so as to sandwich the cord-like body 46B in the left and right direction while being brought into contact with the connecting portions 47B, 47B, respectively (refer to FIG. 42). Also when the making device 1B is used, while, as shown in FIG. 43, a decoration main body material 62B is put over the support portion 6B to which the core material 45B has been attached in such a manner, as shown in FIG. 42, so as to sandwich the cord-like body 46B by the catching portions 89B, the support portion 6B is inserted through the decoration main body material 62B, and as shown in FIGS. 44 and 45, the peripheral edge of an opening of the decoration main body material 62B is pressed by the stopper 34A, the connecting portions 47B, 47B are interconnected to have the cord-like body 46B in a ring shape, and by removing the support portion 6B from the decoration main body material 62B in this state, an accessory can be made.

Figure 48:
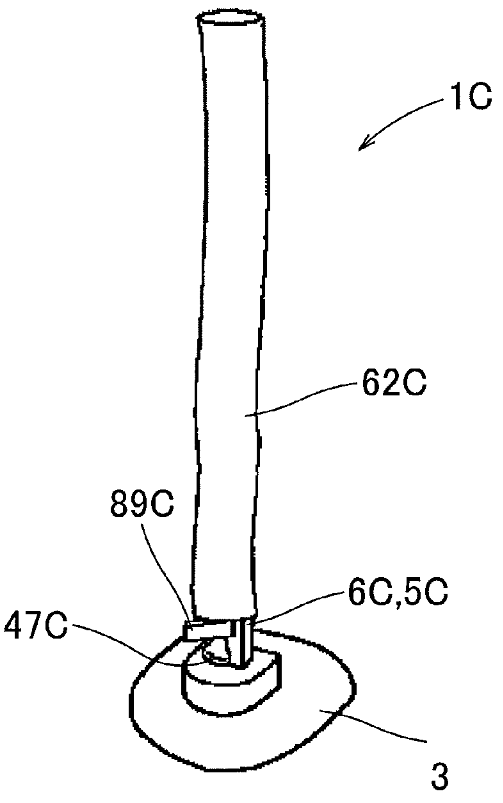
FIG. 48 is a view for explaining a step after FIG. 47, and is a schematic perspective view showing a state of the support portion with the core material attached inserted through a decoration main body material.
Figure 50:
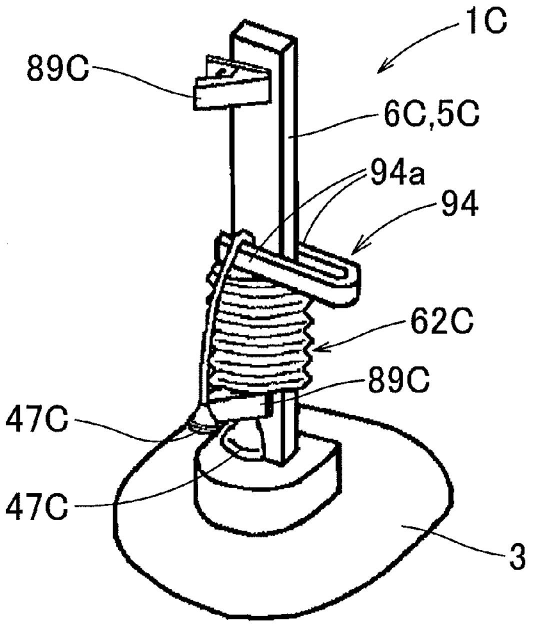
FIG. 50 is a view for explaining a step after FIG. 49, and is a schematic perspective view showing a step of interconnecting connecting portions of the core material.

In the making device 1C, as shown in FIG. 46, the support portion 6C has a long plate shape, and at a front surface side of both upper and lower end sides of the long plate-shaped support portion 6C, there are provided clip-shaped catching portions 89C, 89C capable of catching by pinching parts near connecting portions 47C, 47C in the cord-like body 46. The catching portions 89C are, as shown in FIG. 47, arranged to attach a core material 45 to the support portion 6C in such a manner so as to pinch the cord-like body 46C of the core material 45C at parts near the connecting portions 47C, 47C. Moreover, a stopper 94 used in the making device 1C is, as shown in FIG. 49, not supported on a support portion, and separated from the making device 1C, has a substantially U-shape in section to allow insertion therethrough of the support portion 6C, and is arranged to press the peripheral edge of an opening of the decoration main body material 62C by presser pieces 94*a*, 94*a* disposed in the front and rear of the support portion 6C in a state where the support portion 6C is inserted through the stopper 94. Also when the making device 1C is used, while, as shown in FIG. 48, a decoration main body material 62C is put over the support portion 6C (refer to FIG. 47) to which the core material 45 has been attached in such a manner so as to pinch by the catching portions 89C the cord-like body 46 near its both ends, the support portion 6C is inserted through the decoration main body material 62C, and as shown in FIGS. 49 and 50, the peripheral edge of an opening of the decoration main body material 62B is pressed by the presser piece 94*a* of the stopper 94, the connecting portions 47, 47 are interconnected to have the cord-like body 46 in a ring shape, and by removing the support portion 6C from the decoration main body material 62C in this state, an accessory can be made.

Figure 51:
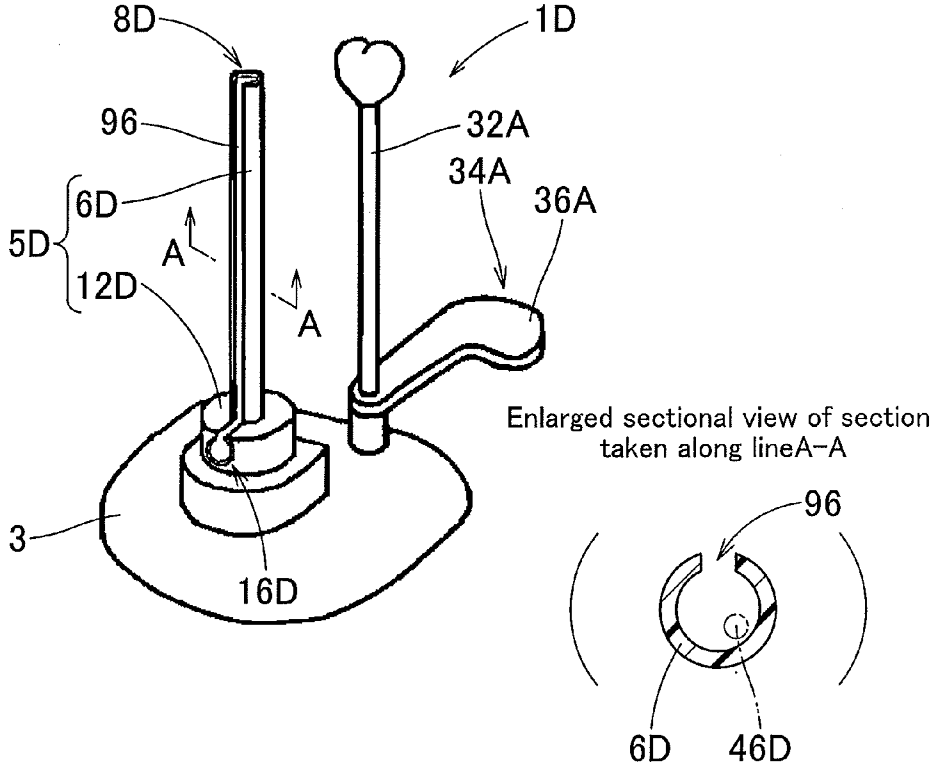
FIG. 51 is a schematic perspective view of an accessory making device which is still another modification of the present invention.

Moreover, in the making device 1 of the embodiment, the recessed groove 7 formed in the support portion 6 is arranged with an opening width dimension W1 that is constant in the front and rear direction, but as in the making device 1D shown in FIG. 51, there may be an arrangement in which a cut-away portion 96 is provided, in place of a recessed groove, continuously in the axial direction (up-and-down direction) of a cylindrical support portion 6D that is hollow inside, and a cord-like body 46 is stored inside the support portion 6D through the cut-away portion 96. In the making device 1D, the holder 5D has the same arrangement as that of the holder 5 in the making device 1 described above except that the support portion 6D is hollow, and the same members will be denoted by the same reference signs suffixed with "D" so as to omit detailed descriptions. Moreover, the making device 1D does not include a cover portion to cover the periphery of the holder 5D, and a stopper 34A having the same arrangement as that of the making devices 1A, 1B is used. However, from the viewpoint that, when removing the core material 45 (cord-like body 46) from the holder 5, the cord-like body 46 once stored inside can be smoothly taken out of the recessed groove 7 while suppressing interface with the peripheral edge of the opening in the recessed groove 7, it is preferable to make the opening width dimension W1 of the recessed groove 7 substantially constant in the front and rear direction, as in the embodiment.

Figure 52:
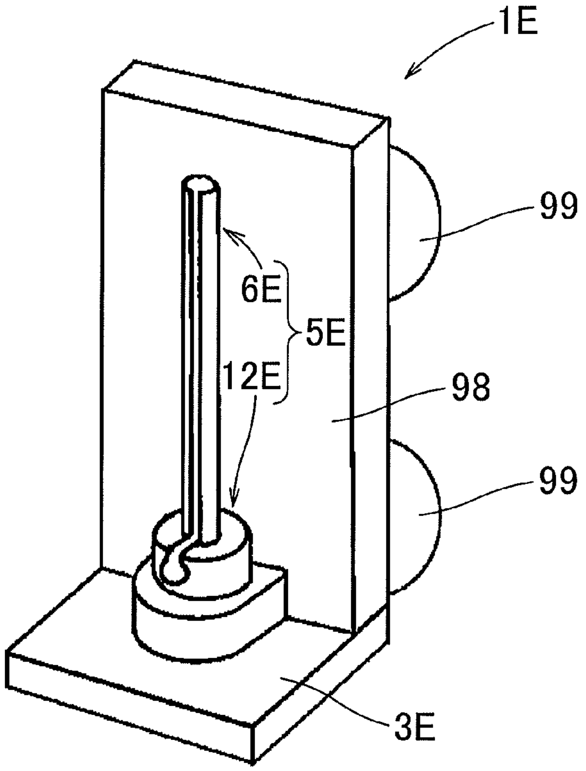
FIG. 52 is a schematic perspective view of an accessory making device which is still another modification of the present invention.

Further, the making device 1 of the embodiment includes the mount portion 3 having the bottom surface 3*a* that can be placed on the mounting surface F, and has an arrangement in which the holder 5 is disposed supported on the mount portion 3 so as to project from the mount portion 3. Therefore, in the making device 1 of the embodiment, by placing the mount portion 3 in such a manner so as to make the bottom surface 3*a* contact the mounting surface F in making an accessory, the holder 5 is supported on the mount portion 3, so that it is not necessary to grip and hold the holder when retaining the cord-like body 46 (core material 45) or when inserting the holder through the decoration main body 83 (decoration main body cloth 63), which makes making an accessory easier. Of course, if this point is not taken into consideration, for example, a making device having an arrangement not including a mount portion but formed only of a holder may be used. Moreover, it is not always necessary to use a making device in such a manner so as to place a mount portion on a mounting surface, and for example, as in the making device 1E shown in FIG. 52, there may be an arrangement in which an attaching wall portion 98 such as to project upward from the mount portion 3 is formed on a back surface side (behind) of the holder 5, and two suckers 99 are provided at a rear surface side of the attaching wall portion 98. The making device 1E can be used fixed to a wall surface or the like lying in the vertical direction by use of the suckers 99, and alternatively, similar to the making device 1 of the embodiment, the making device 1E can also be used with its mount portion 3E placed on a mounting surface. Moreover, when the making device is arranged as such, a magnet may be provided on the rear surface of the attaching wall portion so as to allow fixation to a wall surface or the like made of a magnetic body.

Figure 53:
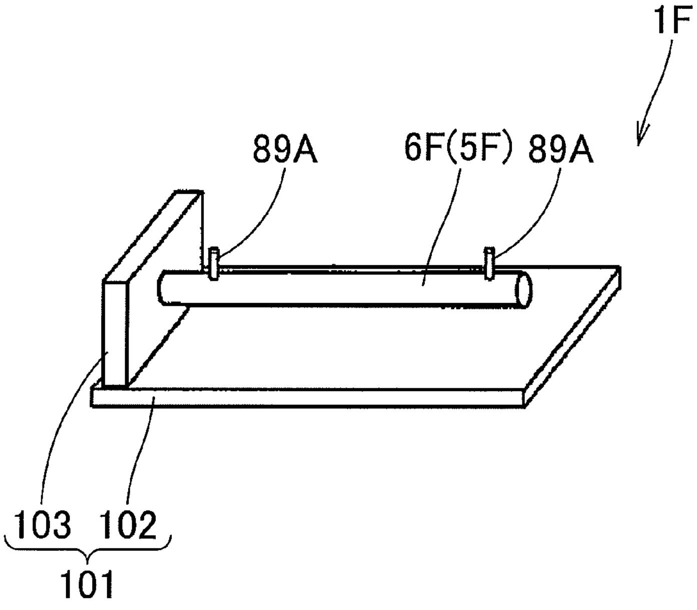
FIG. 53 is a schematic perspective view of an accessory making device which is still another modification of the present invention.

Also, particularly in the making device 1 of the embodiment, because the support portion 6 of the holder 5 is disposed so as to project upward from the mount portion 3, when inserting the support portion 6 of the holder 5 through the decoration main body 83 (decoration main body cloth 63) in making an accessory, by fitting the decoration main body 83 (decoration main body cloth 63) over the support portion 6 so as to insert the upper end 6*a* of the support portion 6 through the opening 63*a* at one end portion side and pushing down the decoration main body 83 (decoration main body cloth 63) toward the mount portion 3 so as to make the upper end 6*a* of the support portion 6 project from the opening 63*b* at the other end portion side, the decoration main body 83 (decoration main body cloth 63) can, as shown in FIG. 23, be easily caused to contract so as to be reduced in length dimension while being disposed so as to cover the outer peripheral side of the support portion 6, which makes making an accessory easier. Of course, if this point is not taken into consideration, as in the making device 1F shown in FIG. 53, there may be an arrangement in which a mount portion 101 includes a bottom wall 102 that can be placed on a mounting surface and a vertical wall 103 that projects upward from one end of the bottom wall 102, and a support portion 6F as a holder 5F is disposed so as to project from the vertical wall 103 in the horizontal direction so as to lie substantially along the bottom wall 102.

Still moreover, in the embodiment, because the making device 1, as shown in FIG. 3, includes the cover portion 22 formed so as to project upward from the mount portion 3, and bent at its tip side for covering the upper end 6*a* of the holder 5 (support portion 6) from above, the periphery of the holder 5 (support portion 6) disposed so as to project from the mount portion 3 can be protected by the cover portion 22, so that contact of the upper end 6*a* side of the support portion 6 with a user can be suppressed. Moreover, in the making device 1 of the embodiment, even when the decoration main body 83 (decoration main body cloth 63) through which the support portion 6 has been inserted takes a mode of restoration from a contracted state in making an accessory, the decoration main body 83 can, as shown by the alternate long and two short dashed lines of FIG. 23, be brought into contact with the upper side portion 29 of the cover portion 22 covering the support portion 6 from above, so that causing large restoration of the decoration main body 83 (decoration main body cloth 63) so as to make its end edge largely project upward can also be prevented.

Figure 54:
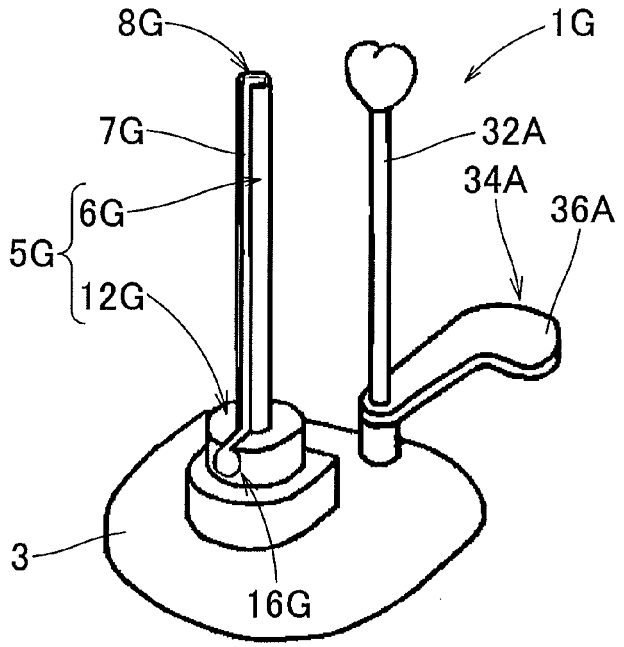
FIG. 54 is a schematic perspective view of an accessory making device which is still another modification of the present invention.
Figure 55:
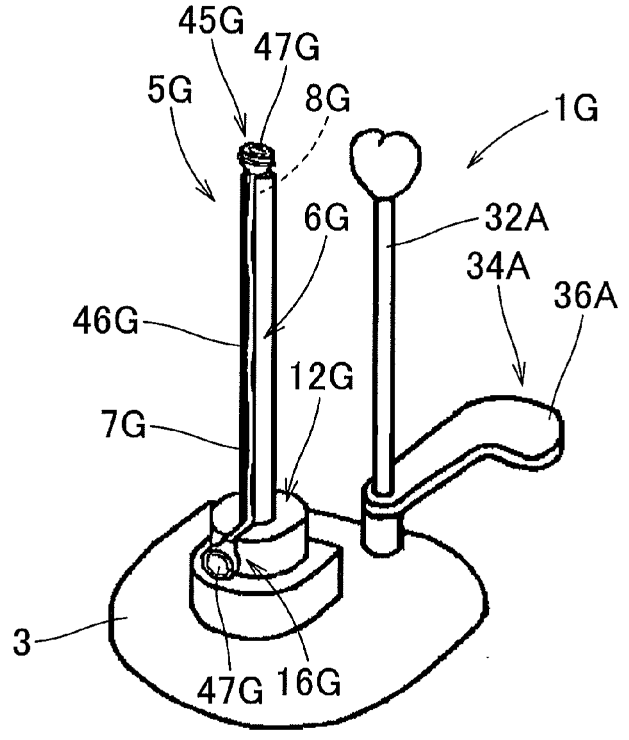
FIG. 55 is a view for explaining an accessory making step using the accessory making device of FIG. 54, and is a schematic perspective view showing a state of a core material attached to a support portion.
Figure 56:
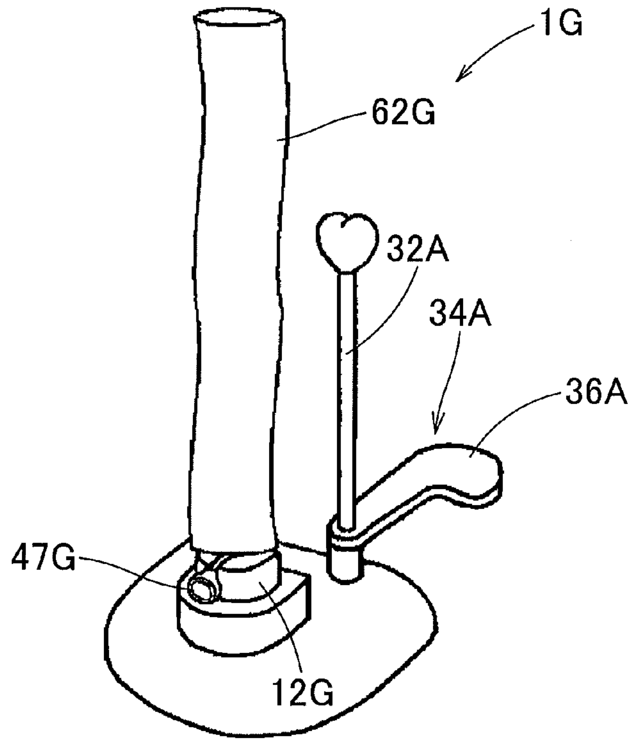
FIG. 56 is a view for explaining a step after FIG. 55, and is a schematic perspective view showing a state of the support portion with the core material attached inserted through a decoration main body material.
Figure 57:
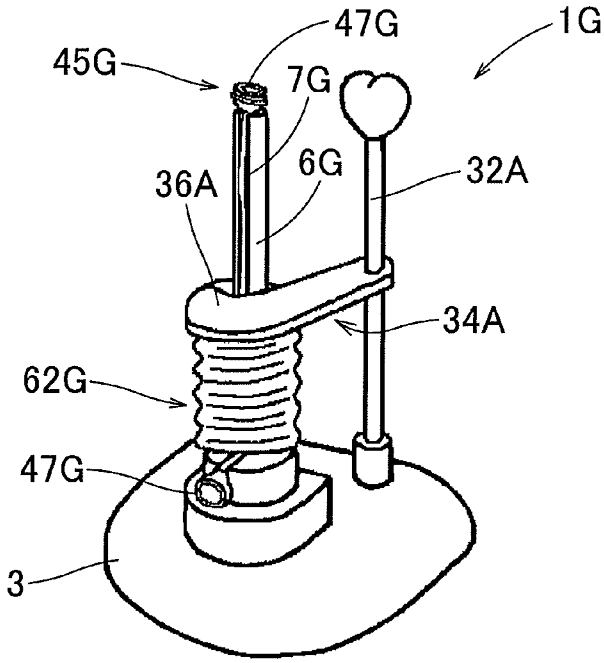
FIG. 57 is a view for explaining a step after FIG. 56, and is a schematic perspective view showing a state of an upper end of the decoration main body material pressed by a stopper.
Figure 58:
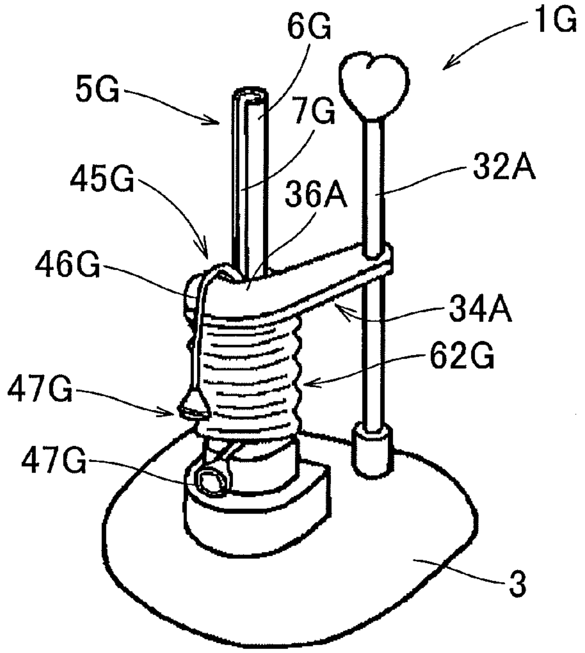
FIG. 58 is a view for explaining a step after FIG. 57, and is a schematic perspective view showing a step of interconnecting connecting portions of the core material.

Of course, if this point is not taken into consideration, as in the making devices 1A, 1B, 1C, 1D, 1E, and 1F described above and the making device 1G shown in FIG. 54, there may be an arrangement not including a cover portion for covering a holder from above. The making device 1G shown in FIG. 54 has the same arrangement as that of the making device 1 except having an arrangement not including a cover portion and using a stopper 34A having the same configuration as that of the stopper 34A of the making device 1A, and the same members will be denoted by the same reference signs suffixed with “G” so as to omit detailed descriptions. Also when the making device 1G is used, while, as shown in FIG. 56, a decoration main body material 62G is put over a support portion 6G of a holder 5G to which a core material 45G has been attached in such a manner, as shown in FIG. 55, so as to insert base portions 48G of connecting portions 47G, 47G into an upper retaining recess 8G and a lower retaining recess 16G, respectively, the support portion 6G is inserted through the decoration main body material 62G, and as shown in FIGS. 57 and 58, the peripheral edge of an opening of the decoration main body material 62G is pressed by the stopper 34A, the connecting portions 47G, 47G are interconnected to have a cord-like body 46G in a ring shape, and by removing the support portion 6G from the decoration main body material 62G in this state, an accessory can be made.

Figure 59:
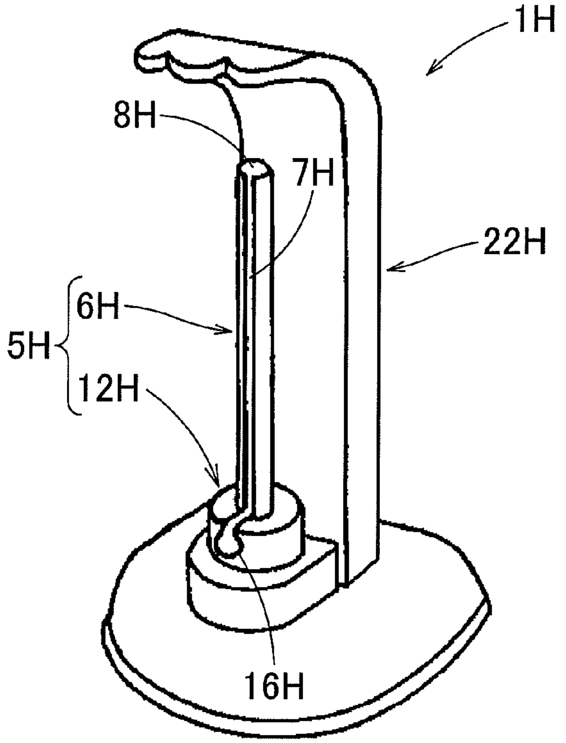
FIG. 59 is a schematic perspective view of an accessory making device which is still another modification of the present invention.

Still moreover, because the making device 1 of the embodiment includes the stopper 34 that is attachable and detachable on the support portion 6 of the holder 5, and when being attached to the support portion 6 of the holder 5, restricts the decoration main body 83 (decoration main body cloth 63) covering the outer peripheral side of the support portion 6 from extending such as to be restored from a contracted state, the contracted state of the decoration main body 83 (decoration main body cloth 63) disposed so as to cover the periphery of the support portion 6 can be maintained in making an accessory, which makes the operations easy, including the interconnecting operation of the connecting portions 47M, 47F disposed on both ends of the cord-like body 46 and the operation of, for example, as shown in FIG. 30, inserting the cord-like body 46 through the separate charm 78. Of course, if this point is not taken into consideration, as in the making device 1H shown in FIG. 59, there may be an arrangement not including a stopper.

Further, because the making device 1 of the embodiment includes the support shaft 32 that slidably supports the stopper 34, the stopper 34 can be arranged integrally with the mount portion 3 and the holder 5, and loss during use can be prevented. Of course, if this point is not taken into consideration, as in the making device 1C described above, a making device may be arranged so as to use a separate stopper 94. Moreover, in the making device 1 of the embodiment, because the stopper 34 that presses the end edge of the decoration main body 83 (decoration main body cloth 63) in a contracted state can be moved freely in a direction along the axis direction and a direction along the circumferential direction on the support shaft 32 extending from the mount portion 3, the stopper 34, even when being arranged to be supported on the support shaft 32, is excellent also in operability and can also be easily moved also by a child.

In the embodiment, the stopper 34 is, as described above, supported on the support shaft 32 by inserting the substantially octagonal prism-shaped support shaft 32 through the through portion 40 having a substantially octagonal opening, and can thus be easily stopped at a desired position from turning in the circumferential direction of the support shaft 32, and in a state where the stopper 34 is disposed at the pressing position P1, is supported on the support shaft 32 while being prevented from falling freely by a frictional force produced between the support shaft 32 and the through portion 40. Therefore, the stopper 34 can be prevented from unexpectedly turning in the circumferential direction and moving up and down during use. Of course, if this point is not taken into consideration, there may be an arrangement in which the support shaft has a columnar shape, the through portion of the attaching base portion of the stopper has a cylindrical shape, and the stopper can freely perform a turn in the circumferential direction and sliding movement in the axial direction on the support shaft.

Still moreover, in the making device 1 of the embodiment, there is provided on the holder 5 the slider portion 12 that is capable of sliding movement on the support portion 6, and the slider portion 12 has an arrangement including a pressing surface (upper surface 14) that can press and move an end face of the decoration main body 83 (decoration main body cloth 63) disposed so as to cover the outer periphery of the support portion 6 at the time of sliding movement. Moreover, there is also formed in the slider portion 12 the lower retaining recess 16 that can retain the connecting portion 47 disposed on one end side of the cord-like body 46 (core material 45). Therefore, in the making device 1 of the embodiment, by causing sliding movement so as to raise the slider portion 12 of the holder 5 on the support portion 6 with the connecting portions 47M, 47F on both end sides of the cord-like body 46 having been inserted through the decoration main body 83 (decoration main body cloth 63) interconnected to have the cord-like body 46 in a ring shape in making an accessory S1, as shown in FIG. 25, the ring-shaped cord-like body 46 whose connecting portion 47F is retained on the lower retaining recess 16 of the slider portion 12 and the decoration main body 83 (decoration main body cloth 63) are moved on the support portion 6 together with the slider portion 12, so that the support portion 6 can be simply pulled and removed from the decoration main body 83 (decoration main body cloth 63). Moreover, in the making device 1 of the embodiment, because the slider portion 12 is set to a size that does not allow insertion through the decoration main body 83 (decoration main body cloth 63), and the pressing surface (upper surface 14) of the slider portion 12 is arranged to be able to press and move the decoration main body 83 (decoration main body cloth 63), by gripping and holding only the slider portion 12 and moving it on the support portion 6, the decoration main body 83 (decoration main body cloth 63) can be easily moved on the support portion 6, and thus the operation can be simply performed also by a child with small hands. Of course, if this point is not taken into consideration, there may be an arrangement in which no slider portion is disposed on the holder portion, as in the making devices 1A, 1B, 1C described above.

Particularly, in the making device 1 of the embodiment, by bringing the guide protrusion 18 into contact with the upper edge 24*b* of the guide groove portion 24 at the time of upward movement of the slider portion 12, the slider portion 12 is disposed so as to locate the upper surface 14 above the upper end of the recessed groove 7 and at substantially the middle in the up-and-down direction of the peripheral wall portion 9 to form the upper retaining recess 8. Therefore, by moving the slider portion 12 upward until the guide protrusion 18 is brought into contact with the upper edge 24*b* of the guide groove portion 24, the end portion (peripheral edge of the opening 63*a*) of the decoration main body cloth 63 is located near the upper end 6*a* of the support portion 6, so that even without causing upward movement of the decoration main body cloth 63 so as to pull it out of the support portion 6, by causing forward movement of the connecting portion 47F so as to draw it out of the lower retaining recess 16, the decoration main body cloth 63 (decoration main body 83) and the ring-shaped core 82 can be drawn out, and thus the removing operation of the decoration main body 83 and the ring-shaped core 82 from the holder 5 is easy. Of course, if this point is not taken into consideration, the guide groove portion may have a short up-down length not to arrange the slider portion 12 so as to be capable of upward movement up to near the upper end 6*a* of the support portion 6. Moreover, it is not always necessary to dispose the guide protrusion 18 and the guide groove portion 24 along which the guide protrusion 18 is slid, but it is preferable to dispose the guide protrusion 18 and the guide groove portion 24 along which the guide protrusion 18 is slid from the viewpoint of preventing the slider portion 12 from turning in the circumferential direction of the support portion 6 at the time of sliding movement and preventing the slider portion 12 from coming off the support portion 6.

Moreover, in the embodiment, as described above, the slider portion 12 is arranged to be able to be suppressed at the time of upward movement from making downward movement such as to fall freely by a frictional force produced with the rear side portion 23 of the cover portion 22. Therefore, the slider portion 12 after upward movement can be prevented from unexpectedly making downward movement during use. Of course, if this point is not taken into consideration, a slider portion arranged to be able to fall freely also after upward movement may be used.

Still moreover, in the making device 1 of the embodiment, the lower retaining recess 16 disposed on the side closer to the mount portion 3 is arranged, in the holder 5, to be able to retain the connecting portions 47M, 47F of the cord-like body 46 (core material 45) so as to project forward, a direction substantially perpendicular to the axial direction of the support portion 6 in the holder 5 (refer to FIG. 22). Therefore, with the cord-like body 46 (core material 45) attached to the holder 5, the connecting portion 47F on the side closer to the mount portion 3 is retained on the holder 5 so as to project forward to be in a direction perpendicular to the axis from the support portion 6, so that when interconnecting the connecting portions 47M, 47F of the cord-like body 46 (core material 45), it becomes possible to interconnect the connecting portions 47M, 47F, with the connecting portion 47F retained on the side closer to the mount portion 3 maintained in the retained state with the holder 5 (inserted state into the lower retaining recess 16), in such a manner so as to separate only the other connecting portion 47M from the holder 5, and as compared with when both connecting portions are gripped and held by hand and connected, the connecting operation can be stably performed, and a child can also simply perform the operation. Of course, if this point is not taken into consideration, as in the making device 1B, 10 described above, there may be an arrangement in which the connecting portions 47M, 47F disposed on both end sides of the cord-like body 46 in the core material 45 are attached to the support portion 6B, 6C in such a manner so as to make both of the connecting portions 47M, 47F lie substantially in the axial direction of the support portion 6B, 6C.

Still moreover, although not shown, as a making device, there may be an arrangement in which a holder is detachably attached to a mount portion, and in the making device arranged as such, the holder can be stored in a compact manner by being detached from the mount portion when not used.

Figure 60:
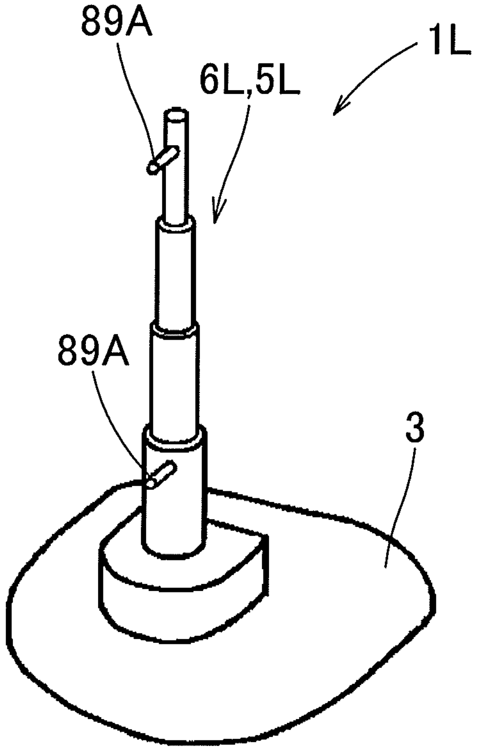
FIG. 60 is a schematic perspective view of an accessory making device which is still another modification of the present invention.

Moreover, as in the making device 1L shown in FIG. 60, a support portion 6L of a holder 5L may be arranged to be extensible, and also in the case of such an arrangement, the support portion 6L can be stored in such a manner so as to reduce the length thereof when not used, and can thus be stored in a compact manner.

Moreover, in the core material 45 as a component of the kit 43 for making the accessory S1 by use of the making device 1 of the embodiment, the paired connecting portions 47M, 47F are connected to each other by bayonet coupling. Therefore, in making the accessory S1, at the time of connection of the connecting portions 47M, 47F projecting from both ends of the decoration main body cloth 63 in the decoration main body material 62, by moving the connecting portions 47M, 47F so as to approximate each other in order to insert the insertion protrusion portion 52 of the male-type portion 50 into the insertion cylinder portion 56 of the female-type portion 55, and then moving one connecting portion 47M on the other connecting portion 47F such as twisting it by hand (so as to rotate it in the circumferential direction) in order to move the retaining pin 53 in the through-groove portion 58 into the retaining groove portion 59 as shown in FIG. 20, the connecting portions 47M, 47F can be interconnected, so that no detailed hand work or strong force is required, and even a small child can easily perform the connecting operation of the connecting portions 47M, 47F. Of course, if this point is not taken into consideration, as in the core material 45A to be used in the making device 1A described above, there may be an arrangement such that the ring-shaped connecting portions 91, 91 are connected to each other by use of the pair of separate fastenings 92.

Moreover, in the core material 45 of the kit 43 of the embodiment, the connecting portions 47M, 47F are interconnected by inserting the insertion protrusion portion 52 of the male-type portion 50 formed in one connecting portion 47M into the insertion cylinder portion 56 of the female-type portion 55 formed in the other connecting portion 47F, and then retaining the retaining pin 53 formed on the insertion protrusion portion 52 on the peripheral edge of the retaining groove portion 59 formed in the insertion cylinder portion 56 in such a manner so as to rotate the connecting portion 47M in the circumferential direction on the connecting portion 47F. Therefore, even when the connecting portions 47M, 47F are pulled so as to be separated from each other in the longitudinal direction of the cord-like body 46, the connecting portions 47M, 47F are not released from the connected state, and an unexpected release from the connection of the connecting portions 47M, 47F while the made accessory S1 is used can also be prevented. Moreover, in the kit 43 of the embodiment, by rotating the connecting portion 47M in a reverse direction on the connecting portion 47F to release the retained state of the retaining pin 53 with the peripheral edge of the retaining groove portion 59, and then moving the connecting portion 47M from the connecting portion 47F so as to draw the insertion protrusion portion 52 out of the insertion cylinder portion 56, the interconnected state of the connecting portions 47M, 47F can be easily released. Therefore, a made accessory S1 can be easily attached also to a bag strap or the like by once releasing the interconnected state of the connecting portions 47M, 47F, and moreover, an accessory once made can be easily remade into an accessory of another design by releasing the interconnected state of the connecting portions.

The connecting portions are not limited to those of the embodiment, and for example, loop clutches or a pair of snaps (press buttons) can also be used. However, in consideration of the point that no detailed hand work or strong force is necessary, a connected state is unlikely to be unexpectedly released, and a releasing operation of a connected state is easy, it is desirable to use connecting portions that are connected to each other by bayonet coupling.

Moreover, in the kit 43 for making an accessory by use of the making device 1 of the embodiment, the catching hooks 49 are disposed on the connecting portions 47M, 47F of the core material 45, and on both end sides of the decoration main body cloth 63 in the decoration main body material 62, the ring portions 64, 64 that can be caught on the catching hooks 49 are disposed. Therefore, in making an accessory, the both end sides of the decoration main body 83 (decoration main body cloth 63) can be kept connected to the connecting portions 47M, 47F of the core 82, so that the decoration main body 83 is unlikely to largely shift to the core 82 when a made accessory is used. Therefore, exposure of the core 82 from the decoration main body 83 can be prevented, and a made accessory has a good appearance. Particularly, as in the accessory S4 described above, in the case of an arrangement where the periphery of the core 82 is covered double across the entire circumference with the decoration main body 83 and the decorative cover 86, the decoration main body 83 disposed inside the decorative cover 86 can be prevented from being pulled by the decorative cover 86 to largely shift on the core 82 so that the decoration main body 83 has a large gap between its end portions during use, and large exposure of the connecting portions 47M, 47F can be prevented. Moreover, as in the accessory S1, even in the arrangement where the periphery of the core 82 is covered with only the decoration main body 83, by making only one end portion side of the decoration main body 83 (decoration main body cloth 63) be caught on the catching hook 49 by using the ring portion 64, an accessory can also be made in such a manner as putting the other end portion side that is not connected to the connecting portion 47 in the decoration main body 83 over the outer peripheral side of the end portion of the side caught on the catching hook 49, and also in this case, the decoration main body 83 can be prevented from largely shifting on the core 82 so as to have a large gap between its end portions during use, and large exposure of the connecting portions 47M, 47F can be prevented. Moreover, by an arrangement in which the catching hooks 49 are disposed on the connecting portions 47M, 47F, the beads part 73 and the like with the catching ring portions 76 disposed on both end sides can also be freely attached, as described above, so that an accessory excellent in design can be easily made. Of course, if this point is not taken into consideration, it is not necessary to form the catching hooks on the connecting portions, and it is not necessary to form on end portions of the production body the ring portions to be caught on the catching hooks. Hook-and-loop fastener components that can be joined to each other may be provided on one and the other of the peripheral edges of the openings of the decoration main body, and by such an arrangement, the peripheral edges of the openings (one and the other of both ends) of the decoration main body can be connected to each other by joining the hook-and-loop fastener components to each other after an accessory is made, creation of a gap between the end portions of the decoration main body can be further prevented, and the appearance of a made accessory can be further improved.

REFERENCE SIGNS LIST

1, 1A, 1B, 1C, 1D, 1E, 1F, 1G, 1H, 1L: Accessory making device (making device)
3, 101: Mount portion
3*a*: Bottom surface
5, 5A, 5B, 5C, 5D, 5E, 5F, 5G, 5H, 5L: Holder
6, 6A, 6B, 6C, 6D, 6E, 6F, 6G, 6H, 6L: Support portion
7: Recessed groove
8: Upper retaining recess (retaining portion)

12: Slider portion
14: Upper surface (pressing surface)
16: Lower retaining recess (retaining portion)
22: Cover portion
32: Support shaft
34, 94: Stopper
43: Accessory making kit
45, 45A: Core material
46: Cord-like body
47 (47M, 47F), 91: Connecting portion
49: Catching hook
62: Decoration main body material
64: Ring portion
82: Core
83: Decoration main body
89A, 89B, 89C: Catching portion
S1, S2, S3, S4, S5: Accessory

The invention claimed is:

1. An accessory making device for making an accessory comprising:

a core formed into a substantially ring shape by connecting both ends of a stretchable cord-like body having rubber-like elasticity;

connecting portions formed on both end sides of the cord-like body; and a decoration main body formed of a flexible sheet body into a substantially tubular shape so as to cover a periphery of the core across the entire circumference, and disposed around the core in such a manner so as to abut both ends thereof against each other in a contracted state so as to be reduced in axial length, the accessory making device comprising a long rigid holder, the holder comprising: a retaining recess to retain the cord-like body; and a recessed groove to retain the connecting portions, wherein the connecting portions are separated from each other, and the holder is able to be inserted through the decoration main body, wherein the holder has a long, substantially linear shape, the making device comprising a mount portion having a bottom surface that can be placed on a mounting surface, wherein the holder is disposed by being supported on the mount portion so as to project from the mount portion, wherein the holder is formed so as to project upward from the mount portion, the making device comprising a cover portion formed so as to project upward from the mount portion and disposed, with a tip side thereof bent, so as to cover an upper end of the holder from above.

2. The accessory making device according to claim 1, wherein in the holder, a retaining recess in which the connecting portions can be inserted and retained is formed on an outer surface of the holder, and a recessed groove to insert the cord-like body is formed continuously on an outer surface of the holder in an axial direction so as to be able to store the entire length of the cord-like body.

3. An accessory making device for making an accessory, comprising:

a core formed into a substantially ring shape by connecting both ends of a stretchable cord-like body having rubber-like elasticity;

connecting portions formed on both end sides of the cord-like body; and a decoration main body formed of a flexible sheet body into a substantially tubular shape so as to cover a periphery of the core across the entire circumference, and disposed around the core in such a manner so as to abut both ends thereof against each other in a contracted state so as to be reduced in axial length, the accessory making device comprising a long rigid holder, the holder comprising: a retaining recess to retain the cord-like body; and a recessed groove to retain the connecting portions, wherein the connecting portions are separated from each other, the holder is able to be inserted through the decoration main body, the holder has a long, substantially linear shape, and the making device including a stopper that is attachable and detachable to the holder, and when attached to the holder, restricts the decoration main body covering the outer peripheral side of the holder from extending such as to be restored from a contracted state.

4. An accessory making device for making an accessory, including:

a core formed into a substantially ring shape by connecting both ends of a stretchable cord-like body having rubber-like elasticity;

connecting portions formed on both end sides of the cord-like body; and a decoration main body formed of a flexible sheet body into a substantially tubular shape so as to cover a periphery of the core across the entire circumference, and disposed around the core in such a manner so as to abut both ends thereof against each other in a contracted state so as to be reduced in axial length, the accessory making device comprising a long rigid holder, the holder comprising: a retaining recess to retain the cord-like body; and a recessed groove to retain the connecting portions, a stopper that is disposed in a periphery of the holder and near an end edge of the decoration main body, and restricts the decoration main body covering the outer peripheral side of the holder from extending such as to be restored from a contracted state; and a support shaft that slidably supports the stopper, wherein the connecting portions are separated from each other, the holder is able to be inserted through the decoration main body, the holder has a long, substantially linear shape, the making device comprising a mount portion having a bottom surface that can be placed on a mounting surface, wherein the holder is disposed by being supported on the mount portion so as to project from the mount portion, the support shaft has a long shape formed projecting from the mount portion so as to lie substantially along the holder, and the stopper is pivotally supported to the support shaft so as to be disposed near an end edge of the decoration main body in the periphery of the holder, slidable in an axial direction of the support shaft on the support shaft, and turnable in a circumferential direction of the support shaft, and can press an end edge of the decoration main body in a contracted state.

5. An accessory making device for making an accessory, comprising a core formed into a substantially ring shape by connecting both ends of a stretchable cord-like body having rubber-like elasticity;

connecting portions formed on both end sides of the cord-like body; and a decoration main body formed of a flexible sheet body into a substantially tubular shape so as to cover a periphery of the core across the entire circumference, and disposed around the core in such a manner so as to abut both ends thereof against each other in a contracted state so as to be reduced in axial length, the accessory making device comprising a long rigid holder, the holder comprising: a retaining recess to retain the cord-like body; and a recessed groove to retain the connecting portions, wherein the connecting portions are separated from each other, and the holder is able to be inserted through the decoration main body, wherein the holder has a long, substantially linear shape, the making device comprising a mount portion having a bottom surface that can be placed on a mounting surface, wherein the holder is disposed by being supported on the mount portion so as to project from the mount portion, wherein the holder comprises:

a support portion having a long shape projecting from the mount portion, and including on a tip side thereof, a retaining portion that can retain the connecting portion disposed on one end side of the cord-like body; and a slider portion disposed near an end portion on a side closer to the mount portion in the support portion, including a through-hole that allows insertion therethrough of the support portion, and capable of sliding movement on the support portion, the slider portion is set to a size not to allow insertion through the decoration main body and comprising:

a retaining recess that can retain a connecting portion disposed on one end side of the cord-like body; and a pressing surface that is formed so as to cover a periphery of the support portion substantially perpendicularly to a center axis of the support portion across substantially the entire peripheral edge of the through-hole, and can, at the time of sliding movement, press and move an end face of the decoration main body disposed so as to cover the outer periphery of the support portion.

6. A method for making an accessory comprising:

providing a core formed into a substantially ring shape by connecting both ends of a stretchable cord-like body having rubber-like elasticity; and providing a decoration main body formed of a flexible sheet body into a substantially tubular shape so as to cover a periphery of the core across the entire circumference, and disposed around the core in a contracted state so as to be reduced in axial length, in such a manner so as to abut both ends against each other, the accessory being made, by use of a long rigid holder, first, by attaching the cord-like body to the holder in such a manner so as to respectively retain connecting portions on both end sides of the cord-like body on the holder with the connecting portions of the cord-like body separated from each other, then, disposing the decoration main body, in a contracted state so as to be reduced in axial length, on the outer peripheral side of the holder in such a manner so as to make the connecting portions disposed on both end sides of the cord-like body project from openings at both end sides of the decoration main body, and connecting the connecting portions on both end sides to each other to form the cord-like body into a ring shape, followed by removal of the decoration main body from the holder.

7. A making device for making an accessory comprising:

a core formed into a substantially ring shape by connecting both ends of a stretchable cord-like body having rubber-like elasticity; and a decoration main body formed of a flexible sheet body into a substantially tubular shape so as to cover a periphery of the core across the entire circumference, and disposed around the core in such a manner so as to abut both ends thereof against each other in a contracted state so as to be reduced in axial length, the accessory making device comprising a long rigid holder, the holder being able to retain connecting portions on both end sides of the cord-like body, with the connecting portions of the cord-like body separated from each other, and being able to be inserted through the decoration main body, wherein the holder has a long, substantially linear shape, the making device comprises a mount portion having a bottom surface that can be placed on a mounting surface, wherein the holder is disposed by being supported on the mount portion so as to project from the mount portion, the holder comprises:

a support portion having a long shape projecting from the mount portion, and including on a tip side thereof, a retaining portion that can retain the connecting portion disposed on one end side of the cord-like body; and a slider portion disposed near an end portion on a side closer to the mount portion in the support portion, including a through-hole that allows insertion therethrough of the support portion, and capable of sliding movement on the support portion, the slider portion is set to a size not to allow insertion through the decoration main body and comprising:

a retaining recess that can retain a connecting portion disposed on one end side of the cord-like body; and a pressing surface that is formed so as to cover a periphery of the support portion substantially perpendicularly to a center axis of the support portion across substantially the entire peripheral edge of the through-hole, and can, at the time of sliding movement, press and move an end face of the decoration main body disposed so as to cover the outer periphery of the support portion.

* * * * *